US005378068A

United States Patent [19]

Hua

[11] Patent Number: 5,378,068

[45] Date of Patent: Jan. 3, 1995

[54] WORD PROCESSOR FOR GENERATING CHINESE CHARACTERS

[76] Inventor: Teyh-Fwu Hua, No. 5, Fu-Shou Lane, Chiu-Che Rd., Tien-Chung Tsun, Lung-Ching Hsiang, Taichung Hsien,

[21] Appl. No.: 134,579

[22] Filed: Oct. 12, 1993

[51] Int. Cl.[6] .................... B41J 5/10

[52] U.S. Cl. .................... 400/110; 400/484; 345/171; 364/419.09

[58] Field of Search .................... 400/110, 109, 484, 487, 400/490, 493; 345/168, 172, 171; 364/419.09

[56] References Cited

U.S. PATENT DOCUMENTS 4,484,305 11/1984 Ho .................... 400/110
4,602,878 7/1986 Merner et al. .................... 400/110
4,684,926 8/1987 Yong-Min .................... 400/110
4,954,955 9/1990 Chiu .................... 400/110
5,131,766 7/1992 Wong .................... 400/110
5,175,803 12/1992 Yeh .................... 400/110

*Primary Examiner*—Ren Yan
*Attorney, Agent, or Firm*—Christie, Parker & Hale

[57] ABSTRACT

A word processor for producing Chinese characters includes a standard United states keyboard, an internal memory unit for storing a dictionary of radicals of Chinese characters from which selected Chinese characters are derived, a screen and a memory disk. Each of the Chinese characters includes at least one radical. The standard United States keyboard is coupled to said memory unit and has numeral and letter keys. The numeral keys includes co-functioning numeral keys. Each of the co-functioning numeral keys is inscribed with at least one of the radicals and a letter or numeral representative of a letter or numeral key used in combination with each co-functioning numeral key to select the corresponding radical. The letter keys includes co-functioning letter keys. Each of the co-functioning letter keys is inscribed with at least one of the radicals and a letter or numeral representative of a letter or numeral key used in combination with each co-functioning letter key to select the corresponding radical. The screen is coupled to the internal memory unit for displaying the characters derived from the memory unit. The memory disk is coupled to the memory unit for storing the characters appearing on the screen.

1 Claim, 6 Drawing Sheets

11

TABLE OF CODED ORTHODOX RADICALS

| 1 | 2 | 3 | 4 | 5 | 6 | 7 | 8 | 9 | Y (10～) |
|---|---|---|---|---|---|---|---|---|---|
| [A] 一 | [B] 人 G 冫 | [C] 口 G 廾 | [F] 火 G 止 V 爻 | [L] 王 G 瓜 | [O] 艸 G 缶 | ③ [T] 言 G 身 | ⑦ [V] 金 | ⑩ 1 食 | ⑮ 1 馬 G 高 |
| 2 乙 | 2 刀 H 凵 | [D] 女 H 夕 | [G] 木 H 气 W 无 | [M] 目 H 禾 | ② [P] 糸 H 臼 | [U] 辶 H 里 | [W] 阜 | ⑪ 2 頁 | ⑯ 2 齒 H 黃 |
| 3 丨 | 3 力 I 卜 | [E] 土 I 士 | [H] 手 I 父 X 支 | [N] 石 I 生 | [Q] 虫 I 老 | 3 辛 I 辰 | ⑧ [X] 門 | 3 革 | 3 麻 ⑳ I 鹵 |
| 4 亅 | 4 儿 J 十 | 4 山 J 寸 | [I] 心 J 斤 Y 牙 | 4 疒 J 田 | [R] 肉 J 羊 | 4 邑 ⑥ J 見 | 4 非 | 4 面 | 4 鬼 J 龠 |
| 5 丶 | 5 冖 K 卩 | 5 宀 K 巾 | [J] 水 K 曰 | 5 穴 K 示 | [S] 竹 K 虍 | 5 角 K 谷 | 5 隹 | ⑫ 5 韋 | 5 鼓 K 骨 |
| 6 丿 | 6 几 L 匕 | 6 川 L 彐 | [K] 日 L 比 | 6 疋 L 立 | 6 衣 L 至 | 6 酉 | 6 隶 | ⑬ 6 風 | 6 黹 ㉑ L 龍 |
| | 7 勹 M 厶 | 7 干 M 幺 | 7 牛 M 毋 | 7 内 M 皿 | 7 米 M 网 | ④ 7 貝 | 7 青 | 7 香 | ⑰ 7 齊 ㉒ M 麥 |
| | 8 八 | 8 子 N 工 | 8 支 N 斗 | 8 皮 N 甘 | 8 臣 N 血 | 8 豕 | 8 雨 | 8 音 | 8 鬲 ㉓ N 鳥 |
| | 9 亠 | 9 大 O 己 | 9 犬 O 爪 | 9 玄 | 9 舟 O 自 | 9 釆 | ⑨ 9 長 | 9 首 | 9 鼎 O 黑 |
| | A 冂 | A 弋 P 尸 | A 戈 P 戶 | A 矛 | A 聿 P 耒 | A 走 | | ⑭ A 飛 | A 鹿 P 髟 |
| | B 二 | B 彳 Q 夊 | B 毛 Q 文 | B 白 | B 行 Q 舛 | B 豸 | | B 韭 | B 鼻 ㉔ Q 龜 |
| | C 匚 | C 囗 R 尢 | C 欠 R 月 | C 瓦 | C 襾 R 而 | ⑤ C 車 | | | C 黍 R 黽 |
| | D 入 | D 弓 S 小 | D 歹 S 氏 | D 矢 | D 耳 S 色 | D 豆 | | | ⑱ D 鬥 S 鼠 |
| | E 又 | E 彡 T 屯 | E 殳 T 爿 | E 用 | E 舌 T 艮 | E 赤 | | | E 鬯 |
| | F 厂 | F 广 U 廴 | F 方 ① U 片 | F 癶 | F 羽 | F 足 | | | ⑲ F 魚 |

FIG. 6

WORD PROCESSOR FOR GENERATING CHINESE CHARACTERS

BACKGROUND OF THE INVENTION

1. Field Of The Invention

This invention relates to a word processor, more particularly to a word processor which is operable to produce and display desired Chinese characters on a monitor by virtue of inputting the orthodox radicals in the desired Chinese characters with the use of a standard keyboard.

2. Description Of The Related Art

Presently, there are many different kinds of word processing systems available in the market for enabling Chinese characters to be typed with the use of a keyboard so as to display the typed Chinese characters on a monitor. However, all of the conventional word processing systems have been considered inconvenient by the ordinary dictionary users since none of the conventional word processing systems is operable to display desired Chinese characters on a monitor by virtue of inputting orthodox radicals of the desired Chinese characters from a standard keyboard. For instance, since a great number of homonymic characters is common in the Chinese language, a group of homonymic characters is displayed on the monitor for manual selection when a conventional phonetic word processing system is operated. Also, because of the complexity of the Chinese characters, a group of characters, having different meanings, but with the same codes, is displayed on the monitor for manual selection when a conventional calligraphic word processing system is operated. It is time-consuming for the operator to make a manual selection of the proper characters from the displayed group.

SUMMARY OF THE INVENTION

The main object of the present invention is to provide a word processor which is operable to produce and display desired Chinese characters on a monitor by inputting the orthodox radicals included in the desired Chinese characters from a standard keyboard so that it is convenient for the ordinary dictionary users to operate.

Another object of the present invention is to provide a word processor which obviates the step of manual selection of the proper characters from the displayed group so as to increase the practical speed.

According to this invention, a word processor for producing Chinese characters includes a standard United States keyboard, an internal memory unit for storing a dictionary of radicals of Chinese characters from which selected Chinese characters are derived, and a screen. Each of the Chinese characters includes at least one orthodox radical. The keyboard is coupled to the memory unit and has numeral and letter keys. Each of the numeral keys includes co-functioning numeral keys. Each of the co-functioning numeral keys is inscribed with at least one of the radicals and a letter or numeral representative of a letter or numeral key used in combination with each co-functioning numeral key to select said at least one of the radicals. The letter keys include co-functioning letter keys. Each of the co-functioning letter keys is inscribed with at least one of the radicals and a letter or numeral representative of a letter or numeral key used in combination with each co-functioning letter key to select said at least one of the radicals. The screen is coupled to the memory unit for displaying the characters derived from the memory unit.

BRIEF DESCRIPTION OF THE DRAWINGS

Other features and advantages of the present invention will become apparent in the following detailed description of the preferred embodiment, with reference to the accompanying drawings, of which:

FIG. 6 is a table which shows the relationship between the 212 orthodox radicals and the numerals and the English letters.

DETAILED DESCRIPTION OF THE PREFERRED EMBODIMENT

First at all, it must be understood that 214 radicals are conventionally used in the Chinese dictionary in classifying and organizing the thousands of ideographic characters used to write the Chinese language. In the present invention, the radicals "匸" and "匚" are combined since they cannot be distinguished easily by the human eyes, and the radicals "攵" and "攴" are combined since the radical "攴" is not frequently used. Therefore, 212 orthodox radicals are employed in the present invention.

Figure 1:
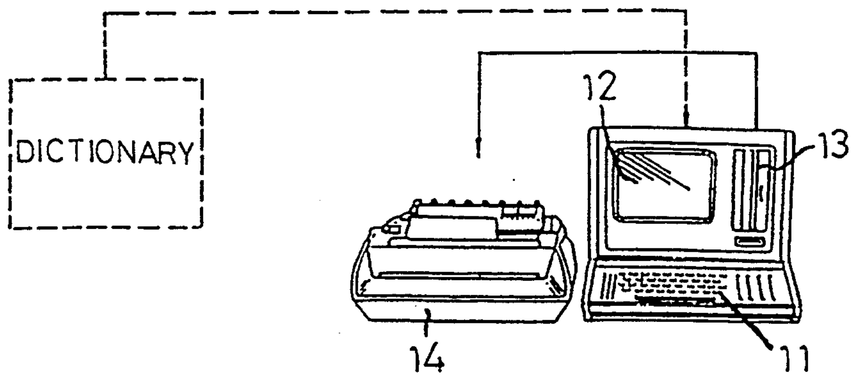
FIG. 1 is a schematic view showing a word processor which is constructed to carry out the functions required in practicing the present invention.
Figure 2:
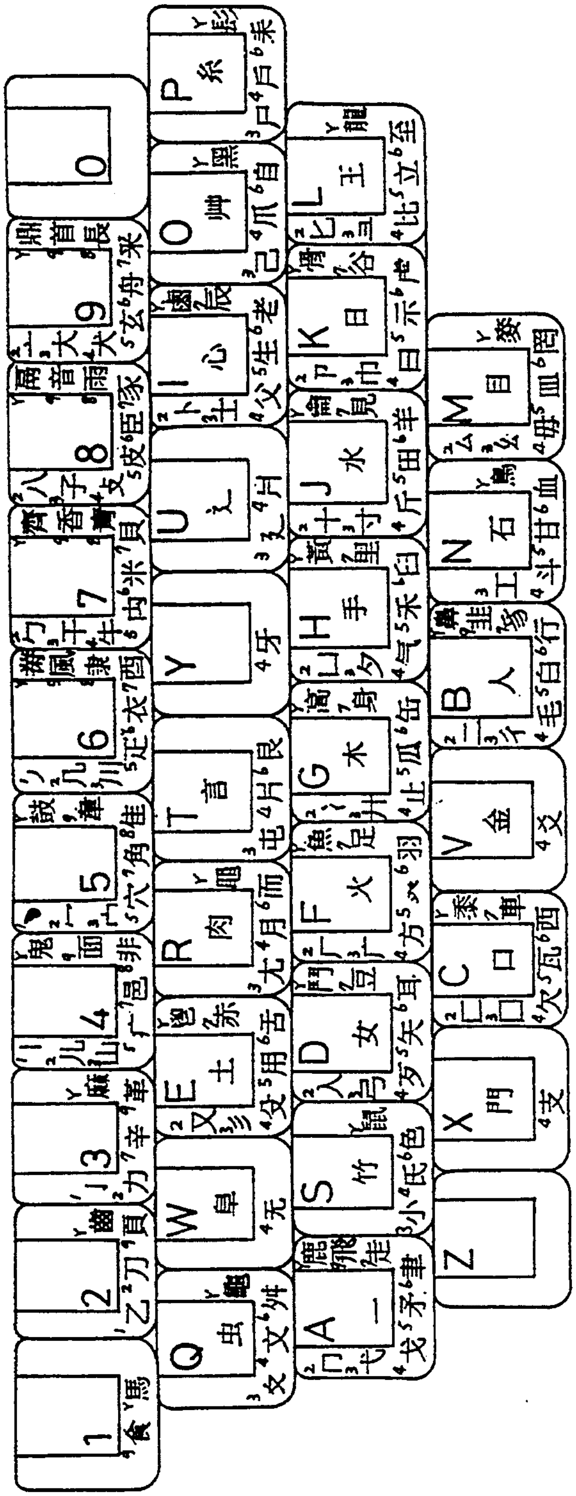
FIG. 2 is a schematic view illustrating the relationship between the keys on the keyboard of the word processor and the 212 orthodox radicals of the Chinese language.

As shown in FIGS. 1 and 2, a word processor for producing Chinese characters by inputting the orthodox radicals included in the Chinese characters in accordance with the present invention includes a standard keyboard 11, and a dictionary stored in its memory which causes selected Chinese characters to be displayed on a screen 12 as the memory is addressed by the selective operation of the selected keys. The word processor further includes a memory disk 13 for storing the selected Chinese characters therein, and a printer unit 14 for printing the selected Chinese characters shown on the screen 12 and for printing the selected Chinese characters stored in the memory disk 13. The relationship between the keys on the keyboard 11 and the 212 orthodox radicals of the Chinese language is shown in FIG. 2.

According to the present invention, one or two keys of the keyboard 11 is or are operated to constitute a main orthodox radical included in the desired Chinese character, and one or two keys of the keyboard 11 is or are then operated to constitute an auxiliary orthodox radical included in the desired Chinese character. As the selected keys of the keyboard 11 are operated in the selected sequence, a particular memory cell in the memory of the word processor is addressed to cause the word processor to display the desired Chinese character on the screen 12.

The selection process of each character is repeated until a complete page of selected characters appears on the screen 12 of the word processor. The data is then transferred to the memory disk 13 for subsequent printout by the printer unit 14.

Figure 3:
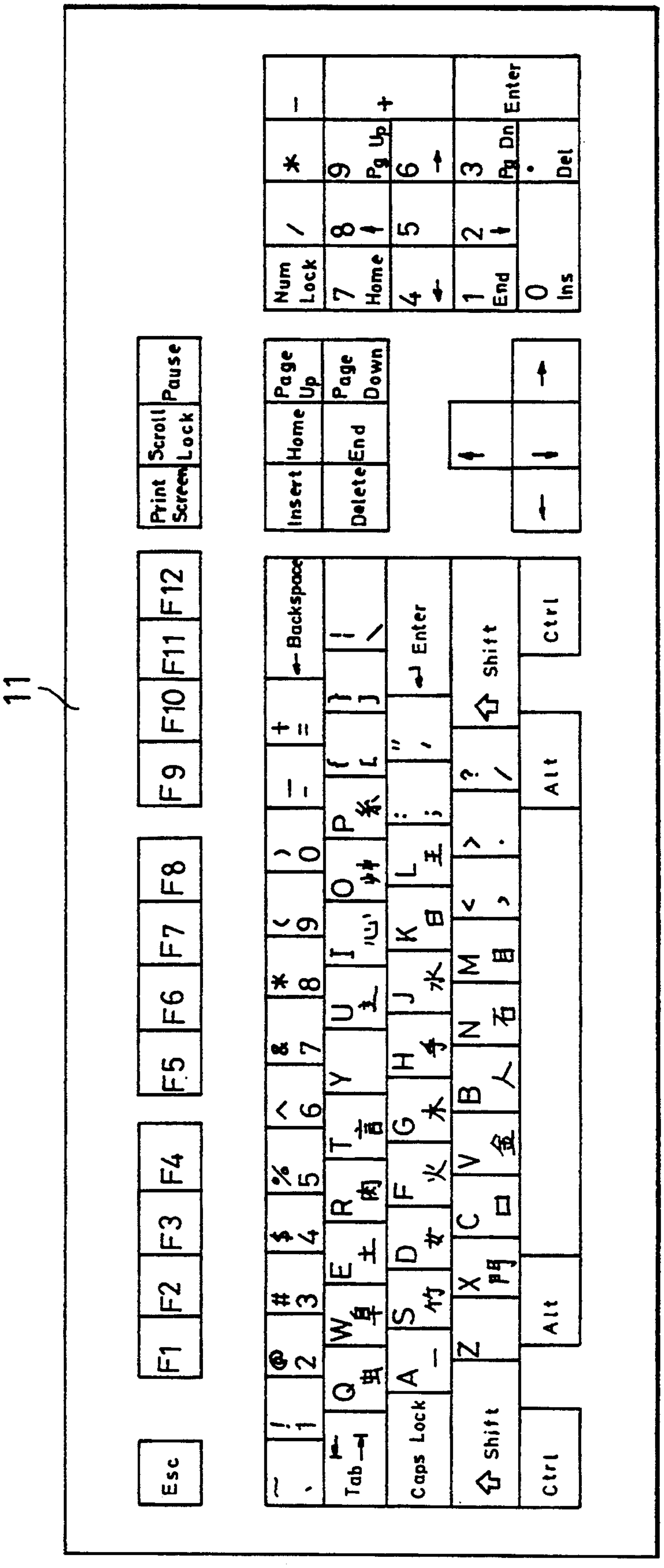
FIG. 3 is a schematic view of a standard keyboard of the word processor, in which the relationship between the keys on the keyboard and one-key radicals is shown.
Figure 4:
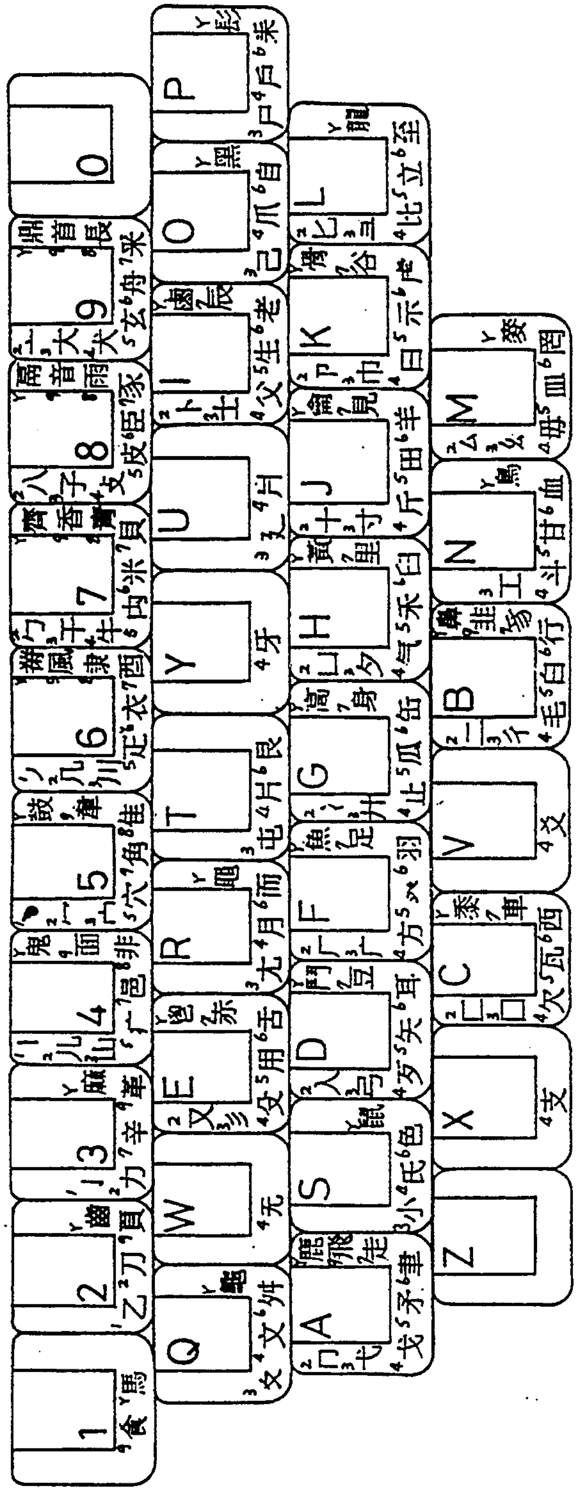
FIG. 4 is a schematic view showing the relationship between two-key radicals and keys on the keyboard.

FIG. 3 is a plan view showing a part of the keyboard 11 and illustrates the relationship between the one-key radicals and the keys on the keyboard 11. Each one-key radical is inscribed on the top surface of a corresponding one of the letter keys ("A" to "X") of the keyboard 11 and is frequently included in a Chinese character. Thus, each one-key radical is selected by operating the corresponding letter key on the keyboard 11. For example, the radical "—" is selected when the "A" letter key is operated, and the radical "木" is selected when the "G" letter key is operated. Referring now to FIG. 4 and 6, each of the radicals has a numeral or an English letter provided at the left side thereof. If the letter of a radical is enclosed by a square, the radical is a one-key radical. Otherwise, the radical is a two-key radical. FIG. 4 is a plan view similar to FIG. 3 which illustrates the relationship between the two-key radicals and the keys on the keyboard 11. Each numeral key ("1" to "9") and each letter key ("A" to "Y" ) has at least one of the two-key radicals inscribed on a periphery surface thereof so that all of the 212 orthodox radicals are inscribed on the keyboard 11 (see FIG. 2) for convenience in operation by a junior operator. Each two-key radical is selected by operating two corresponding keys of the keyboard 11. That is, one of the numeral keys ("1" to "9") and the letter key ("Y") is operated selectively to constitute a stroke number selection of the desired two-key radical, i.e. operation of the "4" numeral key indicates that the desired two-key radical has four strokes. If the "Y" letter key is operated initially, a two-key radical having ten or more strokes is desired. One of the numeral keys ("1" to "9") and letter keys ("A" to "Y") is then operated selectively so as to complete the selection of the desired two-key radical. For example, the radical "小" is selected when the "3" numeral key and the "S" letter key are operated in sequence, the radical "齊" is selected when the "Y" letter key and the "7" numeral key are operated in sequence, while the radical "非" is selected when the "8" and "4" numeral keys are operated in sequence. The stroke number of each two-key radical is also inscribed on the corresponding key at the upper left side of the two-key radical. In the operation of the word processor according to the present invention, the main radical of a desired Chinese character is selected, to be followed by the selection of the auxiliary radical of the desired Chinese character, by operating selected letter and numeral keys on the keyboard 11, as described above.

Since a Chinese character may include only a main radical (one radical), such as "土", "人", "山", . . . etc., a desired Chinese character can thus be selected by the operation of a single key when the desired Chinese character includes only a main radical which is one of the one-key radicals, such as "土" and "人", and by the operation of two keys on the keyboard 11 when the desired Chinese character includes only a main radical which is one of the two-key radicals, such as "山". Hence, in the embodiment of the present invention, a Chinese character is selected and is displayed on the screen 12 by operating from at least one key on the keyboard 11 up to four keys on the latter. Since 212 orthodox radicals are used, the likelihood of having the same code for two characters is zero for all practical purposes.

The speed of the process may be further increased by using coding phrases rather than a single word. The use of coding phrases may be achieved as follows:

(1) 2-Chinese character phrase: Enter the main radical of each character.

(2) 3-Chinese character phrase: Enter the main radical of the first character, and only the first code of the main radical of the second and third characters.

(3) 4 or more Chinese character phrases: Enter the first code of the main radical of each first four characters.

Furthermore, the word processor of the present invention has additional functions as follows:

(1). When one of the main and auxiliary radicals of a desired character is known by an operator while another one of the main and auxiliary radicals is unknown, the "—" symbol key and the "1" numeral key are selected in sequence following the selection of the known radical of the desired character so that a group of character including the known radical of the desired character is displayed for selection. For example, when the "C" letter key, the "—" symbol key and the "1" numeral key are operated, the characters "中", "串", "別", . . . etc., are displayed for selection. Moreover, the numerals and English letters representing the main and auxiliary radicals of the displayed characters are also displayed so that the main and auxiliary radicals of the displayed characters can be known. The symbol "—" functions as a distinguishing symbol. The numeral, which follows the "—" symbol in this and the following functions, is an identification number according to the corresponding function.

Figure 5:
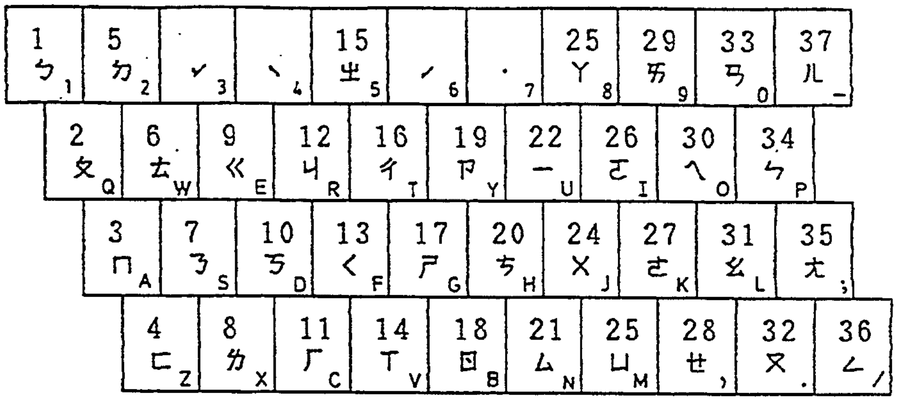
FIG. 5 is a schematic view illustrating the relationship between keys on the keyboard, phonetic symbols and tones of the Chinese language, and digital identification numbers of the Chinese language.

(2). A desired Chinese character can be selected by selecting the phonetic symbols and tones of the desired character. In this embodiment, each of the phonetic symbols and tones has a 1-digit identification number or a 2-digit identification number (see FIG. 5). For example, when the "1", "5", "2", "3", "3", "6" numeral keys are operated in sequence, a group of homonymic characters "中", "忠", "終", "衷", "鐘", and "鍾" are displayed for selection since "15" is the identification number of the phonetic symbol "ㄓ", "24" is the identification number of the phonetic symbol "ㄨ", and "36" is the identification number of the phonetic symbol "ㄥ".

(3). A desired character can be selected by selecting the phonetic symbols and tones of the desired character. Each of the phonetic symbols and tones are selected by operating a corresponding one of the keys on the keyboard 11 (see FIG. 5). For example, when the "5" numeral key, the "J" letter key, the "/" and "—" symbol keys are operated in sequence, a group of homonymic characters similar to the preceding example are displayed for selection since the "5" numeral key is the direct key for selecting the phonetic symbol "ㄓ", the "J" letter key is the direct key for selecting the phonetic symbol "ㄨ", and the "/" symbol key is the direct key for selecting the phonetic symbol "ㄥ".

(4). A desired character can be selected by the method of Romanization index. For example, when the "J", "O", "N" and "G" letter keys are operated in sequence for selecting a single Chinese character, a group of homonymic characters "中", and "忠", is displayed for selection. Furthermore, when the "J", "H""M", and "G" letter keys are operated in sequence for selecting a 4-Chinese character phase, "中華民國" is displaced.

(5). A desired character can be selected by inputting the first four alphabets of an English word which has the same meaning as that of the desired character For example, when the "B", "E", "A" and "U" letter keys are operated in sequence, which four letter keys being the first four letters of the word "beautiful", the characters "美", "艷", . . . etc., which characters are the translation of the word "beautiful", are displayed for selection.

Table 1-1 through 1-63 depict one library and the key strokes that may be employed for selecting the corresponding Chinese characters.

In the English-Chinese dictionary, the abbreviated English word, such as "BEAU", is the first four letters of the full English word "BEAUTIFUL". That is, if a Chinese character having the same meanings with the English word "BEAUTIFUL" is desired, the first four letters "BEAU" of the English word "BEAUTIFUL" is selected so that a group of Chinese characters having the same meanings with the English word "BEAUTIFUL", is displayed for selection. However, if the English word has only two or three letters, such as "BE" and "BAD", the symbol key "—" is selected after the selection of the letter keys. The decimal numbers and letters at the right side of each column are the codes of the corresponding Chinese characters. For example, referring to the table in FIG. 6 and according to the disclosure, from page 4, line 12 to page 8, line 13, the Chinese character "籃" (page 4, middle column of the dictionary) is displayed when the letter key "S", the numeral key "5" and the letter key "M" are operated in sequence since the Chinese character "籃" includes a main orthodox radical "竹" which is an one-key radical constituted by the operation of the letter key "S", and an auxiliary orthodox radical "皿" which is a two-key radical constituted by the operation of the numeral and letter keys "5" and "M". Similarly, the Chinese character "帙"(page 4, right column of the dictionary) is displayed when numeral key "3", the letter key "K", and the numeral keys "3" and "9" are operated in sequence since the Chinese character "帙" includes a main orthodox radical "巾" which is a two-key radical constituted by the operation of the numeral and letter keys "3" and "K", and an auxiliary orthodox radical "失" which is a two-key radical constituted by the operation of the numeral keys "3" and "9" in FIG. 2.

(6). A desired phrase can be selected by selecting the first character of the desired phrase. For example, when the "1", "4" numeral keys, the "—" symbol key, and the "9" numeral key are operated in sequence, a group of phrases "中年", "中央", "中国", . . . , etc., are displayed for selection. Each of the displayed phrases has a first character "中" since "14" represents a two-key radical "中" which also serves as one of the Chinese characters. The numeral "9" is an identification number of the phrase selecting function.

(7). A desired character can be selected in a normal form or in a simplified form. For example, when the "3" numeral key, the "C" letter key, the "—" symbol key and the "0" numeral key are operated in sequence, both the normal and simplified form of the desired character, "國", and "国", are displayed for selection. When the "—" symbol key is not operated, the desired character is shown in simplified form.

(8). The word processor can be used to teach the user the pronunciation of a desired character. For example, when the "1" and "4" numeral keys, the "—" symbol key and the "4" numeral key are operated in sequence, the character "中" and the phonetic symbols and tone of the character "中" are displayed.

(9). The word processor can be used to teach the user the digit identification number of a desired character. For example, when the "1" and "4" numeral keys, the "—" symbol key and the "5" numeral keys are operated in sequence, the character "中" and the digit identification number "152336" are displayed.

(10). The word processor can be used to teach the user the Romanization index of a desired character. For example, when the "1" and "4" numeral keys, the "—" symbol key and the "6" numeral keys are operated in sequence, the character "中" and the Romanization indexes "JONG" and "JONQ" are displayed since both of the "JONG" and "JONQ" represent the character "中" but have different meanings.

(11). The word processor can be used to teach the user the identical English word of a desired character or a desired phrase. For example, when the "1" and "4" numeral keys, the "—" symbol key and the "7" numeral keys are operated in sequence, the character "中" and the English words "center/middle" and "China" are displayed. Furthermore, when the "1", "0", "4" and "3" numeral keys, the "—" symbol key and the "7" numeral keys are operated in sequence, the phrase "中華民國" and the English phrase "the Republic of China" are displayed.

Accordingly, the present invention is convenient for an operator who is an ordinary dictionary user. Moreover, a junior operator or a foreign operator who is not familiar with the Chinese language can also operate the word processor of the present invention by the provision of the additional functions of the present invention.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

A

英漢對照字典 A ENGLISH-CHINESE DICTIONARY

| | |
|---|---|
| APAS | A PASS |
| | 隘 W5H |
| APLA | A PLAY |
| | 的 Y2C |
| ABAN | ABANDON |
| | 棄 G29 |
| ABEY | ABEY |
| | 剩 22G1 |
| ABDI | ABDICATE |
| | 禪 5KCC |
| ABIL | ABILITY |
| | 才 HA |
| | 能 R |
| ABSC | ABSCESS |
| | 疽 54A2 |
| ABUN | ABUNDANT |
| | 森 GGG |
| | 盈 AM2E |
| | 衍 6BJ |
| | 阜 WA |
| ABUS | ABUSE |
| | 詬 TC2F |
| | 誶 T2J2 |
| ABYS | ABYSS |
| | 淵 J141 |
| ACCE | ACCEPT |
| | 納 P2D |
| ACCI | ACCIDENTAL |
| | 僥 BYO |
| ACCO | ACCOMPANY |
| | 偕 B5B4 |
| | 陪 W5LC |
| ACCU | ACCUMULATE |
| | 積 5H77 |
| ACHI | ACHING |
| | 酸 762 |
| ACQU | ACQUAINT |
| | 諳 T98 |
| ACRE | ACRE |
| | 畝 5J16 |
| ACRI | ACRID |
| | 辣 73GC |
| ACRO | ACROSS |
| | 晃 K243 |
| ACTO | ACTOR |
| | 伶 BB2K |
| ADD- | ADD |
| | 加 23C |
| | 添 J13 |
| ADDI | ADDICTED |
| | 耽 M25 |
| ADMI | ADMINI- |
| | STRATE |
| | 政 48 |
| | ADMIRE |
| | 慕 IOK |
| ADOR | ADORN |
| | 妝 D4U |
| ADUL | ADULTERY |
| | 姦 DDD |
| ADVA | ADVANCE |
| | 彙 3L |
| | 進 U8 |
| | 遲 UK8 |
| | 邁 U05 |
| | ADVANTAGE |
| | 裨. 6G2J |
| ADVI | ADVICE |
| | 訓 T36 |
| | ADVISE |
| | 勸 2308 |
| | 諫 TGC |
| ADVO | ADVOID |
| | 諱 T95 |
| AEFI | AEFINITE |
| | 定 3556 |
| AFRA | AFRAID |
| | 竦 5LGC |
| AFFA | AFFAIR |
| | 般 694 |
| AFFE | AFFECTIONATE |
| | 暱 K2C |
| AGAI | AGAIN |
| | 再 2A |
| | 又 2E |
| AGE- | AGE |
| | 庚 3F3L |
| | 壽 3I3 |
| | 齡 Y2B |
| AGON | AGONY |
| | 慟 I23 |
| AGRE | AGREEABLE |
| | 諾 OTK |
| AGRI | AGRICULTURE |
| | 農 7I |
| AID- | AID |
| | 佑 BCA1 |
| | 弼 3D5B |
| AIM- | AIM |
| | 致 GL4 |
| AIMA | AIM AT |
| | 瞄 M05 |
| AIR- | AIR- |
| | 氣 4H |
| AKIN | A KIND OF SEED |
| | 薏 OI9 |
| ALAS | ALAS |
| | 哎 CO1 |
| | 嗚 CF1 |
| | 噫 CI9 |
| ALDE | ALDER |
| | 杞 G30 |
| ALER | ALERTNESS |
| | 儆 B480 |
| ALIK | ALIKE |
| | 昆 K4L |
| ALL- | ALL |
| | 俱 B28A |
| | 凡 26 |
| | 咸 C4A |
| | 皆 5B4 |
| | 諸 T6I |
| | 遍 U4P |
| ALLI | ALLIANCE |
| | 盟 5MK |
| ALLU | ALLURE |
| | 誘 T5H |
| ALMO | ALMOST |
| | 殆 4DC |
| ALON | ALONE |
| | 孑 38AA |
| | ALONG |
| | 沿 JC26 |
| ALRE | ALREADY |
| | 曾 4K2 |
| ALSO | ALSO |
| | 且 A2A |
| | 也 12 |
| | 亦 291 |
| | 并 370 |
| ALTE | ALTER |
| | 改 4830 |
| ALTH | ALTHOUGH |
| | 雖 85Q |
| ALTO | ALTOGETHER |
| | 共 282 |
| ALUM | ALUM |
| | 礬 NGG |

Table 1 - 1

A

| | |
|---|---|
| ALUM | ALUMINIUM |
| | 鋁 VCC |
| AMAS | AMASS |
| | 畜 CEB |
| AMBE | AMBER |
| | 琥 L6K |
| | 珀 L5B |
| AMIA | AMIABLE |
| | 藹 I3I4 |
| AMIC | AMICE |
| | 袈 6623 |
| | 裟 66J3 |
| AMMO | AMMONIA |
| | 氨 4H35 |
| AMPL | AMPLE |
| | 綽 P2J2 |
| AMPU | AMPUTATE |
| | 割 224K |
| ANAL | ANALYZE |
| | 析 G4J |
| ANCE | ANCESTORS |
| | 祖 5KA2 |
| | 宗 355K |
| AHCH | AHCHOR |
| | 泊 J5BA |
| | 錨 V05 |
| AND- | AND |
| | 和 C5 |
| | 暨 4WK |
| ANGE | ANGELICA |
| | 芷 04G |
| ANGE | ANGER |
| | 忿 I222 |
| | 怒 ID2 |
| | 悖 I37E |
| | 愾 I4H |
| | 憤 I77 |
| ANGL | ANGLE |
| | 稜 5HE |
| ANGR | ANGRY |
| | 惱 I36 |
| ANKL | ANKLE |
| | 踝 7FGK |
| ANNA | ANNALS |
| | 紀 P30 |
| ANNE | ANNEX |
| | 併 B03 |
| ANNO | ANNOTATE |
| | 註 T15 |
| ANNO | ANNOUNCE |
| | 詔 TC22 |
| | ANNOYED |
| | 惆 IC2A |
| ANOT | ANOTHER |
| | 另 C23 |
| ANSW | ANSWER |
| | 答 SC |
| ANT- | ANT |
| | 螞 QY1 |
| | 蟻 Q6 |
| | 蟥 QYH |
| ANTE | ANTELOPE |
| | 羚 6JB |
| | ANTEROOM |
| | 塈 EE1 |
| ANTI | ANTIMONY |
| | 銻 V3D |
| ANUS | ANUS |
| | 肛 R3N |
| ANVI | ANVIL |
| | 砧 NC2 |
| ANXI | ANXIOUS |
| | 彩 YE |
| APE- | APE |
| | 狒 493D |
| | 猿 4966 |
| | 猩 49K5 |
| APLA | APLANT |
| | 棵 GKG |
| APOS | APOST |
| | 驛 Y1M |
| APPO | APPOINT |
| | 委 D5H |
| ARBO | ARBOR |
| | 樹 G3J7 |
| ARC- | ARC |
| | 弧 3D5G |
| ARCH | ARCHED |
| | 拱 H282 |
| AREN | ARENA |
| | 壇 E29 |
| ARGO | ARGON |
| | 氬 4H2B |
| ARGU | ARGUE |
| | 辯 73T |
| ARM- | ARM |
| | 肱 R2M |
| | 膀 R4F2 |
| ARMP | ARMPIT |
| | 腋 R3H |
| ARMY | ARMY |
| | 軍 7C25 |
| AROU | AROUSE |
| | 慫 I3BB |
| ARRA | ARRANGE |
| | 訂 TA |
| | 排 H84 |
| | 措 HK2 |
| | 整 484G |
| | 傾 B773 |
| | 臚 R5M |
| | ARRAY |
| | 陣 W7 |
| ARRE | ARREST |
| | 拘 HC27 |
| | 逮 U86 |
| ARRO | ARROW |
| | 弋 3AA |
| | 矢 5DA |
| | 箭 S22 |
| | ARROW HEAD |
| | 鏃 V4F5 |
| ARSE | ARSENIC |
| | 砒 N4L |
| | 砷 N5J |
| ART- | ART |
| | 藝 02B |
| | 術 6BG |
| ARTF | ARTFUL |
| | 猾 49YK |
| ARTI | ARTICLE |
| | 件 B47 |
| AS- | AS |
| | 如 DC |
| ASIF | AS IF |
| | 宛 352K |
| | 若 0C |
| | 彷 3B4F |
| | 彿 3B3D |
| ASCE | ASCEND |
| | 登 5F7 |
| | 躋 7FY7 |
| ASHA | ASHAME |
| | 怍 I16A |
| | 愧 IY4 |
| ASHE | ASHES |
| | 灰 FA1 |
| | 燼 F5M6 |

Table 1 - 2

A

| | |
|---|---|
| ASK- | ASK |
| | 問 CX |
| | 叩 C2K |
| ASPE | ASPEN |
| | 楊 GKA2 |
| | 枸 GC27 |
| ASSE | ASSEMBLE |
| | 聚 6DB |
| | 集 85G |
| ASSE | ASSENT |
| | 俞 2D22 |
| | 肯 R4G |
| ASSI | ASSIST |
| | 佐 B3N |
| | 援 H40 |
| | 贊 7724 |
| | ASSISTANT |
| | 丞 AJ |
| ASSU | ASSUME |
| | 僭 BK4 |
| | 擅 H29A |
| ASTA | ASTAND |
| | 繫 G480 |
| AT- | AT |
| | 于 2B13 |
| ATTA | ATTACK |
| | 伐 B4A |
| | 剿 2236 |
| | 征 3B4G |
| | 抨 H37 |
| | 攻 483N |
| | ATTAIN |
| | 及 2E1 |
| ATTE | ATTEMPT |
| | 企 B4G |
| | ATTEND |
| | 顧 928 |
| AUNT | AUNT |
| | 姑 DC2J |
| | 嬸 D355 |
| AURA | AURA |
| | 氤 4H3C |
| AUTU | AUTUMN |
| | 秋 5HF |
| AVAI | AVAIL |
| | 趁 7A3E |
| AVOI | AVOID |
| | 避 U73 |
| | 免 2422 |
| AWAK | AWAKE |
| | 醒 76K |
| | 悟 IC2 |
| | 寤 354U |
| AWKW | AWKWARD |
| | 笨 SGA |
| AWL | AWL |
| | 錐 V85 |
| AX- | AX |
| | 斧 4J4I |
| AXIS | AXIS |
| | 樞 G2C |
| | 軸 7C5J |

Table 1 - 3

B

B

| | | |
|---|---|---|
| BABY | BABY | |
| | 娃 | DEE |
| BACK | BACK | |
| | 背 | R2L |
| | BACKBONE | |
| | 呂 | CC |
| | 膂 | R4F4 |
| BAD- | BAD | |
| | 劣 | 233S |
| | 壞 | E66 |
| | 敗 | 483S |
| BAG- | BAG | |
| | 囊 | CA6 |
| | 帙 | 3K39 |
| | 袋 | 66B3 |
| | 褚 | 666I |
| BAGG | BAGGAGE | |
| | 輜 | 7C36 |
| BAIT | BAIT | |
| | 餌 | 916D |
| BAKE | BAKE | |
| | 烘 | F28 |
| | 炕 | F292 |
| BALD | BALD | |
| | 禿 | 5H26 |
| BALE | BALE | |
| | 舀 | 6H4 |
| BALL | BALL | |
| | 球 | LJ |
| | 毬 | 4BJ |
| BAMB | BAMBOO | |
| | 竹 | SA |
| | 竺 | S2B |
| | BAMBOO CLAPPERS | |
| | 筊 | S29 |
| | BAMBOO GROVE | |
| | 篁 | S5B |
| | BAMBOO SHOOTS | |
| | 筍 | SK2 |
| BAND | BANDAGE | |
| | 繃 | P344 |
| | BANDIT | |
| | 匪 | 2C8 |
| | BANDITS | |
| | 寇 | 3524 |
| BANK | BANK | |
| | 涯 | J2FE |
| | 畔 | 5J2Z |
| | 陂 | W58 |
| | 隴 | WYL |
| BANN | BANNER | |
| | 幟 | 3K4A |
| | 幡 | 3K5J |
| | 旌 | 4F5I |
| | 蟸 | P4M |
| BARB | BARBARAIN | |
| | 夷 | 393D |
| | 番 | 5J7 |
| BARG | BARGE | |
| | 舶 | 695B |
| BARK | BARK | |
| | 吠 | C49A |
| | BARKLY | |
| | 牟 | 472M |
| BARN | BARN | |
| | 倉 | BC1 |
| BARR | BARREN | |
| | 荒 | 036 |
| BARR | BARRICADE | |
| | 障 | W9 |
| | BARROW | |
| | 壟 | EYL |
| BASK | BASKET | |
| | 籃 | S5M |
| | 筐 | S2C |
| | 簋 | SCC |
| | 簍 | SDK |
| | 簣 | S77C |
| BAT- | BAT | |
| | 蝙 | Q4P |
| | 蝠 | QA5 |
| BATH | BATH | |
| | 澡 | JGC |
| BATH | BATHE | |
| | 浴 | J7K |
| BATR | BATRED | |
| | 仇 | B121 |
| | 讎 | T858 |
| BATT | BATTLE | |
| | 仗 | BA1 |
| BAY- | BAY | |
| | 灣 | J3DT |
| | 隈 | WK5 |
| BE- | BE | |
| | 是 | K5 |
| | 乃 | 16 |
| | 係 | BP |
| BEAC | BEACH | |
| | 汀 | JA13 |
| BEAC | BEACON | |
| | 烽 | F3Q |
| BEAK | BEAK | |
| | 喙 | C3L |
| BEAM | BEAM | |
| | 梁 | GJ2 |
| | 棟 | GGK |
| BEAN | BEAN | |
| | 豆 | 7DA |
| | 荳 | 07D |
| | 豌 | 7D35 |
| BEAR | BEAR | |
| | 熊 | FR |
| | 負 | 771 |
| | 耐 | 6R3 |
| | 揹 | HR2 |
| | 孳 | 3803 |
| | 鬍 | YPR |
| | 鬚 | YP9 |
| BEAT | BEAT | |
| | 打 | HA1 |
| | 捶 | HE16 |
| | 毆 | 4E2 |
| BEAU | BEAUTIFUL | |
| | 美 | 6J3 |
| | 豔 | 7D5 |
| | 婉 | D352 |
| | 妍 | D371 |
| | 娥 | D4A |
| | 媛 | D402 |
| BECK | BECKON | |
| | 招 | HC2 |
| BED- | BED | |
| | 床 | 3FG |
| | 牀 | 4UG |
| | 榻 | GK6 |
| BEDC | BEDCLOTHES | |
| | 被 | 6658 |
| BEE- | BEE | |
| | 蜂 | Q3Q |
| BEER | BEER | |
| | 啤 | C2J1 |
| | 腩 | R2JZ |
| BEG- | BEG | |
| | 求 | JA |
| | 乞 | 12B |
| BEGG | BEGGAR | |
| | 丐 | A2I2 |

Table 1 - 4

B

| | | |
|---|---|---|
| BEGI | BEGIN | |
| | 創 | 22BC |
| | 始 | DC2 |
| | 甫 | 5EA |
| | BEGINING | |
| | 元 | 242 |
| | 朔 | 4R0 |
| BEHE | BEHEAD | |
| | 斬 | 4J7 |
| BEHI | BEHID | |
| | 遁 | U77 |
| BELL | BELL | |
| | 鈴 | VB |
| | 鐸 | VM3 |
| | BELLS | |
| | 鑾 | VT |
| | BELLY | |
| | 肚 | RE |
| | 腹 | R3Q |
| BELO | BELONG | |
| | 屬 | 3PQ |
| BEND | BEND | |
| | 鞠 | 932 |
| BENE | BENEFIT | |
| | 益 | 5M |
| BENE | BENEVOLENCE | |
| BENE | 惠 | IA |
| BERR | BERRY | |
| | 莓 | 04M |
| BERY | BERYLLIUM | |
| | 鈹 | V58 |
| BEST | BESTOW | |
| | 捨 | H6EB |
| BETE | BETEL | |
| | 檳 | G7 |
| | 榔 | G74 |
| BETW | BETWEEN | |
| | 介 | B141 |
| BIG- | BIG | |
| | 大 | 39 |
| BILL | BILLOW | |
| | 濤 | J3I3 |
| | 瀾 | JXG |
| BIN- | BIN | |
| | 囤 | 3C3T |
| BIND | BIND | |
| | 捆 | H3CG |
| | 綑 | P3C |
| | 綁 | P74 |
| | 繳 | P485 |
| BIND | BIND UP | |
| | 紮 | PG1 |
| BIRC | BIRCH | |
| | 樺 | G02J |
| BIRD | BIRD | |
| | 鳥 | YN |
| | BIRD CRY | |
| | 鳴 | YNC |
| | BIRD SONG | |
| | 嚶 | CD7 |
| BISM | BISMUTH | |
| | 鉍 | VI1 |
| BITE | BITE | |
| | 咬 | C29 |
| | 啖 | CFF |
| | 啃 | CR4 |
| | 噬 | CS |
| BITT | BITTER | |
| | 辛 | 73 |
| | 苦 | OC2 |
| | 楚 | G56 |
| | 醇 | 766C |
| BLAC | BLACK | |
| | 黑 | YOA |
| | 黧 | Y022 |
| | 黔 | YOBA |
| | 黝 | YO3M |
| | 皂 | 5BA1 |
| | BLACK HORSE | |
| | 驪 | Y1YA |
| | BLACK SILK | |
| | 緇 | P36 |
| BLAD | BLADDER | |
| | 膀 | R4F2 |
| | 胱 | R243 |
| | BLADDER DISEASE | |
| | 淋 | JGG |
| | BLADE | |
| | 刃 | 2215 |
| BLAM | BLAME | |
| | 謫 | T29C |
| | 訶 | TCA |
| | 誚 | TR3 |
| BLAZ | BLAZENG | |
| | 煌 | F5B |
| BLEA | BLEAK | |
| | 淒 | JDA |
| BLES | BLESSDRESS | |
| | 祉 | 5K4G |
| BLES | BLESSINGS | |
| | 福 | 5K5 |
| | 禧 | 5KC3 |
| BLIN | BLIND | |
| | 盲 | M29 |
| | 瞎 | M35 |
| | 瞽 | MY5 |
| | BLINK | |
| | 眨 | M16 |
| | 瞬 | M6Q |
| BLOC | BLOCK | |
| | 塞 | E35 |
| BLOO | BLOOD | |
| | 血 | 6H |
| BLOW | BLOW | |
| | 吹 | C4C |
| | 颳 | 966 |
| BLUE | BLUE | |
| | 碧 | NL |
| | 藍 | 05M |
| BLUI | BLUISH GREEN | |
| | 翠 | 6F2J |
| BLUS | BLUSH | |
| | 怩 | I3P |
| | 赧 | 7E2E |
| BOAR | BOARD | |
| | 板 | G2E |
| | 版 | 4T2E |
| BOAS | BOAST | |
| | 誇 | T392 |
| | 侘 | B352 |
| BOAT | BOAT | |
| | 船 | 69 |
| | 舟 | 69A |
| | 艇 | 693U |
| | 杭 | G292 |
| BODY | BODY | |
| | 身 | 7G |
| | 體 | YK |
| | 軀 | 7G2 |
| | 躬 | 7G3D |
| BOIL | BOIL | |
| | 煮 | F6I |
| | 沸 | F3D1 |
| | 燉 | F482 |
| | 熬 | F48L |
| | 煲 | FBC |
| BOLT | BOLT | |
| | 鍵 | V3 |
| | 閂 | XA |

Table 1 - 5

B

| | | |
|---|---|---|
| BOLT | BOLT UPRIGHT | |
| | 屹 | 341 |
| BOND | BOND | |
| | 契 | 3922 |
| BONE | BONE | |
| | 骨 | YKA |
| BOOK | BOOK | |
| | 書 | 4K6 |
| | 冊 | 2A2 |
| | 卷 | 2K2 |
| | BOOK WORM | |
| | 蛀 | Q15 |
| | 蠹 | QQA |
| BOOS | BOOSPANK | |
| | 笞 | SC2M |
| BOOT | BOOTS | |
| | 靴 | 932L |
| | BOOTY | |
| | 贓 | 774A |
| BORD | BORDER | |
| | 域 | E4AC |
| | 際 | W5 |
| BORN | BORN | |
| | 誕 | T3U |
| | 生 | 5I |
| BORR | BORROW | |
| | 借 | BK2 |
| BOSO | BOSOM | |
| | 懷 | I66 |
| | 匈 | 272H |
| BOSS | BOSS | |
| | 闆 | XCCC |
| BOTH | BOTH | |
| | 倆 | B2D |
| | 兼 | 2828 |
| BOTT | BOTTLE | |
| | 瓶 | 5C0 |
| | BOTTOM | |
| | 底 | 3F4S |
| BOUD | BOUDOIR | |
| | 閨 | XEE |
| BOUN | BOUNDARY | |
| | 疆 | 3DAA |
| | 界 | 5JB |
| BOW- | BOW | |
| | 弓 | 3DA |
| BOWC | BOW CASE | |
| | 韔 | YEA |
| BOWE | BOWELS | |
| | 腑 | R3FB |
| BOWL | BOWL | |
| | 砠 | N35 |
| | 碗 | BA2 |
| BOX- | BOX | |
| | 匣 | 2C5 |
| | 盒 | 5MC |
| | 箱 | SM |
| BOY- | BOY | |
| | 僮 | B5L7 |
| BRAA | BRAAD | |
| | 展 | 3F |
| BRAC | BRACELET | |
| | 鐲 | VQ |
| | 釧 | V36 |
| BRAH | BRAHMA | |
| | 梵 | GG26 |
| BRAI | BRAID | |
| | 辮 | Y6 |
| | BRAIN | |
| | 腦 | R3 |
| BRAM | BRAMBLE | |
| | 枳 | GC28 |
| BRAN | BRANCH | |
| | 支 | 4X |
| | 派 | J7 |
| | 枝 | G4X |
| | 岔 | 3422 |
| | 柯 | GCA |
| | BRAND | |
| | 烙 | FC3 |
| BRAV | BRAVE | |
| | 勇 | 235 |
| | 驍 | Y1E |
| | 騂 | Y1K |
| | 驃 | Y15K |
| BREA | BREAK | |
| | 折 | H4J |
| | 挫 | HEB |
| | 斷 | 4J3 |
| | 破 | N5 |
| | BREAST | |
| | 胸 | R272 |
| | 膺 | R3F8 |
| | 臆 | RI9 |
| | BREATHE | |
| | 呼 | C16A |
| BREE | BREED | |
| | 滋 | J03M |
| | 餵 | 914K |
| BREW | BREW | |
| | 醞 | 765 |
| | 釀 | 766 |
| BRIB | BRIBE | |
| | 賄 | 774R |
| | 賂 | 77C3 |
| BRIC | BRICK | |
| | 磚 | N3J |
| BRID | BRIDESMAID | |
| | 媵 | D3D2 |
| | BRIDGE | |
| | 橋 | GCC |
| | BRIDLE | |
| | 勒 | 239 |
| BRIG | BRIGH CLOUDY | |
| | 霽 | 88T |
| | BRIGHT | |
| | 明 | K4 |
| | 亮 | 292 |
| | 輝 | 7C24 |
| | 皎 | 5B2 |
| | 燗 | FX |
| | 耿 | 6DF |
| | 昭 | KC |
| | 朗 | 4R6 |
| | 炯 | FC2 |
| | 熙 | F68 |
| | 晟 | K4A |
| | 賁 | 772J |
| BRIL | BRILLIANCY | |
| | 絢 | P773 |
| | BRILLIANT | |
| | 彩 | 3E7 |
| | 煥 | F39 |
| | 燦 | F67 |
| | 耀 | 6F2 |
| BROA | BROAD | |
| | 闊 | XJ |
| BROC | BROCADE | |
| | 錦 | V3K |
| BROI | BROIL | |
| | 炙 | F4R |
| BROK | BROKEN | |
| | 碎 | N2J |
| | BROKER | |
| | 儈 | B4K |
| | 掮 | HR4 |
| BROO | BROOKLET | |
| | 澗 | JXK |

Table 1 - 6

B

| | |
|---|---|
| BREW | BREW |
| | 醞 765 |
| | 酿 766 |
| BRIB | BRIBE |
| | 賄 774R |
| | 賂 77C3 |
| BRIC | BRICK |
| | 磚 N3J |
| BRID | BRIDESMAID |
| | 娣 D3D2 |
| | BRIDGE |
| | 橋 GCC |
| | BRIDLE |
| | 勒 239 |
| BRIG | BRIGH CLOUDY |
| | 霽 88T |
| | BRIGHT |
| | 明 K4 |
| | 亮 292 |
| | 輝 7C24 |
| | 皎 5B2 |
| | 爛 FX |
| | 耿 6DF |
| | 昭 KC |
| | 朗 4R6 |
| | 炯 FC2 |
| | 熙 F68 |
| | 晟 K4A |
| | 賁 772J |
| BRIL | BRILLIANCY |
| | 縉 P773 |
| | BRILLIANT |
| | 彩 3E7 |
| | 煥 F39 |
| | 燦 F67 |
| | 耀 6F2 |
| BROA | BROAD |
| | 闊 XJ |
| BROC | BROCADE |
| | 錦 V3K |
| BROI | BROIL |
| | 炙 F4R |
| BROK | BROKEN |
| | 碎 N2J |
| | BROKER |
| | 儈 B4K |
| | 掮 HR4 |
| BROO | BROOKLET |
| | 澗 JXK |
| BROO | BROOM |
| | 箒 3K3L |
| | 彗 3L1 |
| BROT | BROTHER |
| | 兄 24C |
| | 哥 CCA |
| | 弟 3D28 |
| | BROTHERLY |
| | 悌 I3D |
| BRUT | BRUTAL |
| | 兇 242H |
| BUBB | BUBBLE |
| | 湧 J23 |
| | 涌 J5E2 |
| BUCK | BUCKET |
| | 桶 G5E |
| | BUCKTOOTH |
| | 獠 493S |
| | BUCK WEED |
| | 萍 0J37 |
| BUD- | BUD |
| | 萌 0K4 |
| | 芽 04Y |
| | 蓓 0CB5 |
| | 蕾 088 |
| BUDD | BUDDHA |
| | 佛 B3D |
| | BUDDING |
| | 茁 02H |
| BUIL | BUILD |
| | 建 3U |
| | 築 SG3 |
| | 構 G2A |
| BULL | BULL |
| | 牯 47C2 |
| | BULLET |
| | 彈 3DC |
| | BULLY |
| | 霸 889 |
| BURE | BUREAU |
| | 局 3PC |
| BURN | BURN |
| | 燃 FF4 |
| | 燒 FE2 |
| | 焚 FGG |
| | 熾 F4A |
| | 燙 FJK |
| | 灼 F271 |
| | 燎 F3S3 |
| | 熘 F5J7 |
| BURN | BURNING |
| | 炎 FF |
| | 烈 F22 |
| | BURNING MOXA |
| | 灸 F16B |
| BURS | BURST |
| | 拆 E4J1 |
| BURY | BURY |
| | 埋 E7 |
| | 葬 03G4 |
| BUSH | BUSHEL |
| | 斛 754 |
| BUSI | BUSINESS |
| | 務 235A |
| BUSY | BUSY |
| | 忙 I29 |
| | 碌 NJ |
| BUT- | BUT |
| | 但 BK |
| | 只 C28 |
| | 舍 6EB |
| BUTC | BUTCHER |
| | 屠 3P6I |
| BUTT | BUTT |
| | 牴 474S |
| | 鬢 75Q |
| | BUTTERFLY |
| | 蝴 QRC |
| | 蝶 QG |
| | BUTTOCKS |
| | 臀 R4E |
| | BUTTON |
| | 鈕 VA2 |
| | 釦 VC |
| BUY- | BUY |
| | 沽 JC2J |
| | 購 772A |
| | 買 77M |

Table 1 - 7

C

C

| | |
|---|---|
| CABI | CABIN |
| | 艙 G9B |
| | CABINCT |
| | 閣 XC3 |
| CABL | CABLE |
| | 纜 P7J |
| CACK | CACKLING |
| | 喔 C3P6 |
| CADM | CADMIUM |
| | 鎘 VY |
| CAGE | CAGE |
| | 籠 SYL |
| CAKE | CAKE |
| | 糕 676J |
| | 餅 910 |
| CALA | CALABASH |
| | 葫 ORC |
| | 瓠 5G39 |
| | 匏 2739 |
| CALC | CALCIUM |
| | 鈣 VA |
| | CALCULATE |
| | 算 S3G |
| | 撰 H5F3 |
| CADR | CADRON |
| | 鑊 V08 |
| CALE | CALENDAR |
| | 曆 K2F |
| CALF | CALF |
| | 犢 477 |
| CALK | CALK |
| | 錮 V3CC |
| CALL | CALL |
| | 叫 C14 |
| | 喊 CC4A |
| | 喚 C392 |
| | 稱 5H40 |
| | 請 TR |
| | CALLOUS |
| | 胼 R371 |
| | 胝 R4S |
| CALT | CALTROP |
| | 茨 04C |
| CALY | CALYX |
| | 苞 0273 |
| CAME | CAMEL |
| | 駱 Y1C3 |
| | 駝 Y135 |
| CAMP | CAMP |
| | 營 FC |
| CAN- | CAN |
| | 可 C[illegible] |
| | 克 [illegible]42J |
| | 罐 6G0 |
| CANA | CANAL |
| | 漕 J4KA. |
| CANC | CANCEL |
| | 刪 222A |
| CANC | CANCER |
| | 癌 543 |
| CAND | CANDLE |
| | 燭 FQ |
| CANE | CANE |
| | 藤 SJ4 |
| CANG | CANGUE |
| | 枷 G23C |
| CANN | CANNON |
| | 炮 F27 |
| | 砲 N27 |
| | 典 284 |
| CAP- | CAP |
| | 彝 3G3 |
| CAPI | CAPITAL |
| | 京 293S |
| | 都 74 |
| | 資 77 |
| CAPT | CAPTIVE |
| | 俘 B384 |
| CAR- | CAR |
| | 車 7C |
| CARB | CARBON |
| | 碳 NF |
| CARE | CAREFUL |
| | 仔 B38 |
| | 懇 I4E |
| | 謹 TOL |
| | CARELESS |
| | 怠 IC2M |
| CARP | CARP |
| | 鯉 YF7 |
| | CARPET |
| | 毯 4BF |
| CARR | CARRY |
| | 攜 H34 |
| | 帶 3KA |
| CART | CART |
| | 輛 7CA |
| CARV | CARVE |
| | 劃 225J |
| | 彫 3EC |
| | 雕 85C |
| CASC | CASCADE |
| | 瀑 JKJ |
| CASE | CASE |
| | 套 398 |
| | 櫃 G2C7 |
| | 橢 G773 |
| CASH | CASH |
| | 錢 7H4 |
| CASS | CASSIA |
| | 桂 GEE |
| CAST | CAST |
| | 銃 V241 |
| | 鋳 V3I |
| | CAST LOTS |
| | 占 2IC |
| | CASTRATE |
| | 閹 X39 |
| CAT- | CAT |
| | 貓 7B0 |
| CATC | CATCH |
| | 捕 H5E |
| | 捉 H7F |
| | 餂 916E |
| CATE | CATERPILLAR |
| | 蜀 QM |
| | 螟 Q25 |
| | 蛉 QB2 |
| CATT | CATTY |
| | 斤 4JA |
| | 觔 7523 |
| CAUS | CAUSE |
| | 因 3C3 |
| | 俾 B2J5 |
| CAUT | CAUTIOUS |
| | 慎 IM2 |
| CAVE | CAVE |
| | 穴 55A |
| CAVI | CAVITY |
| | 腔 R55 |
| CEAS | CEASE |
| | 偃 B2C |
| | 戢 4AC6 |
| CELE | CELEBRATE |
| | 慶 I3F |
| | 祝 5K2 |
| | CELERY |
| | 芹 04J |
| | 蒔 0733 |

Table 1 - 8

C

CENT CENTER
央 392
CENTIPEDE
蜈 QC3
蚣 Q28
CERE CERE
禮 5K7
儀 B6J
CERI CERIUM
鈽 V3KA
CERT CERTAIN
某 G5N
CHAF CHAFF
糠 673F
CHAI CHAIN
鍊 VG
鏈 VU
CHAIR
椅 G39C
CHAN CHANGE
變 TP
化 2LB
渝 J2D
CHAN CHANT
誦 T5E
哦 C4AH
CHAO CHAOS
沌 J3T
CHAP CHAPTER
篇 S4P
CHAR CHARCOAL
炭 F34
CHARG FALSELY
誣 T3NB
CHARIOT
輦 7C39
輿 7C6
CHARMING
嫣 DFA
媗 DFB
媚 DM
CHAS CHASE
追 U16
趕 7AK
嗔 C66C
貞 772I
CHAT CHATTER
喇 C22G
嗝 C6D

CHEA CHEAP
賤 774A
CHEAT
欺 4C2
CHEE CHEEK
頰 9239
CHEERFUL
愉 I23D
CHEESE
酪 76C3
CHER CHERRY
櫻 GD7
CHES CHESS
棋 G285
CHESTNUT
栗 G6C
CHEW CHEW
咀 CA2
嚼 C40
CHIC CHICKEN
雞 8502
CHIE CHIEF
酋 7628
魁 Y44
CHIL CHILD
孩 382
兒 246
童 5L7
孺 388
孥 38D2
CHIN CHIN
頤 9268
CHINA
磁 NO
CHINAROOT
茯 OB4
CHINESS
漢 J03
CHIR CHIRP
噪 CGC
啾 C7C3
CHIS CHISEL
鑿 V4E
CHOK CHOKE
噎 C3I7
哽 C4K
鯁 YF4K
CHOL CHOLERA
痧 54J3

CHOO CHOOSE
揀 HGC
諏 T2E
CHOP CHOP
剁 22G2
砍 N4C
CHOP STICKS
筷 SI3
CHOR CHORD
弦 3D5
CHRO CHROMIUM
鉻 VC3Q
CHRONIC DIEASE
痼 543C
CHRY CHRYSANTHEMUM
菊 027
CHUY CHUYSAILS
蛹 Q5E
CICA CICADA
蟬 QCC
CIRC CIRCLE
環 LM
CIRCUIT
寰 35M
CITY CITY
城 E4A
CLAM CLAM
蛤 QCB
蜊 Q22
蜆 Q7J
蟹 Q7I
CLAMOR
譁 T02J
CLAN CLAN
閥 XB4
CLAS CLASP
挾 H39B
CLASS
班 LL
幫 3K3J
倫 BB2A
類 926
儕 BY7
CLASSIFY
彙 3L
CLAW CLAW
爪 40A

C

| | |
|---|---|
| CLEA | CLEAN |
| | 潔 JP |
| | 淘 J276 |
| | 汰 J391 |
| | 廓 3F74 |
| | CLEANSE |
| | 滌 JGB |
| | CLEAR |
| | 清 J8 |
| | 澈 J48R |
| | 澄 J5F |
| | 晰 KG4 |
| | 瀏 J22V |
| | 著 06 |
| | 瞭 M3S |
| CLEV | CLEVER |
| | 聰 6DI3 |
| | 巧 3NA |
| | 俐 B225 |
| CLIF | CLIFF |
| | 崖 342F |
| | 巖 34CC |
| CLIM | CLIMB |
| | 攀 HGG |
| CLOC | CLOCK |
| | 鐘 V5L7 |
| CLOD | CLOD |
| | 塊 EY4 |
| CLOS | CLOSE |
| | 合 CB |
| | 封 3JEE |
| | 密 3534 |
| | 關 X3 |
| | 閉 XH |
| | CLOSET |
| | 櫥 G3F3 |
| CLOT | CLOTH |
| | 布 3KA1 |
| | 衣 66A |
| | 服 4R2E |
| | 裳 663S |
| CLOU | CLOUDED |
| | 曖 KI4 |
| | CLOUDY |
| | 陰 WB2 |
| | 雲 882 |
| | 曇 K88 |
| CLOW | CLOWN |
| | 丑 A22 |
| CLUB | CLUB |
| | 棍 GK4 |
| | 棒 G39 |
| CLUE | CLUE |
| | 結 PGI |
| CLUM | CLUMSY |
| | 拙 H2H |
| CLUS | CLUSTER |
| | 朵 G26 |
| | 簇 S4F |
| COAL | COAL |
| | 煤 FG5 |
| COAR | COARSE |
| | 糙 67U |
| COAT | COAT |
| | 襖 6639 |
| COBA | COBALT |
| | 鈷 VC2J |
| COCK | COCK |
| | 雞 6FE |
| | COCKROACH |
| | 蟑 Q98 |
| | 螂 Q74 |
| COCO | COCONUT |
| | 椰 G746 |
| | COCOON |
| | 繭 OPQ |
| COFF | COFF |
| | 咖 C23C |
| | COFFIN |
| | 棺 G351 |
| | 柩 G2CB |
| | 櫬 G7JB |
| COIL | COIL |
| | 縈 PFF |
| COLD | COLD |
| | 冷 2G |
| | 凜 2G5H |
| | 寒 352G |
| COLL | COLLAPSE |
| | 坍 E152 |
| | 垮 E39 |
| | COLLAR |
| | 領 92B |
| | COLLATE |
| | 勘 235N |
| | COLLEAGUE |
| | 寮 353S |
| | 僚 B3S3 |
| | 寅 3528 |
| | COLLECT |
| | 儲 BT6 |
| | 葑 05J5 |
| | 蒐 OY4 |
| | 斂 48BB |
| | 撮 H77 |
| | 糾 P14 |
| COLO | COLONIZE |
| | 拓 HN |
| | COLOR |
| | 色 6S |
| COLT | COLT |
| | 駒 Y1C2 |
| COMB | COMB |
| | 梳 G36 |
| | 櫛 GS2 |
| COME | COME |
| | 來 BB |
| | COME ACROSS |
| | 遇 U75 |
| | 逅 UC2F |
| | COMET |
| | 孛 382J |
| COMM | COMMANDMENT |
| | 誡 T4A3 |
| | COMMEND |
| | 褒 66B |
| | COMMENT |
| | 評 T37 |
| | COMMISSION |
| | 佣 B5EA |
| COMP | COMPANION |
| | 伴 B2J2 |
| | COMPANY |
| | 曹 4KA |
| | COMPARE |
| | 比 4L |
| | 較 7C2 |
| | COMPASSION |
| | 憫 IX4 |
| | 恤 I6N |
| | COMPEL |
| | 迫 U5B |
| | COMPETE |
| | 競 5L5 |
| | 賽 7735 |
| | COMPILE |
| | 輯 7CC |
| | COMPLY |
| | 遂 U782 |

Table 1 - 10

C

| | |
|---|---|
| | COMPOSE |
| | 撰 H302 |
| | COMPREHENSIVE |
| | 综 P35 |
| COMR | COMRADE |
| | 儔 B3J3 |
| CONC | CONCAVE |
| | 凹 2HA |
| | CONCEAL |
| | 隱 WI |
| | 藏 068 |
| | 瞞 MO |
| | CONCERN |
| | 慮 I6K |
| | CONCUBINE |
| | 妾 D5L |
| | 妃 D30 |
| | 姬 D68 |
| COND | CONDITION |
| | 况 J24C |
| | CONDOLE |
| | 弔 3D14 |
| CONF | CONFER |
| | 頒 9222 |
| | CONFINE |
| | 困 3CG |
| | CONFORM |
| | 符 SB |
| | CONFUCIUS |
| | 孔 3812 |
| | CONFUSE |
| | 淆 JR1 |
| | 迷 U67 |
| | CONFUSED |
| | 纷 P22 |
| | 紊 P4QA |
| | 眩 M59 |
| | 徨 3B5B |
| CONG | CONGEL |
| | 粥 673 |
| | 糜 67Y |
| | 糊 91RC |
| | 罵 Y86 |
| | CONGEAL |
| | 凝 2G5 |
| COLL | COLLECT |
| | 匯 OP5 |
| CONN | CONNECT |
| | 紹 PC2 |
| CONQ | CONQUER |
| | 勝 234 |
| CONS | CONSIDER |
| | 惟 I85 |
| | CONSOLE |
| | 慰 I3J |
| | CONSTANT |
| | 常 3K3 |
| | 恒 I2 |
| | CONSTIPATION |
| | 痞 54CA |
| | CONSTITUTION |
| | 憲 I35 |
| | CONSULT |
| | 諮 TC4C |
| CONT | CONTAIN |
| | 含 CBA |
| | 容 357K |
| | 涵 J2H |
| | 盛 5M4 |
| | CONTEND |
| | 訟 T28 |
| | CONTINENT |
| | 洲 J361 |
| | CONTINUE |
| | 續 P7 |
| | CONTRARY |
| | 反 2E2 |
| | CONTROL |
| | 控 H55 |
| | 管 S |
| | 束 GC |
| CONV | CONVENIENT |
| | 便 BAK |
| | 凸 2H2 |
| COOK | COOK |
| | 烹 J29 |
| | 飪 913I |
| | 炊 F4C |
| COOL | COOL |
| | 涼 J29 |
| COPI | COPIOUS |
| | 沛 J3K |
| COPP | COPPER |
| | 銅 VC2 |
| COPY | COPY |
| | 拷 H6I |
| | 印 2K |
| | 抄 H3S1 |
| | 繕 PC6 |
| | 謄 TRO |
| | COPY BOOK |
| | 帖 3KC |
| CORA | CORAL |
| | 珊 L2A |
| | 瑚 LR |
| CORD | CORD |
| | 纽 PA2 |
| CORN | CORNELIAN |
| | 瑪 LY1 |
| | 瑙 L363 |
| | CORNER |
| | 陬 W2E6 |
| | 隅 W57 |
| CORO | COROLLA |
| | 葩 O5B |
| CORP | CORPSE |
| | 尸 3PAA |
| | 屍 3P4D |
| CORR | CORRODE |
| | 蝕 Q9 |
| | CORRUPT |
| | 弊 3G4 |
| COST | COSTUME |
| | 装 663 |
| COTT | COTTAGE |
| | 墅 E7H1 |
| | COTTON |
| | 棉 G3K |
| | 绵 P3K5 |
| | 絮 PDC |
| COUG | COUGH |
| | 咳 C29B |
| | 嗽 C4CG |
| | 嗆 CBC |
| COUN | COUNTRY |
| | 鄉 743 |
| | COUNTY |
| | 縣 P3S |
| COUP | COUPLE |
| | 伉 B292 |
| COUR | COURSE |
| | 論 TB |
| COUT | COUTT |
| | 廷 3U3 |
| COVE | COVER |
| | 遮 U3F |
| | 蓋 O5M2 |
| | 掩 H39 |
| | 蔽 048 |

Table 1 - 11

C

| | |
|---|---|
| | COVET |
| | 覬 6JJ |
| | 覦 7J7D |
| CRAB | CRAB |
| | 螃 Q4F |
| | 蟹 Q7 |
| CRAC | CRACK |
| | 裂 6622 |
| CRAF | CRAFTY |
| | 狡 4929 |
| | 黠 YOC |
| CRAM | CRAMPED |
| | 褊 664P |
| CRAN | CRANE |
| | 鶴 YN8 |
| CRAS | CRASHING |
| | 訇 T27 |
| CRAT | CRATE |
| | 簏 SMP |
| CRAW | CRAWL |
| | 爬 4030 |
| | 匍 275E |
| | 匐 27A5 |
| | CRAWLING |
| | 蝸 Q8 |
| CREA | CREAK |
| | 呀 C4Y |
| CRED | CREDIT |
| | 賒 77B5 |
| CREE | CREEK |
| | 溪 J39 |
| | CREEPER |
| | 葛 OK2 |
| CRIC | CRICKET |
| | 蟋 QI7 |
| | 蟀 Q59 |
| | 蛐 Q4K |
| CRIM | CRIME |
| | 愆 I6B |
| | 辜 73C |
| | CRIMINAL |
| | 犯 492 |
| | CRIMSON |
| | 絳 P351 |
| CRIP | CRIPPLE |
| | 瘸 54R2 |
| CROC | CROCO-DILE |
| | 鱷 YFC |
| CROO | CROOKED |
| | 曲 4K1 |
| | 跼 7F3P |
| CROP | CROPS |
| | 禾 5HA |
| | 秈 5H34 |
| CROS | CROSBOW |
| | 弩 3DD |
| | CROSSBAR |
| | 杠 G3N |
| | 軾 7C3A |
| | CROSSWISE |
| | 橫 GY |
| CROW | CROW |
| | 鴉 YN4Y |
| | CROWD |
| | 擠 HY7 |
| | 眾 MB |
| | CROWING |
| | 雊 85C2 |
| | CROWN |
| | 冕 2A24 |
| CRUE | CRUEL |
| | 悍 IK3 |
| | 狠 496T |
| | 虐 6K3 |
| | 酷 76C |
| CRUM | CRUMB |
| | 屑 3PR |
| CRUP | CRUPPER |
| | 紂 P3J |
| CRUX | CRUX |
| | 癥 543B |
| CRY- | CRY |
| | 哭 C49 |
| | 啼 C3K2 |
| | 嚎 C782 |
| | 啕 C276 |
| | 啾 C5HF |
| CRYS | CRYSTALLINE |
| | 晶 KKK |
| CUCK | CUCKOO |
| | 鵑 YNCR |
| CUFF | CUFFS |
| | 梏 GC4 |
| CULT | CULTIVATE |
| | 培 EC |
| CUP- | CUP |
| | 杯 GA1 |
| | 匜 5C2 |
| | 盞 5M4A |
| | 觴 75B |
| | 鋌 V7H |
| CURD | CURD |
| | 酥 765H |
| CURE | CURED |
| | 痊 542D |
| CURL | CURL |
| | 蜷 Q5J |
| | CURLED |
| | 踡 7F2Z |
| | CURLY |
| | 鬈 YP2K |
| CURR | CURRENT |
| | 溜 J5J2 |
| CURS | CURSE |
| | 咒 C26 |
| | 詛 T2A |
| CURT | CURTAIN |
| | 幢 3K5L |
| | 幕 3K0 |
| | 帳 3K8 |
| | 帷 3K85 |
| | 幃 3K9 |
| CURV | CURVE |
| | 迴 U3C |
| | CURVEP |
| | 彎 3DT |
| CUSH | CUSHION |
| | 墊 EE1 |
| CUT- | CUT |
| | 切 22A1 |
| | 割 2235 |
| | 刎 2227 |
| | 剁 225K |
| | 鍘 V227 |
| CUTE | CUT EAR |
| | 馘 994 |
| CUTO | CUT OPEN |
| | 剖 22C5 |
| | CUT OUT |
| | 剜 2235 |
| | 裁 66E |
| CUTT | CUT THROAT |
| | 剄 223N |
| CYAN | CYANOGEN |
| | 氰 4H8 |
| CYMB | CYMBALS |
| | 鈸 V2E |
| CYPR | CYPRESS |
| | 檜 ,G4K |
| | 柏 G5B |

Table 1 - 12

D

| | | |
|---|---|---|
| DAIN | DAINTIES | |
| | 肴 | R1 |
| | 餚 | 9130 |
| DAMA | DAMAGE | |
| | 損 | HC7 |
| DAME | DAME | |
| | 嫠 | DJ |
| | 媚 | D5H |
| | 娓 | D2C |
| DAMP | DAMP | |
| | 霉 | 884M |
| DANC | DANCE | |
| | 舞 | 6Q |
| | 姿 | DJ3 |
| | DANCERS | |
| | 佾 | B284 |
| DANG | DANGER | |
| | 危 | 2K1 |
| | 險 | VBB |
| | 岌 | 342E |
| DARE | DARE | |
| | 敢 | 486 |
| DARK | DARK | |
| | 暗 | K9 |
| | 黯 | Y09 |
| | 冥 | 25K |
| | 玄 | 59 |
| | 昧 | KGA |
| | 瞀 | MOM |
| | 闇 | S98 |
| | DARK BROWN | |
| | 黎 | YC2 |
| | DARK RED | |
| | 緋 | P84 |
| DATE | DATE | |
| | 棗 | GG2A |
| DAWN | DAWN | |
| | 夙 | 3H26 |
| | 曉 | KE2 |
| | 昕 | K4J |
| DAY- | DAY | |
| | 辰 | 7IA |
| DAYB | DAY BREAK | |
| | 旦 | KA |
| DAYL | DAY LILY | |
| | 萱 | 0352 |
| DAYT | DAYTIME | |
| | 晝 | K6A |
| DAZZ | DAZZLE | |
| | 炫 | F59 |
| DEAD | DEAD | |
| | 斃 | 4D48 |
| DEAF | DEAF | |
| | 聾 | 6DY |
| DEAR | DEARTH | |
| | 餧 | 910L |
| DEBT | DEBT | |
| | 債 | B77L |
| DECA | DECADE | |
| | 秩 | 5H39 |
| | DECADENT | |
| | 靡 | 84Y |
| DECE | DECEASED | |
| | 妣 | D4L |
| DECE | DECEIVE | |
| | 詭 | T2K |
| | 詐 | T16A |
| | 謾 | T4K |
| | 詑 | T121 |
| | 騙 | Y14P |
| DECI | DECIDE | |
| | 決 | J3 |
| | 謀 | TYO |
| | 讞 | T496 |
| | DECIDEDLY | |
| | 絕 | P6 |
| DECL | DECL | |
| | 卻 | 2K7 |
| | 郤 | 747 |
| DECR | DECREE | |
| | 命 | CB2 |
| | 旨 | K2L |
| | 勅 | 239 |
| DEEP | DEEP | |
| | 深 | JG2 |
| | 浚 | J2M3 |
| | 湛 | J5N |
| | 窪 | 55J |
| | 窨 | 55C4 |
| | DEEP RED | |
| | 絳 | P3Q |
| DEER | DEER | |
| | 鹿 | YAA |
| | DEER'S HORN | |
| | 茸 | 06D |
| DEFA | DEFAME | |
| | 詆 | T4S |
| DEFE | DEFEAT | |
| | 敗 | 487 |
| | DEFECT | |
| - | 疵 | 544L |
| | DEFEND | |
| | 保 | BCG |
| | 捍 | HK3 |
| | 防 | W4 |
| | DEFICIENT | |
| | 歉 | 4C28 |
| | 绌 | P2H |
| DEFI | DEFILE | |
| | 涅 | JKE |
| | 黷 | Y07 |
| DEFO | DEFORMITY | |
| | 琦 | 5J39 |
| DEGR | DEGRADE | |
| | 貶 | 7716 |
| | 黜 | Y02H |
| | DEGREE | |
| | 度 | 3F2 |
| DEJE | DEJECT | |
| | 惆 | I2A |
| DELA | DELAY | |
| | 航 | 7G25 |
| DELI | DELICACIES | |
| | 饈 | 916J |
| | DELICATE | |
| | 嬌 | DCC |
| | 纖 | P4AB |
| | 緻 | P6L |
| | DELIVER | |
| | 交 | 29 |
| DENS | DENSE | |
| | 叢 | 2EF |
| DEPE | DEPEND | |
| | 怙 | IC2J |
| | 賴 | 77G |
| DEPR | DEPRESSED | |
| | 悶 | IX |
| DEPU | DEPUTY | |
| | 副 | 22A5 |
| DESC | DESCENDENT | |
| | 裔 | 662A |
| DESE | DESERT | |
| | 漠 | JOK |
| DESE | DESERVE | |
| | 該 | T29B |
| DESI | DESIVE | |
| | 慾 | I4C |
| | 欲 | 4C7 |
| | 叨 | C22A |
| | 冀 | 282L |

Table 1 - 13

D

| | |
|---|---|
| DESK | DESK |
| | 桌 G3 |
| DESP | DESPAIRED |
| | 悵 3K8 |
| DEST | DESTROY |
| | 毀 4EE |
| | 滅 J4AF |
| | 摧 H348 |
| | 剋 2224 |
| DETA | DETAILS |
| | 詳 T6J |
| DETE | DETECT |
| | 偵 B772 |
| DEVI | DEVIL |
| | 魔 Y4Y |
| | 魅 Y4G |
| DEVO | DEVOUT |
| | 虔 6K4 |
| DIAP | DIAPHRAGM |
| | 膈 RY8 |
| DICE | DICE |
| | 骰 YK4 |
| DIE- | DIE |
| | 死 4D2 |
| | 亡 2912 |
| | 歿 4D4E |
| DIEF | DIE FOR |
| | 殉 4DK |
| DIEY | DIE YOUNG |
| | 殤 4DB |
| DIEN | DIENT |
| | 順 92 |
| DIFF | DIFFERENT |
| | 異 5J2 |
| | DIFFICULT |
| | 難 850 |
| DIG- | DIG |
| | 掏 H276 |
| | 掘 H3P2 |
| DIGN | DIGNITY |
| | 祚 5K16 |
| DIKE | DIKE |
| | 堤 EK5 |
| | 壩 E88 |
| | 隄 WK5 |
| DILI | DILIGENT |
| | 勤 230 |
| | 孜 3848 |
| DIM- | DIM |
| | 瀅 J02 |
| | 朦 RO2 |
| | 曚 M5L |
| | 黴 M48 |
| DIMP | DIMPLE |
| | 靨 942 |
| DIN- | DIN |
| | 嘩 C02J |
| DIRE | DIRECT |
| | 直 07 |
| DIRT | DIRTY |
| | 垢 EC2 |
| | 汙 J2B |
| | 邋 U363 |
| | 遢 UKG |
| | 骯 YK2 |
| | 髒 YKO |
| DISA | DISAPPOING |
| | 軻 7CCA |
| | DISASTER |
| | 災 F36 |
| | 禍 5KC |
| DISC | DISCIPLE |
| | 徒 3B7 |
| | DISCLOSE |
| | 訐 T37A |
| | DISCUSS |
| | 議 T6 |
| DISE | DISEASE |
| | 病 54 |
| | 疾 545 |
| | 痛 545E |
| | 症 544 |
| | 癆 5423 |
| DISG | DISGRACE |
| | 忝 I391 |
| | 辱 7I3 |
| DISH | DISH |
| | 盤 5M6 |
| | 盎 5M3 |
| DISL | DISLIKE |
| | 厭 2F4 |
| | 嫌 D28 |
| DISO | DISOBEY |
| | 逆 U03 |
| | 違 U95 |
| | DISORDER |
| | 亂 124 |
| | 訌 T3N |
| DISP | DISPATCH |
| | 牒 4TG |
| - | DISPERSE |
| | 散 48R |
| | DISPLAY |
| | 擺 HMR |
| | 緬 P5J7 |
| | 陳 W |
| | DISPUTE |
| | 爭 401 |
| | 駁 Y14V |
| | DISPATION |
| | 俳 B84 |
| DISS | DISSOLVE |
| | 溶 J357 |
| DIST | DISTANCE |
| | 距 7F3N |
| | DISTANT |
| | 疏 563 |
| | 遠 U66 |
| | 遙 U6G |
| | 遼 U3S |
| | 彌 3D4 |
| | 攸 48B1 |
| | DISTINGUISH |
| | 辨 731 |
| | DISTRESS |
| | 怛 IKA |
| | 疚 541 |
| | DISTURB |
| | 騷 Y1Q |
| DITC | DITCH |
| | 坑 E292 |
| | 溝 J2A |
| DIVI | DIVIDE |
| | 分 222 |
| | DIVINATION |
| | 卦 2IE |
| | DIVINE |
| | 乩 12C |
| | 巫 S3N |
| | DIVISION |
| | 畀 57K |
| DO- | DO |
| | 作 B1 |
| | 做 B4 |
| | 辦 732 |
| | DO EVIL |
| | 倀 B89 |
| DOCK | DOCK |
| | 塢 ·EF |

Table 1 - 14

D

| | | |
|---|---|---|
| DOCT | DOCTOR | |
| | 醫 | 764 |
| DOCU | DOCUMENT | |
| | 劄 | 22S |
| DOG- | DOG | |
| | 犬 | 49A |
| | 狗 | 49C |
| DOGW | DOG WOOD | |
| | 茱 | 0GB |
| | 萸 | 06HB |
| DOME | DOMESTIC ANI-MALS | |
| | 畜 | 5J5 |
| DONE | DONE | |
| | 已 | 30A |
| DONK | DONKEY | |
| | 驢 | Y15M |
| DOOR | DOOR | |
| | 門 | X |
| | 戶 | 4PA |
| | 扉 | 4P8 |
| | DOOR KEEPER | |
| | 閽 | XK4 |
| | DOOR POST | |
| | 臬 | 60G |
| DOSE | DOSE | |
| | 劑 | 22Y |
| DONT | DON'T | |
| | 勿 | 271 |
| DOT- | DOT | |
| | 點 | Y02 |
| DOUB | DOUBLE | |
| | 倍 | BC5 |
| | 複 | 663Q |
| | 貳 | AA2 |
| | 雙 | 852 |
| | DOUBT | |
| | 疑 | 56 |
| | 惑 | I4A |
| DOVE | DOVE | |
| | 鴿 | YNCB |
| DOWN | DOWN | |
| | 下 | A2I |
| | 氅 | 4B48 |
| DOZE | DOZE | |
| | 寐 | 354U |
| DRAG | DRAG | |
| | 摟 | HDK |
| | 拗 | H3M |
| | 耙 | 6P3 |
| DRAG | DRAGON | |
| | 龍 | YL |
| | DRAGON FLY | |
| | 蜻 | Q87 |
| | 蜓 | Q3U |
| DRAI | DRAIN | |
| | 渠 | GJ3 |
| | 瀉 | JF6 |
| | 畎 | 5J49 |
| DRAK | DRAKE | |
| | 鴛 | YN2K |
| | 鴦 | YN39 |
| DRAM | DRAMA | |
| | 戲 | 4A6 |
| DRAW | DRAW | |
| | 抽 | H5J |
| | 汲 | J2E1 |
| | 繪 | P4K |
| | DRAWER | |
| | 屜 | 3P3B |
| | DRAWING | |
| | 畫 | 5J6 |
| DREA | DREA | |
| | 夢 | 3H0 |
| | 憚 | ICC |
| DRED | DREDGE | |
| | 撈 | H23 |
| | 濬 | JM2I |
| DREG | DREGS | |
| | 糟 | 674K |
| | 粕 | 675B |
| DRES | DRESS | |
| | 扮 | H22 |
| | DRESS UP | |
| | 粧 | 673F |
| DRIN | DRINK | |
| | 飲 | 914C |
| | 啜 | C2E2 |
| DRIP | DRIP | |
| | 淋 | JGG |
| DRIV | DRIVE | |
| | 駕 | Y12 |
| | 馭 | Y12E |
| | 驅 | Y12C |
| | 御 | 3B2K |
| DROP | DROP | |
| | 滴 | J29C |
| DROU | DROUGHT | |
| | 旱 | K37 |
| DROW | DROWN | |
| - | 溺 | J3D3 |
| DRUM | DRUM | |
| | 鼓 | Y5 |
| | 擂 | H88 |
| DRUN | DRUNK | |
| | 醉 | 762J |
| | 酗 | 762H |
| | 酩 | 76C3 |
| | 酊 | 76A1 |
| | 醺 | 76F1 |
| DRY- | DRY | |
| | 乾 | 122 |
| | 燥 | FGCC |
| | DRY BONE | |
| | 骸 | YK29 |
| | DRY UP | |
| | 涸 | J3CC |
| DUCK | DUCK | |
| | 鴨 | YN5 |
| | 鶩 | YN48 |
| DULL | DULL | |
| | 呆 | CG |
| | 鈍 | V3T |
| | 蒙 | 025 |
| | 懵 | IOM |
| | 悱 | I84A |
| DUMB | DUMB | |
| | 啞 | C2BC |
| DUMP | DUMPLINGS | |
| | 餃 | 9129 |
| | 飩 | 913T |
| | 粽 | 6735 |
| | 糰 | 673C |
| DUSK | DUSK | |
| | 塵 | EY |
| | 埃 | E5D |
| | 昏 | K4S |
| | 拭 | H3A |
| DUTY | DUTY | |
| | 任 | B3I1 |
| | 職 | 6D4 |
| DWEL | DWELL | |
| | 居 | 3PC2 |
| DXYG | DXYGEN | |
| | 氧 | 4H6 |
| DYE- | DYE | |
| | 染 | GJ1 |
| | 淬 | J2J2 |
| DYSE | DYSENTERY | |
| | 痢 | 5422 |

Table 1 - 15

E

E

| | |
|---|---|
| EACH | EACH |
| | 各 C30 |
| | 每 4ME |
| EAR- | EAR |
| | 耳 6DA |
| | EAR OF GRAIN |
| | 穗 5HIA |
| EARL | EARLY |
| | 早 K2J |
| EARN | EARN |
| | 賺 7728 |
| | EARNEST |
| | 怦 I37 |
| | 肫 R3T |
| EART | EARTH |
| | 土 EA |
| | 坤 E5J |
| | EARTHWORK |
| | 堡 EBC |
| | EARTHWORM |
| | 蚯 QA4 |
| | 蚓 Q3D |
| EASE | EASE |
| | 逸 U242 |
| EAST | EAST |
| | 東 GK |
| EASY | EASY |
| | 易 K2 |
| | 豫 781 |
| EAT- | EAT |
| | 吃 C12 |
| | 喫 C392 |
| | 茹 ODC |
| | 食 91 |
| | 餔 915 |
| EAVE | EAVES |
| | 簷 ST |
| EEL- | EEL |
| | 鱔 YFC6 |
| | 鰻 YF4K |
| EFFO | EFFORT |
| | 劭 23C2 |
| EGG- | EGG |
| | 蛋 Q5 |
| EGGP | EGG PLANT |
| | 茄 O23C |
| EGRE | EGRET |
| | 鷺 YN7 |
| | 鷥 YNP |
| EIGH | EIGHT |
| | 八 08 |
| | 捌 AA8 |
| ELAS | ELASTIC |
| | 韌 9522 |
| ELBO | ELBOW |
| | 肘 R3J |
| ELEG | ELEGANT |
| | 雅 854 |
| | 郁 744R |
| | 嫻 DW |
| | 娜 D74 |
| ELEP | ELEPHANT |
| | 象 78 |
| ELEV | ELEVATED |
| | 崢 3440 |
| | 嶸 34GF |
| | ELEVENTH |
| | 戌 4AB |
| ELLI | ELLIPTIC |
| | 橢 GW |
| ELM- | ELM |
| | 榆 G2D2 |
| EOLQ | EOLQUENT |
| | 佞 BD2 |
| EMBA | EMBARRASSED |
| | 尷 3F5 |
| | 尬 3FB |
| | 窘 55C3 |
| EMBR | EMBRACE |
| | 抱 H27 |
| | EMBROIDER |
| | 繡 P6A |
| | EMBROIDERED |
| | 黼 Y65 |
| EMIN | EMINENT |
| | 卓 2J2I |
| EMPE | EMPEROR |
| | 皇 5BL |
| | 帝 3K2 |
| | 宸 357I |
| EMPT | EMPTY |
| | 空 55 |
| | 虛 6K3 |
| | 寥 356F |
| | 罄 N4E |
| | 伋 B2E1 |
| ENAM | ENAMEL |
| | 琺 LJ2 |
| | 釉 795 |
| ENCO | ENCOFFIN |
| | 殮 4D7 |
| | ENCOUNTER |
| | 遭 U4K |
| | ENCOURAGE |
| | 勵 232 |
| | 勗 K23 |
| END- | END |
| | 终 P2G |
| | 端 5L6 |
| ENDE | ENDEAVOR |
| | 勉 2324 |
| ENEM | ENEMY |
| | 敵 48C |
| ENGA | ENGAGE |
| | 聘 6D5 |
| ENGR | ENGRAVE |
| | 刻 2229 |
| | 鏤 VD |
| | 鐫 V85 |
| ENJO | ENJOIN |
| | 叮 CA13 |
| | ENJOY |
| | 享 293 |
| ENOU | ENOUGH |
| | 夠 3HC |
| | 敷 484F |
| ENTE | ENTER |
| | 入 2D |
| | ENTERTAIN |
| | 酬 7636 |
| ENTI | ENTICE |
| | 蠱 Q5M |
| ENTR | ENTRAILS |
| | 臟 RO |
| ENTW | ENTWINE |
| | 纏 P3F |
| ENUM | ENUMERATE |
| | 列 224 |
| ENVY | ENVY |
| | 嫉 D54 |
| EQUA | EQUAL |
| | 侔 B472 |
| ERAD | ERADICATE |
| | 拔 H2E |
| ERCK | ERCKON |
| | 籌 S3I |
| ERRO | ERROR |
| | 過 UC |
| | 錯 VK |

16

Table 1 - 16

| | |
|---|---|
| | 纽 P4LA |
| | 謬 TGF |
| ESCA | ESCAPE |
| | 竄 55Y |
| ESPE | ESPECIALLY |
| | 尤 3R1 |
| ESSA | ESSAY |
| | 章 982 |
| ESSE | ESSENCE |
| | 精 67 |
| ESTA | ESTABLISH |
| | 設 T4E |
| ESTI | ESTIMATE |
| | 估 BC2J |
| | 揣 H6R |
| | 掂 H3FC |
| ETER | ETERNAL |
| | 永 J1 |
| ETHE | ETHER |
| | 醚 76U |
| EURO | EUROPE |
| | 歐 4C2C |
| EVEN | EVEN |
| | 均 E27 |
| | 匀 272 |
| | EVENING |
| | 晚 K24 |
| | 晦 K4M |
| EVER | EVERYWHERE |
| | 徧 3B4P |
| EVIL | EVIL |
| | 凶 2H1 |
| | 惡 I2B |
| | 患 I14C |
| | 祟 5K2H |
| | 閔 X4Q |
| EXAG | EXAGGERATE |
| | 渲 J352 |
| EXAL | EXALTED |
| | 崇 3435 |
| EXAM | EXAMINE |
| | 檢 GBB |
| | 察 355 |
| | 驗 Y1B |
| | 究 5512 |
| | 診 T3E |
| | 覈 6C4 |
| | 甄 6CE |
| EXAM | EXAMPLE |
| | 例 B224 |
| | 鍇 V5 |
| EXCE | EXCEED |
| | 逾 UB2 |
| | EXCELLENT |
| | 妙 D3S |
| | 瓊 L3Q |
| | 韶 98C2 |
| | EXCEPT |
| | 除 WB |
| EXCH | EXCHANGE |
| | 兌 2428 |
| | 換 H3 |
| EXCI | EXCITE |
| | 煽 F4P |
| | 慌 I036 |
| | 激 J48 |
| EXCL | EXCLAMATION |
| | 啊 CW |
| | 唉 C5D |
| | 喲 CP |
| | 哉 CE4 |
| EXCR | EXCREMENT |
| | 屎 3P67 |
| EXCU | EXCUSE |
| | 諒 T29 |
| EXER | EXERT |
| | 懋 IGG |
| EXHA | EXHAUST |
| | 竭 5LK |
| | 盡 5MF |
| | 逞 UC3 |
| | 泯 J4S |
| EXHO | EXHORT |
| | 誥 TC4 |
| EXPA | EXPAND |
| | 擴 H3F |
| EXPE | EXPECT |
| | 盼 M22 |
| | EXPEL |
| | 撥 H5F |
| | 摒 H3P0 |
| | 擯 H773 |
| | 斥 4J1 |
| | 逐 U78 |
| | EXPENSE |
| | 費 773 |
| | EXPERIENCE |
| | 歷 4G2 |
| EXPL | EXPLAIN |
| | 解 75 |
| | 詮 TBL |
| | 誥 TC4 |
| | EXPLODE |
| | 炸 F16 |
| EXPO | EXPOUND |
| | 闡 XCCK |
| | EXPOSE |
| | 暴 KJ |
| EXPR | EXPRESS |
| | 抒 H13 |
| | EXPRESSION |
| | 詞 TC1 |
| | 辭 734 |
| EXTE | EXTEND |
| | 佈 B3K |
| | 申 5J1 |
| | 覃 6CK |
| | EXTENDING |
| | 迤 U12B |
| | EXTENSIVE |
| | 博 2J3 |
| EXTR | EXTRA |
| | 閏 XL |
| | EXTRA HORSE |
| | 駙 Y1B3 |
| | EXTRAVAGANT |
| | 豪 782 |
| | 奢 396 |
| | 侈 B3H |
| | EXTREMELY |
| | 極 G2B |
| | 劇 226K |
| EXUB | EXUBERANT |
| | 葳 0D4 |
| | 茂 04A |
| | 蕤 078 |
| EYE- | EYE |
| | 眼 M6 |
| | 目 M |
| EYEB | EYEBROW |
| | 眉 M3P |
| EYEL | EYELASHES |
| | 睫 MA5 |

Table 1 - 17

F

| | | |
|---|---|---|
| FACE | FACE | |
| | 脸 | RB |
| | 貌 | 7B |
| | 颜 | 923E |
| FACT | FACTORY | |
| | 厰 | 3F4 |
| FADE | FADE | |
| | 凋 | 2GC2 |
| | 褪 | 6GU6 |
| FAIL | FAILURE | |
| | 虧 | 6K2B |
| FAIR | FAIR | |
| | 秀 | 5H1 |
| | FAIRY | |
| | 仙 | B34 |
| FAIT | FAITH | |
| | 信 | BT |
| | FAITHFUL | |
| | 侃 | BC36 |
| | 恪 | IC3 |
| FALC | FALCON | |
| | 鷹 | YN3 |
| FALL | FALL | |
| | 倒 | B22 |
| | 仆 | B2I |
| | 伏 | B49 |
| | 墜 | EW7 |
| | 落 | OJC |
| | 隕 | WC7 |
| | 降 | W3Q |
| FALS | FALSE | |
| | 假 | B2E |
| | 偽 | B40 |
| | 妄 | D2 |
| | 訛 | T2L |
| | 謊 | T03 |
| FAMA | FAMALE UNI-CORN | |
| | 麟 | YA6 |
| FAME | FAME | |
| | 譽 | T6H |
| FAMI | FAMILY | |
| | 族 | 4F5 |
| | 氏 | 4SA |
| | 眷 | M28 |
| | 閨 | M5M |
| | FAMINE | |
| | 饑 | 913H |
| FAN- | FAN | |
| | 扇 | 4P6 |
| FAR- | FAR | |
| | 悠 | I48 |
| | 迂 | U2B |
| | 遠 | U66 |
| | FAR AWAY | |
| | 迢 | UC22 |
| | 逖 | U49F |
| | FAR OFF | |
| | 遐 | U2E3 |
| | 邈 | U7B |
| FARM | FARMSTED | |
| | 莊 | 03I |
| FASH | FASHION | |
| | 尚 | 3SC |
| FAST | FASTEN | |
| | 緊 | P4E |
| | 縻 | PY3 |
| FAT- | FAT | |
| | 肥 | R30 |
| | 胖 | R2J2 |
| | 脂 | RK2 |
| | 肪 | R4F |
| | 驃 | 852A |
| FATA | FATA | |
| | 肓 | R291 |
| FATH | FATHER | |
| | 父 | 4I |
| | 爸 | 4I3 |
| | 爹 | 4I3H |
| | 考 | 6IA |
| | FATHOM | |
| | 沁 | JI |
| FATT | FATTEN | |
| | 殖 | 4DM |
| FAVO | FAVOR | |
| | 恩 | I3C |
| | 寵 | 35Y |
| | FAVORITE | |
| | 嬖 | D73 |
| FEAR | FEAR | |
| | 懼 | IMM |
| | 怕 | I5B |
| | 慄 | I5H2 |
| | 惶 | I5BL |
| | 畏 | 5JA1 |
| | FEARFUL | |
| | 恐 | I3N |
| | 悚 | IGC |
| | 怔 | I4G |
| FEAS | FEAST | |
| | 宴 | 35K |
| | 犒 | 47Y |
| FEAT | FEATHER | |
| | 羽 | 6FA |
| FEEB | FEEBLE | |
| | 孱 | 383P |
| FEED | FEED | |
| | 哺 | C5E |
| | 飼 | 91C |
| | 餵 | 91D5 |
| FEEL | FEEL | |
| | 感 | IC |
| | 覺 | 7J6 |
| | 捫 | HX |
| FEET | FEET | |
| | 腳 | R2K |
| FELI | FELICITOUS | |
| | 瑞 | L6 |
| | FELICITY | |
| | 祥 | 5K6 |
| FELT | FELT | |
| | 氈 | 4B29 |
| FEMA | FEMALE | |
| | 女 | DA |
| | 牝 | 472L |
| | 雌 | 854G |
| FENC | FENCE | |
| | 籬 | S85 |
| | 笆 | S30 |
| | 柵 | G2A2 |
| | 藩 | OJ5 |
| | 閑 | XG |
| FENN | FENNEL | |
| | 茴 | 03CC |
| FERM | FERM | |
| | 麴 | YM2 |
| FERR | FERRY | |
| | 渡 | J3F |
| | 津 | J6A |
| FERT | FERTILE | |
| | 沃 | J391 |
| FETT | FETT | |
| | 縲 | PP5 |
| FETU | FETUS | |
| | 胚 | RA1 |
| FEW- | FEW | |
| | 寡 | 3522 |
| | 少 | '3S1 |

Table 1 - 18

F

| | | |
|---|---|---|
| FIBE | FIBER | |
| | 紘 | P8 |
| FIE- | FIE | |
| | 嚌 | CCC3 |
| FIEL | FIELD | |
| | 田 | 5KA |
| | 場 | EK |
| FIFT | FIFTH | |
| | 戊 | 4A16 |
| FIGH | FIGHT | |
| | 挨 | H393 |
| | 鬥 | YD |
| | 鬦 | YD2 |
| FIGU | FIGURE | |
| | 圖 | 3CCC |
| | FIGURED SILK | |
| | 綺 | P39 |
| FILE | FILE | |
| | 伍 | AA5 |
| | 剉 | 22EB |
| | 銼 | VEB |
| | FILES | |
| | 檔 | G5J |
| FILL | FILL | |
| | 塡 | EM |
| | 充 | 2924 |
| FILM | FILM | |
| | 膜 | ROK |
| | 翳 | 6F4E |
| FINE | FINE | |
| | 好 | D3 |
| | 晴 | K8 |
| | FINE HORSE | |
| | 駿 | Y12M |
| | FINE RICE | |
| | 粲 | 672E |
| FING | FINGER | |
| | 指 | HK |
| FINI | FINISH | |
| | 完 | 352 |
| | 畢 | 5J2J |
| | 既 | 4W |
| | 竟 | 5L2 |
| | FINISHED | |
| | 了 | 13 |
| | 訖 | T12 |
| FIRE | FIRE | |
| | 火 | F |
| | FIFE-WOOD | |
| | 柴 | G4G |
| | FIREFLY | |
| | 烇 | OF |
| FIRM | FIRM | |
| | 堅 | EG |
| | 固 | 3CC2 |
| | 穩 | 5HI |
| | 歸 | H6 |
| FIRS | FIRST | |
| | 初 | 226 |
| | 先 | 241 |
| | 甲 | 5JAA |
| FISH | FISH | |
| | 漁 | JYF |
| | 魚 | YF |
| | FISH GLUE | |
| | 鰾 | YF5K |
| | FISHLINE | |
| | 綸 | PB2 |
| FISS | FISSURE | |
| | 隙 | W3S |
| FIST | FIST | |
| | 拳 | HO |
| FITS | FITS | |
| | 癲 | 5492 |
| | 癇 | 54XK |
| FIVE | FIVE | |
| | 五 | 05 |
| FLAG | FLAG | |
| | 旗 | 4F28 |
| | 徽 | 3B48 |
| FLAM | FLAME | |
| | 燄 | F6 |
| FLAS | FLASH | |
| | 閃 | XB |
| FLAT | FLATTER | |
| | 諂 | T6H2 |
| | 諛 | T6HB |
| | 諿 | T4L |
| | 阿 | WC |
| FLAW | FLAW | |
| | 玷 | L2I |
| | 瑕 | L2E |
| FLEA | FLEA | |
| | 蚤 | Q2 |
| FLEE | FLEE | |
| | 逃 | U24 |
| FLES | FLESH | |
| | 肉 | RA |
| FLIC | FLICKERING | |
| | 憧 | I5L |
| | 憬 | IK29 |
| FLIN | FLINT | |
| | 燧 | FU |
| FLOA | FLOAT | |
| | 漂 | J5K |
| | 浮 | J38 |
| | 泛 | J16 |
| | 汎 | J261 |
| | FLOATING | |
| | 飄 | 965 |
| FLOG | FLOG | |
| | 拷 | H6I |
| | 撻 | HUE |
| FLOO | FLOOD | |
| | 洪 | J28 |
| | 泛 | J16 |
| | 潦 | J3S3 |
| FLOU | FLOUR | |
| | 麵 | YM9 |
| | FLOURSHING | |
| | 殷 | 4E1 |
| FLOW | FLOW | |
| | 流 | J36 |
| | 滔 | J6H |
| | FLOW OF WATER | |
| | 泓 | J3DZ |
| | FLOWER | |
| | 花 | 02 |
| | 英 | 03 |
| FLUO | FLUORINE | |
| | 氟 | 4H3D |
| FLUT | FLUTED | |
| | 笛 | S5J |
| | FLUTE | |
| | 簫 | S6A1 |
| | 龠 | YJ |
| | FLUTTER | |
| | 翩 | 6F4P |
| FLY- | FLY | |
| | 飛 | 9A |
| | 蠅 | QY |
| FLYD | FLY DOWN | |
| | 頏 | 9224 |
| FLYI | FLYING SQUI- | |
| | 鼯 | YSC RREL |
| FOAM | FOAM | |
| | 泡 | J27 |
| | 沫 | JGA |

F

| | |
|---|---|
| FODD | FODDER |
| | 秣 5HGA |
| FOG- | FOG |
| | 霧 8823 |
| FOLD | FOLD |
| | 摺 H6F |
| | 疊 5JA2 |
| FOLI | FOLIAGE |
| | 葉 0G |
| FOLL | FOLLOW |
| | 循 3BM |
| | 遵 U3J |
| | 隨 VU |
| FOND | FONDNESS |
| | 嬌 D2A |
| FOOD | FOOD |
| | 飯 912 |
| | 糧 677 |
| FOOL | FOOL |
| | 獃 497D |
| | FOOLISH |
| | 傻 B3Q |
| | 呆 CG |
| | 憨 I486 |
| FOOT | FOOT |
| | 尺 3P1 |
| | 脚 R2K2 |
| | 足 7F |
| | FOOT OF HILL |
| | 麓 YAG |
| FOR- | FOR |
| | 為 40 |
| FORB | FORBID |
| | 禁 5KG |
| FORC | FORCE |
| | 勢 23E |
| | 逼 UA5 |
| FORE | FOREARM |
| | 臂 R73 |
| | FOREHEAD |
| | 額 9235 |
| | FOREST |
| | 林 GG |
| | FORETELL |
| | 卜 2IA |
| FORG | FORGE |
| | 鍛 V4E1 |
| | FORGET |
| | 忘 I291 |
| FORK | FORK |
| | 丫 14V |
| | 叉 152E |
| | FORKED |
| | 歧 4G4X |
| FORM | FORM |
| | 形 3E |
| | 式 3A |
| FORT | FORTUNATE |
| | 倖 B37 |
| | 祺 5K28 |
| FOUN | FOUNDATION |
| | 基 E2 |
| | 礎 NG |
| | 垠 E6TA |
| FOUR | FOUR |
| | 四 04 |
| | 肆 AA4 |
| | FOURTH |
| | 丁 A13 |
| FOWL | FOWL |
| | 禽 57B |
| | 雞 853 |
| FOX- | FOX |
| | 狐 495 |
| | 狸 497H |
| FRAG | FRAGMENT |
| | 瑣 L77 |
| | FRAGRANCE |
| | 芬 022 |
| | 芳 04F |
| | FRAGRANT |
| | 馨 974 |
| | 馥 973 |
| FRAM | FRAME |
| | 架 G23 |
| | 框 G2CL |
| | 格 GC3 |
| FREE | FREEZE |
| | 凍 2GG |
| FRES | FRESH |
| | 鮮 YF6 |
| FRIE | FRIEND |
| | 朋 4R4 |
| | 友 2EA |
| | FRIENDLY |
| | 睦 MEE |
| FRIG | FRIGHTEN |
| | 怖 I3K |
| | 慄 IG6 |
| | 驚 Y14 |
| | 駭 Y129 |
| FRIN | FRINGE OF CAP |
| | 蕤 078 |
| FROG | FROG |
| | 蛙 QEE |
| | 蟆 QOK |
| FROM | FROM |
| | 自 60 |
| | 從 3BB |
| | 由 5J |
| FRON | FRONT |
| | 前 220 |
| | FRONTIER |
| | 陲 VE1 |
| FROS | FROST |
| | 霜 88M |
| FRUI | FRUIT |
| | 果 KG |
| FRY- | FRY |
| | 煎 F220 |
| | 炒 F3S |
| FUEL | FUEL |
| | 薪 04 |
| FULL | FULL |
| | 滿 JO |
| | 飽 9127 |
| | 彌 J3D4 |
| FUMB | FUMBLE |
| | 摸 HF4 |
| FUR- | FUR |
| | 毬 4B4 |
| FURG | FUR GARMENT |
| | 裘 66J |
| FURN | FURNACE |
| | 爨 F6H |
| | FURNITUTRE |
| | 傢 B35 |
| FUSE | FUSE |
| | 煬 FKA |
| FUSI | FUSION |
| | 熔 F35 |

Table 1 - 20

G

| | | | |
|---|---|---|---|
| GAIT | GAIT | | |
| | | 態 | IR |
| GALL | GALL | | |
| | | 腟 | RT |
| | GALLEY | | |
| | | 舫 | 694F |
| | GALLOP | | |
| | | 馳 | Y112 |
| | | 騁 | Y15 |
| | | 駑 | Y15A |
| GAMB | GAMBLE | | |
| | | 賭 | 776I |
| GARD | GARDEN | | |
| | | 園 | 3C6 |
| | | 圃 | 3C5 |
| | | 畦 | 5JEE |
| GARL | GARLIC | | |
| | | 蒜 | 05K5 |
| GATE | GATE | | |
| | | 闘 | X6H |
| GATH | GATHER | | |
| | | 攝 | H6D |
| | | 攢 | H92 |
| | | 湊 | J39A |
| GAY- | GAY | | |
| | | 奐 | 3916 |
| GAZE | GAZE | | |
| | | 眺 | M24 |
| | | 矚 | M3PQ |
| | | 瞪 | M5F |
| GEM- | GEM | | |
| | | 玲 | LB2 |
| | | 琊 | L744 |
| | | 瓏 | LYL |
| | | 琉 | L36 |
| | | 琳 | LGG |
| | | 琅 | L6T |
| | | 瑛 | L6J |
| | | 瑤 | L6G |
| | | 瑾 | LOL |
| | | 瑜 | L2D |
| GENE | GENERAL | | |
| | | 將 | 3J4 |
| | | 帥 | 3K4P |
| | GENERATION | | |
| | | 輩 | 7C8 |
| | GENEROUS | | |
| | | 俠 | B39 |
| | | 慷 | I3F8 |
| | | 慨 | I4W |
| GENT | GENTLE | | |
| | | 荏 | OB3 |
| | GENTLEMAN | | |
| | | 郎 | 746T |
| GERM | GERMANIUM | | |
| | | 鍺 | V6IK |
| GET- | GET | | |
| | | 獲 | 490 |
| | | 得 | 3BK |
| GHOS | GHOST | | |
| | | 鬼 | Y4 |
| GIML | GIMLET | | |
| | | 鑽 | V7 |
| GING | GINGER | | |
| | | 薑 | OAA |
| GIRD | GIRDLE | | |
| | | 帶 | 3KA |
| | | 组 | PA |
| GIRL | GIRL | | |
| | | 妞 | DA22 |
| GIVE | GIVE | | |
| | | 給 | PCB |
| | | 予 | 132 |
| | | 與 | 6H |
| | | 貽 | 77C2 |
| | GIVE ALMS | | |
| | | 賙 | 77C2 |
| | | 賑 | 777I |
| GLAN | GLANCE | | |
| | | 瞥 | M4 |
| | | 瞿 | MM8 |
| | | 眇 | M3S1 |
| | | 睥 | M2J5 |
| | | 睨 | M246 |
| | GLANDS | | |
| | | 腺 | RJ |
| GLAR | GLARE | | |
| | | 洛 | JC3 |
| GLAS | GLASS | | |
| | | 玻 | L5 |
| | | 璃 | L57 |
| GLEA | GLEAN | | |
| | | 搴 | SP |
| GLIT | GLITTEL | | |
| | | 璀 | L348 |
| | | 璨 | L67 |
| | | 爍 | FG5B |
| GLOO | GLOOMY | | |
| | | 幽 | 3M3 |
| GLOR | GLORIOUS | | |
| | | 赫 | 7E7E |
| | GLORY | | |
| | | 榮 | GFF |
| GLUE | GLUE | | |
| | | 膠 | R6F |
| GLUT | GLUTINOUS | | |
| | | 糯 | 678 |
| | GLUTTONOUS | | |
| | | 饕 | 916K |
| GNAW | GNAW | | |
| | | 齧 | Y22 |
| GO- | GO | | |
| | | 赴 | 7A2I |
| GOBE | GO BE TWEEN | | |
| | | 媒 | DG5 |
| | | 妁 | D27 |
| GOOU | GO OUT | | |
| | | 出 | 2H |
| GOTO | GO TO | | |
| | | 就 | 3R |
| | | 往 | 3B1 |
| GOBL | GOBLET | | |
| | | 盅 | 5H14 |
| | | 觚 | 755 |
| GOD- | GOD | | |
| | | 神 | 5K |
| GOLD | GOLD | | |
| | | 金 | V |
| | | 鑫 | VVV |
| | | 鈑 | V2E2 |
| GONG | GONG | | |
| | | 鑼 | VMP |
| GOOD | GOOD | | |
| | | 好 | D3 |
| | | 良 | 6T |
| | | 佳 | BE |
| | | 善 | C6 |
| | | 嘉 | C3I2 |
| | | 淑 | 684 |
| | GOODS | | |
| | | 貨 | 772L |
| | | 伙 | BF |
| GOOS | GOOSE | | |
| | | 鵝 | YN4A |
| GORE | GORE | | |
| | | 莪 | 054 |
| GORG. | GORGE | | |
| | | 峽 | 3439 |

Table 1 - 21

G

| | |
|---|---|
| GOUR | GOURD |
| | 瓠 003 |
| GOVE | GOVERN |
| | 尹 3PA |
| | 治 JC |
| | 轄 7C35 |
| | GOVERMENT |
| | 府 3FB |
| | 衙 6BC |
| GRAC | GRACEFUL |
| | 丰 141 |
| | 娉 D5JA |
| | 婷 D292 |
| | 嬈 DE2 |
| | 旖 4F39 |
| | 旎 4F3P |
| | GRACIOUS |
| | 嫺 DXR |
| GRAD | GRADUALLY |
| | 漸 J4J |
| GRAI | GRAIN |
| | 粒 675 |
| | 粟 676 |
| | 穀 5H4E |
| | 稼 5H35 |
| | 稂 5H6T |
| GRAN | GRANARY |
| | 囷 3C5H |
| | 廩 3F5H |
| | GRAND FATHER |
| | 爺 4I6 |
| | GRAND SON |
| | 孫 38P |
| | GRANT |
| | 許 T2 |
| | 賜 77K |
| GRAP | GRAPE |
| | 葡 0275 |
| | 萄 0276 |
| GRAS | GRASH |
| | 摯 HE1 |
| | GRASP |
| | 扼 H2F |
| | 捽 H2J2 |
| | 搦 H3D3 |
| | 握 H3P |
| | 擦 H3S3 |
| | 攫 H7JM |
| | GRASS |
| | 草 OK |
| | GRASS OPPER |
| | 蜢 002 |
| | GRASSY |
| | 菁 087 |
| | 蔚 03J3 |
| | 茲 02J2 |
| | 萋 0DA |
| | 蓁 05HA |
| GRAV | GRAVE |
| | 墳 E77 |
| | 墓 E0K |
| | 塋 EFF |
| | GRAVEL |
| | 礫 NG5 |
| GRAY | GRAY |
| | 蒼 0BC1 |
| | 皤 5B5 |
| GREA | GREASY |
| | 膩 R77 |
| | GREAT |
| | 偉 B9 |
| | 恢 IF |
| | 宏 352M |
| | 莫 0K3 |
| | 孟 385M |
| | 丕 AA16 |
| | 訏 T2B1 |
| GREE | GREEDY |
| | 貪 77BA |
| | 婪 DGG |
| | GREEN |
| | 青 87 |
| | 綠 PJ3 |
| | GREET |
| | 訝 T4Y |
| GRIE | GRIEF |
| | 悲 I84 |
| | 悴 I2J2 |
| | GRIEVANCE |
| | 冤 2524 |
| | GRIEVE |
| | 哀 C66 |
| | GRIEVED |
| | 忉 I22A |
| GRIL | GRILL |
| | 烤 F6IA |
| GRIN | GRIND |
| | 研 N2 |
| | 磨 NYL |
| | 軋 7C12 |
| | GRINDSTONE |
| | 砥 N4S |
| | 礪 N2F |
| GROA | GROAN |
| | 呻 C5J |
| GROU | GROUP |
| | 群 6JC |
| | 隊 W78 |
| GRUB | GRUB |
| | 蝎 QK2 |
| GUAR | GUARD |
| | 盜 933N |
| | 戍 4AB |
| | 扞 H37A |
| GUES | GUESS |
| | 忖 I3JA |
| | 猜 498 |
| | GUEST |
| | 賓 7735 |
| | 客 35C |
| GUIT | GUITAR |
| | 琵 L4L |
| | 琶 L30 |
| GULL | GULL |
| | 睢 H85 |
| | 鷗 YN2C |
| GUMS | GUMS |
| | 齦 Y26 |
| GUN- | GUN |
| | 鎗 VBC |
| GUNW | GUNWALES |
| | 舷 6959 |
| GUSH | GUSH |
| | 沖 J14 |
| | 泌 JI[illegible] |

Table 1 - 22

H

HA- HA
哈 CCB
HABI HABIT
癖 547
HABITUAL
慣 I7
HAG- HAG
偎 B5JK
HAIL HAIL
雹 8827
HAIR HAIR
毛 4B
髮 YP2
髦 YP4
鬃 YP7
HAIR PIN
釵 V2E1
簪 SK4
HALF HALF
半 2J2
HALL HALL
廳 3F6D
堂 E3
HALO HALO
暈 K7C
HALT HALT
躑 7F74
躅 7FQ
HALTER
羈 6M9
鞅 9339
HALTING PLACE
宿 35B
HAMM HAMMER
鎚 VU1
錘 VE
HAMMERING BL-
砧 N2I OCK
HAND HAND
手 H
HANDCUFFS
銬 V6I
HANDFUL
抔 HA16
撮 H4K2
HANDKERCHIEF
帕 3K5
HANDLE
把 H30
柄 GA2A

HANDSOME
俊 B29
HANG HANG
搭 HOC
懸 IP
繫 P5M
HANG UP
掛 H2I
HANM HANMONIZE
洽 JCB
HAPP HAPPY
樂 G5
爽 4V3
HARB HARBOR
澳 J391
HARD HARD
剛 2234
硬 N4
堅 4P47
難 6TO
HARM HARMONIZE
諧 T5B
HARMONY
怡 IC2M
雍 8529
HARN HARNESS
駕 Y12
HARP HARP
瑟 LI
HARS HARSH
苛 OCA
HARV HARVEST
穫 5HO
稔 5HIB
HART HARTEN
趙 7AR
HARTLY
急 I3L
HAT- HAT
冠 25
帽 3K2A
HATC HATCH
孵 382K
孚 384
HATCORD
紘 P2HA
HATE HATE
憎 I4K2
恨 I6T

HATR HATRED
仇 B121
讎 T858
HAUG HAUGHTY
倨 B3PC
HAVE HAVE
有 4RA
HAWK HAWK
隼 852J
HAY- HAY
芻 0272
HAZE HAZEL
榛 H5HA
HE- HE
他 YY
HEAD HEAD
頭 927
首 99
HARDDRESS
幗 3K3C
鈿 V5JA
HEAL HEAL
療 543S
HEALTHY
健 B3U
康 3F8
HEAP HEAP
堆 E8
HEAR HEAR
聽 6DI
聞 6DX
聆 6DB2
HERAT
心 I
衷 66C1
HEAS HEAST
獸 49CC
HEAT HEAT
暑 K6I
溽 J7I3
HEAV HEAVEN
天 A3
HEAVY
重 7H
HEAVY RAIN
滂 J4F2
沱 J35Z
HEDG HEDGCHOG
蝟 QR5

H

| Key | Word | Character | Code |
|---|---|---|---|
| HEEL | HEEL | | |
| | | 跟 | 7F6 |
| | | 踵 | 7F7H |
| HEIR | HEIR | | |
| | | 嗣 | CC1 |
| | | 胤 | R16 |
| HELI | HELIUM | | |
| | | 氦 | 4H29 |
| HELL | HELLO | | |
| | | 喂 | CJ5A |
| HELM | HELM | | |
| | | 舵 | 693 |
| | HELMET | | |
| | | 兜 | 245 |
| | | 盔 | 5MFA |
| | | 胄 | R5J |
| HEM- | HEM | | |
| | | 緣 | P3L |
| HEMP | HEMP | | |
| | | 絽 | P5H3 |
| | | 麻 | Y3 |
| | HEMP FIELD | | |
| | | 疇 | 5J3I |
| HELP | HELP | | |
| | | 助 | 23A |
| | | 協 | 2J23 |
| | | 扶 | H39A |
| | | 侑 | B4R |
| | | 酒 | JY |
| | | 襄 | 66CC |
| | | 輔 | 7C5 |
| HERE | HERE | | |
| | | 茲 | 03M |
| HERO | HERO | | |
| | | 傑 | BG6 |
| | HERON | | |
| | | 鷺 | YN08 |
| HIBE | HIBERNATE | | |
| | | 蟄 | QE |
| HIBI | HIBISCUS | | |
| | | 芙 | 039A |
| | | 蓉 | 035 |
| HIDE | HIDE | | |
| | | 匿 | 2C0 |
| | | 潛 | JK4 |
| | | 遁 | UH2 |
| HIGH | HIGH | | |
| | | 高 | YG |
| | | 崟 | GD3B |
| | | 喬 | CC39 |
| | | 崔 | 348 |
| | HIGH-WATER | | |
| | | 汛 | J122 |
| | HIGHEST | | |
| | | 巔 | 344J |
| HILL | HILL | | |
| | | 岐 | 344X |
| | | 峴 | 347J |
| | | 岑 | 34BA |
| HIND | HIND | | |
| | | 後 | 3B |
| | HINDER | | |
| | | 妨 | D4F |
| | | 掣 | H223 |
| | | 阻 | WA2 |
| | HINDRANCE | | |
| | | 阨 | W2F |
| HING | HINGE | | |
| | | 鉸 | V29 |
| HIRE | HIRE | | |
| | | 傭 | B85 |
| | | 雇 | 854P |
| HIS- | HIS | | |
| | | 他 | YY |
| | | 其 | 285 |
| | | 厥 | 2F4C |
| HIST | HISTORY | | |
| | | 史 | C16 |
| HITC | HITCH | | |
| | | 拴 | H2D |
| HOE- | HOE | | |
| | | 耨 | 6P7 |
| | | 鋤 | V23 |
| HOLD | HOLD | | |
| | | 執 | E15 |
| | | 捧 | H393 |
| | | 持 | H3J |
| | | 撫 | HFB |
| | | 掬 | H276 |
| | | 秉 | 5H3L |
| HOLE | HOLE | | |
| | | 洞 | JC2 |
| | | 窟 | 553P |
| | | 竅 | 554P |
| | | 竇 | 5577 |
| | | 窿 | 55W |
| HOLL | HOLLOW | | |
| | | 刳 | 2239 |
| HOLY | HOLY | | |
| | | 聖 | 6D |
| HOME | HOME | | |
| | | 家 | 35 |
| HONE | HONEST | | |
| | | 廉 | 3F28 |
| | | 敦 | 4829 |
| | | 狷 | 49C4 |
| | HONEY | | |
| | | 蜜 | Q3 |
| HONO | HONORABLE | | |
| | | 尊 | 3J76 |
| HOOF | HOOF | | |
| | | 蹄 | 7F3K |
| HOOK | HOOK | | |
| | | 勾 | 272M |
| | | 釣 | V271 |
| | | 鉤 | VC27 |
| HOOP | HOOP | | |
| | | 箍 | SH2 |
| HOOT | HOOT | | |
| | | 咄 | C2H |
| HOPE | HOPE | | |
| | | 望 | 4R3 |
| HORN | HORN | | |
| | | 角 | 75A |
| | | 觭 | 753 |
| | HORNCUP. | | |
| | | 觥 | 7524 |
| HORR | HORRIBLE | | |
| | | 慘 | I2H |
| HORS | HORSE | | |
| | | 馬 | Y1 |
| HOT- | HOT | | |
| | | 熱 | FE1 |
| HOUN | HOUND | | |
| | | 盧 | 5M6K |
| HOUS | HOUSE | | |
| | | 屋 | 3P6 |
| | | 宅 | 3516 |
| HOW- | HOW | | |
| | | 焉 | FA4 |
| | | 怎 | I16 |
| | | 曷 | K27B |
| | | 豈 | 7D3 |
| HUG- | HUG | | |
| | | 擁 | H85 |

Table 1 - 24

H

| | | |
|---|---|---|
| HUGE | HUGE | |
| | 龐 | 3FY |
| | 巨 | 3H2 |
| HUM- | HUM | |
| | 吟 | CBA1 |
| | 哼 | C291 |
| | 唧 | C2K6 |
| | 嗡 | C6F |
| HUMB | HUMBLE | |
| | 謙 | T282 |
| HUNC | HUNCHBACK | |
| | 佝 | BC27 |
| | 僂 | BD |
| | 傴 | B2CC |
| | 痀 | 54C |
| HUND | HUNDRED | |
| | 百 | 5BA |
| | 佰 | B5BA |
| HUNG | HUNGRY | |
| | 飢 | 9126 |
| | 餓 | 914 |
| HUNT | HUNT | |
| | 佃 | B5JA |
| | HUNTING | |
| | 獵 | 4936 |
| HURR | HURRICANE | |
| | 颱 | 96C |
| | 颶 | 962 |
| | HURRIED-GLANCE | |
| | 瞥 | MM85 |
| | HURRY | |
| | 亟 | 2BC |
| | 遄 | U6R |
| HURT | HURT | |
| | 傷 | BBK |
| HUSB | HUSBAND | |
| | 夫 | 39A |
| HUSK | HUSK | |
| | 殼 | 4E3I |
| HUT- | HUT | |
| | 廬 | 3F5N |
| | 庵 | 3F39 |
| HUUG | HUUGRY | |
| | 餒 | 91D |
| HYDR | HYDROGEN | |
| | 氫 | 4H3 |

Table 1 - 25

I I

| | | |
|---|---|---|
| I- | I.ME | |
| | 我 | 0 |
| | 俺 | B395 |
| | 儂 | B71 |
| | 余 | BGA |
| | 吾 | C2B |
| | 咱 | C60 |
| | 朕 | R390 |
| ICE- | ICE | |
| | 冰 | 2GJ |
| IDIC | IDICULE | |
| | 挪 | H74 |
| IDIO | IDIOT | |
| | 痴 | 5456 |
| IDLE | IDLE | |
| | 惰 | I75 |
| IF- | IF | |
| | 倘 | B3SC |
| | 苟 | OC27 |
| IGNO | IGNORANT | |
| | 倥 | B55 |
| | 侗 | BC2A |
| | 瞭 | MO25 |
| | 矇 | MYL |
| IGUA | IGUANA | |
| | 鬣 | QRC |
| ILLN | ILLNESS | |
| | 恙 | I6J |
| ILLU | ILLUMINE | |
| | 照 | FK |
| | ILLUSION | |
| | 幻 | 3M1 |
| IMAG | IMAGE | |
| | 像 | B78 |
| IMIT | IMITATE | |
| | 仿 | B4F |
| | 倣 | B4F4 |
| | 摹 | HOK3 |
| | 效 | 482 |
| IMME | IMMERSE | |
| | 淹 | J395 |
| IMPE | IMPEACH | |
| | 劾 | 2329 |
| | IMPEDE | |
| | 擋 | H5J3 |
| | 滯 | J3KA |
| | IMPERIAL | |
| | 欽 | 4CV |
| IMPL | IMPLORE | |
| | 懇 | I7B |
| | 懇 | S92 |
| IN- | IN.AT | |
| | 在 | E |
| | 於 | 4F2 |
| INCE | INCESE | |
| | 香 | 97 |
| INCH | INCH | |
| | 吋 | C3J |
| | 寸 | 3JAA |
| INCI | INCITE | |
| | 嗾 | C4F |
| INCL | INCLINED | |
| | 仄 | B2F |
| | INCLOSE | |
| | 括 | H6E |
| INCR | INCREASE | |
| | 增 | E4 |
| | 晉 | K2B2 |
| INCU | INCUR | |
| | 罹 | 6MI |
| INDE | INDECENT | |
| | 狎 | 495J |
| | INDEED | |
| | 確 | N8 |
| INDI | INDIGNANT | |
| | 慍 | I5M |
| | INDIGO | |
| | 靛 | 873 |
| | INDISTINCT | |
| | 恍 | I24 |
| | 惚 | II2 |
| INDO | INDOLENT | |
| | 慵 | I3F6 |
| INDU | INDUGE | |
| | 耽 | 6D25 |
| INFA | INFANT | |
| | 嬰 | D7 |
| INFE | INFERIOR | |
| | 駑 | Y1D |
| INGO | INGOT | |
| | 錠 | V355 |
| | 鋌 | V3U3 |
| INHA | INHALE | |
| | 吸 | C2E |
| INIT | INITIATE | |
| | 肇 | 6A4 |
| INIU | INIURE | |
| | 忮 | I4X |
| INJU | INJURE | |
| | 殘 | 4D4 |
| | 害 | 35C1 |
| INK- | INK | |
| | 墨 | EYO |
| INKS | INKSTONE | |
| | 硯 | N7 |
| INLA | INLA | |
| | 銀 | V66C |
| INQU | INOURE | |
| | 諦 | T3K |
| | 詢 | TK2 |
| INSC | INSCRIB | |
| | 銘 | VC3 |
| INSE | INSECT | |
| | 蟲 | QOQ |
| | INSERT | |
| | 插 | H6H |
| | 揷 | HK2B |
| INSI | INSIDE | |
| | 內 | 2D2 |
| | 裡 | 667 |
| | INSIPID | |
| | 淡 | JFF |
| INSP | INSPECT | |
| | 稽 | 5HK |
| INST | INSTRUCT | |
| | 教 | 483 |
| INSU | INSULT | |
| | 侮 | B4MB |
| | 凌 | 2GE |
| INTE | INTERCEPT | |
| | 截 | 4AE8 |
| | INTEREST | |
| | 趣 | 7A2 |
| | INTERJECTION | |
| | 兮 | BA27 |
| | INTERROGATE | |
| | 訊 | T1 |
| | 詰 | TC3I |
| | INTERROGATIVE | |
| | 呢 | C3P |
| | 嗎 | CY |
| | 歟 | 4C6 |
| | 耶 | 6D7 |
| | INTERRUPT | |
| | 攔 | HXG |
| | INTESTINESS | |
| | 腸 | RK |

Table 1 - 26

I

| | |
|---|---|
| INTR | INTRODUCE |
| | 倡 BKK |
| | INTRUDE |
| | 闖 XY |
| | INTRUST |
| | 託 TJ6 |
| | INTRUSTIVE |
| | 奢 M2I |
| INUN | INUNDATION |
| | 漲 J3D |
| INVA | INVADE |
| | 侵 B2E3 |
| INVE | INVENT |
| | 捏 HKE |
| | INVESTIGATE |
| | 審 355J |
| | 察 355 |
| | 鞫 93T |
| INVI | INVITE |
| | 邀 U48 |
| IODI | IODINE |
| | 碘 N284 |
| IRIS | IRIS |
| | 睛 M87 |
| IRON | IRON |
| | 熨 F3J |
| | 鐵 V4A |
| IRRE | IRREGULAR |
| | 傂 B4L2 |
| | IRREGULAR TEETH |
| | 齟 Y2A |
| | 齬 Y2C2 |
| | IRRESOLUTE |
| | 躊 7F3I |
| | 躇 7F06 |
| IRRI | IRRIGATE |
| | 溉 J4W |
| ISLA | ISLAND |
| | 島 34Y |
| ISLE | ISLE |
| | 渚 J6I |
| | ISLET |
| | 嶼 346 |
| ISSU | ISSUE |
| | 發 5F |
| IT- | IT |
| | 它 352L |
| | 牠 4712 |
| | 者 6IK |
| ITCH | ITCH |
| | 疥 54B1 |
| | 癢 5491 |
| ITEM | ITEM |
| | 項 3N9 |

Table 1 - 27

J

| | | | |
|---|---|---|---|
| JACK | JACKET | JOY- | JOY |
| | 褂 6G2I | | 喜 CC3 |
| JADE | JADE | | 娛 DC3 |
| | 玉 LA | | 欣 4C4 |
| | 璧 L73 | JOYF | JOYFUL |
| | 璇 L4F | | 愷 I7D |
| JAGG | JAGGED | | 暢 K5J |
| | 崎 346Q | JOYO | JOYOUS-CLOTH |
| JAIL | JAIL | | 幛 3K98 |
| | 牢 4735 | JUDG | JUDGE |
| JAR- | JAR | | 判 2228 |
| | 甕 5C8 | JUIC | JUICE |
| | 缶 6GA | | 汁 J2JA |
| | 缸 6G3 | JUMP | JUMP |
| | 罄 6G4 | | 跳 7F24 |
| | 罐 6G0 | | 踴 7F23 |
| | 鬲 Y8 | | 蹦 7F34 |
| JASM | JASMINE | | 踊 7F5E |
| | 茉 0GAA | | 跟 7F6T |
| | 莉 0225 | | 踪 7F55 |
| JASP | JASPER | JUNG | JUNGLE |
| | 瑰 LY | | 蕪 0FB |
| JAUN | JAUNDICE | JUNK | JUNK |
| | 疸 54K | | 舢 6934 |
| | 瘟 54CC | | 舨 6938 |
| JAW- | JAW | JUST | JUST |
| | 腮 RI5 | | 恰 ICB |
| JEAL | JEALOUS | | |
| | 妒 D4P | | |
| | 忌 I30 | | |
| JEWE | JEWEL | | |
| | 珍 L3 | | |
| JGGE | JGGED | | |
| | 峋 34K2 | | |
| JING | JINGLING | | |
| | 鏗 VE6 | | |
| | 鏘 V3J | | |
| JOIN | JOIN | | |
| | 連 U7C | | |
| | 聚 P5J5 | | |
| | 沓 JKAA | | |
| JOKE | JOKE | | |
| | 謔 T6K | | |
| | 諢 T7C | | |
| | 謅 T02 | | |
| JOUR | JOURNEY | | |
| | 程 5HC | | |

Table 1 - 28

| | | |
|---|---|---|
| KEEP | KEEP | |
| | 守 | 353 |
| | 存 | 38A1 |
| KERN | KERNEL | |
| | 核 | G29B |
| KEY- | KEY | |
| | 鑰 | VYJ |
| KIAN | KIANGSI | |
| | 贛 | 7798 |
| KICK | KICK | |
| | 蹴 | 7F3R |
| | 踢 | 7FK |
| KID- | KID | |
| | 羔 | 6JF |
| KIDN | KIDNAP | |
| | 拐 | HC22 |
| KIDN | KIDNEY | |
| | 腎 | R6 |
| KILL | KILL | |
| | 煞 | F48 |
| | 殺 | 4EG |
| KILN | KILN | |
| | 窯 | 556J |
| KIND | KIND | |
| | 樣 | GJ |
| | KINDNESS | |
| | 仁 | B2B |
| | 慈 | I03 |
| KING | KING | |
| | 王 | L |
| | KINGFISHER | |
| | 翡 | 846F |
| | 鴗 | YN5A |
| KISS | KISS | |
| | 吻 | C271 |
| KITC | KITCHEN | |
| | 庖 | 3F27 |
| | 廚 | 3F3J |
| KITE | KITE | |
| | 箏 | S40 |
| | 鳶 | YN3A |
| | 鷂 | YN6G |
| KNEE | KNEE | |
| | 膝 | RGJ |
| | KNEE PAD | |
| | 韍 | Y62 |
| KNIF | KNIFE | |
| | 刀 | 22A |
| KNIT | KNIT | |
| | 織 | 922J |
| KNOB | KNOB | |
| | 疙 | 5412 |
| | 瘩 | 540 |
| KNOC | KNOCK | |
| | 磕 | N5M |
| KNOT | KNOT | |
| | 结 | PC |
| | 缔 | P3K |
| | 節 | S2 |
| KNOW | KNOW | |
| | 認 | TI |
| | 識 | T4 |
| | 知 | 5D |
| | 悉 | I79 |
| KRYP | KRYPTON | |
| | 氪 | 4H24 |

Table 1 - 29

L

| | | |
|---|---|---|
| LABO | LABOR | |
| | 号 | 23F |
| | 劬 | 23C2 |
| | 徭 | 3B6G |
| LACK | LACK | |
| | 乏 | 1G1 |
| | 匱 | 2C7 |
| LADD | LADDER | |
| | 梯 | G3D |
| LADL | LADLE | |
| | 科 | G4N |
| | 瓢 | 5G5 |
| | 杓 | S40A |
| LAKE | LAKE | |
| | 汪 | JL |
| | 湖 | JRC |
| LAMB | LAMB | |
| | 跻 | 7F58 |
| LAME | LAME | |
| | 蹇 | 7F35 |
| | 跫 | 7F48 |
| LAMP | LAMP | |
| | 燈 | F5 |
| LANC | LANCE | |
| | 戈 | 4AA |
| | 戟 | 4A2J |
| LANC | LANCE TIP | |
| | 鋒 | V3Q |
| LAND | LAND | |
| | 陸 | WE |
| | 地 | E1 |
| | LAND TAX | |
| | 賦 | 774G |
| | LANDSLIDE | |
| | 崩 | 344 |
| LANE | LANE | |
| | 巷 | 300 |
| | 坊 | E4F |
| LANG | LANGUAGE | |
| | 語 | TC2 |
| | LANGUID | |
| | 憔 | IF8 |
| LAPE | LAPEL | |
| | 衿 | 66BA |
| | 襟 | 665K |
| LARG | LARGE | |
| | 弘 | 3D2 |
| | 泰 | JAA |
| | 祁 | 5K74 |
| | 殤 | OJK |
| | LARGE SHARK | |
| | 鮫 | YF29 |
| | LARGV TRIPOD | |
| | 鼐 | Y91 |
| | LARG ANT | |
| | 蚍 | U384 |
| | 蜉 | U4F3 |
| LATC | LATCH | |
| | 栓 | G2D |
| LATE | LATE | |
| | 晏 | K35D |
| | 遲 | U3P |
| | 闌 | XGC |
| | LATERAL | |
| | 側 | B227 |
| LAUG | LAUGH | |
| | 笑 | S39 |
| | 呵 | CCA1 |
| | 唬 | G6K7 |
| LAVA | LAVATORY | |
| | 廁 | 3F22 |
| LAW- | LAW | |
| | 法 | J2 |
| | 律 | 3B6A |
| | 卞 | 2I1 |
| LAYB | LAY BY | |
| | 擱 | HXC |
| LAYE | LAYER | |
| | 層 | 3P4 |
| LAZY | LAZY | |
| | 懶 | I77G |
| | 惰 | I4R |
| LEAD | LEAD | |
| | 引 | 3D1. |
| | 導 | 3JU |
| | 廸 | 3U5 |
| | 掄 | G2D2 |
| | 挽 | H242 |
| | 掖 | H3H |
| | 统 | P2 |
| | 鉛 | VC26 |
| LEAF | LEAF | |
| | 張 | 3D |
| | 箔 | SJ5 |
| | LEAF STALK | |
| | 梆 | G741 |
| LEAK | LEAK | |
| | 泄 | JA1 |
| | 洩 | J4K1 |
| | 漏 | J3P8 |
| FEAN | FEAN | |
| | 憑 | IY |
| | 靠 | 84C |
| | 矸 | 54RB |
| | 扆 | GJ2 |
| | LEANING | |
| | 欹 | 4X3 |
| LEAP | LEAP | |
| | 躍 | 7F6F |
| | 騰 | Y1R |
| LEAR | LEARN | |
| | 學 | 38 |
| | 習 | 6F |
| LEAS | LEASE | |
| | 租 | 5HA2 |
| LEAT | LEATHER | |
| | 革 | 93 |
| LEAV | LEAVE | |
| | 離 | 855 |
| | 袂 | 6639 |
| | LEAVEN | |
| | 酵 | 7638 |
| LEEC | LEECH | |
| | 蛭 | O6L |
| LEEK | LEEK | |
| | 韭 | 9B |
| LEFT | LEFT | |
| | 左 | 3NA1 |
| LEG- | LEG | |
| | 腿 | RU |
| LEGI | LEGITIMATE | |
| | 嫡 | D29C |
| LEIS | LEISURE | |
| | 佚 | B39B |
| | 暇 | K2E |
| | 遑 | U5BL |
| | 閒 | X4R |
| LEMO | LEMON | |
| | 檸 | G35I |
| | 檬 | G02 |
| LEND | LEND | |
| | 貸 | 77B |
| LEOP | LEOPARD | |
| | 猙 | 4940 |
| | 豹 | 7B2 |
| LEPR | LEPROSY | |
| | 癩 | 5477 |
| LESS | LESSON | |
| | 課 | TG |

Table 1 - 30

L

| | | | | | | | |
|---|---|---|---|---|---|---|---|
| LETT LETTER | | LIMP LIMP | | -LODG LODGE | | | |
| 信 | BT | 跛 | H0 | 寓 | 3557 | | |
| 函 | 2HJ | 踝 | 7F2A | LODGING | | | |
| 札 | G12 | LINE LINED | | 邸 | 744S | | |
| 扎 | H12 | 襯 | 666F | LOFT LOFTY | | | |
| 箋 | S4A4 | LIND LINDERA | | 堯 | EE2 | | |
| 簡 | SX | 杼 | G73 | 峨 | 344A | | |
| 翰 | 6F2J | LINI LINING | | 巍 | 34Y4 | | |
| LEVE LEVEL | | 裡 | 667J | 嵩 | 34YG | | |
| 平 | 372 | LINK LINK | | 穹 | 553D | | |
| LEVE LEVER | | 鏈 | VMA | 院 | WY4 | | |
| 槓 | G77 | LINT LINTEL | | LOIN LOIN | | | |
| LICE LICE | | 楣 | GM3 | 腰 | R6C | | |
| 蝨 | OO | LION LION | | LOIN CLOTH | | | |
| LICK LICK | | 獅 | 493K | 褡 | 660C | | |
| 舐 | 6E4 | LIPS LIPS | | 褳 | 66U7 | | |
| LIE- LIE | | 唇 | R7I | LOIN LOESH | | | |
| 臥 | 682 | LIQU LIQUID | | 膀 | R39 | | |
| 誆 | T2CL | 液 | J3H | LOIT LOITER | | | |
| 訮 | T49 | LIQUOR | | 逛 | U49 | | |
| 趴 | 7F28 | 酒 | 76 | LONE LONEY | | | |
| LIED LIE DOWM | | LITC LITCHI | | 仃 | BA13 | | |
| 躺 | 7G3S | 荔 | 0232 | LONG LONG | | | |
| LIFE LIFE | | LITE LITERATURE | | 長 | 89 | | |
| 生 | 5I | 文 | 40 | 久 | 16B | | |
| LIFT LIFT | | LITH LITHIUM | | 曼 | 4K2E | | |
| 挑 | H24 | 鋰 | V7HA | LONG FOR | | | |
| 提 | 4HK5 | LIVE LIVE | | 覦 | 7J2D | | |
| 揭 | HK27 | 住 | B15 | LONG RAIN | | | |
| 扛 | H3NA | LIVER | | 霪 | 88J3 | | |
| 掀 | H4C | 肝 | R37 | LOOK LOOK | | | |
| 抬 | HC2M | LIVI LIVING | | 觀 | 7J0 | | |
| 舉 | H6 | 活 | J6 | 看 | M1 | | |
| 擎 | H480 | LOAD LOAD | | 瞰 | M48 | | |
| LIGA LIGARD | | 載 | 7CE | 睹 | M6I | | |
| 蜥 | OG4 | 馱 | Y139 | LOOK DAGGER AT | | | |
| 蜴 | OK27 | LOCA LOCALITY | | 眥 | M4L | | |
| LIGH LIGHT | | 區 | 2C | LOOK FOR | | | |
| 光 | 24 | LOCK LOCK | | 覓 | 7J4 | | |
| 曦 | K6J | 閂 | SH | LOOK UP | | | |
| 輕 | 7C3N | 鎖 | V77 | 瞻 | MT | | |
| LIGHTNING | | LOCKS | | 仰 | B2K1 | | |
| 電 | 88 | 髟 | YPA | LOOS LOOSE | | | |
| LIMB LIMBS | | LOCU LOCUST | | 禹 | 57 | | |
| 肢 | R4X | 槐 | GY4 | 鬆 | YP | | |
| LIMI LIMIT | | 蚱 | O16 | LOQU LOQUAT | | | |
| 戒 | 4A3 | 蜢 | O38 | 枇 | G4L | | |
| 鍥 | 5J4 | 蝗 | O5B | 杷 | G301 | | |
| 艮 | 6TA | LODA LODAY | | LORD LORD | | | |
| 限 | W6 | 甸 | 5J27 | 主 | 15 | | |

Table 1 - 31

L

```
LOSE LOSE
     失 39B
LOT- LOT
     鋌 S4AB
LOTU LOTUS
     荷 0BC
     蓮 0U7
     LOTUS ROOT
     藕 06P5
LOVE LOVE
     愛 I40
     戀 IT
     LOVER
     姘 D03
LOW- LOW
     低 B4S
     卑 2J5
LOWA LOW-AREA-
              LYING
     埤 E2J5
LOYA LOYAL
     忠 I14
LUCK LUCK
     幸 37E
     LOCKY
     僥 BEE2
     吉 C3I
     禎 5K77
LUMI LUMIONOUS
     炳 FA2
     晰 KG4
LUMP LUMP
     團 3C3J
     顆 92G
LUNG LUNGS
     肺 R3K
LUTE LUTE
     琴 LBA
     筑 S3N2
LUXU LUXURIANT
     芃 026
```

Table 1 - 32

M

| | |
|---|---|
| MACH | MACHINE |
| | 機 G3M |
| MACK | MACKEREL |
| | 鯖 YF87 |
| MAD- | MAD |
| | 瘋 549 |
| | 狂 49L |
| MAGG | MAGGOTA |
| | 蛆 QA2 |
| | MAGGOTS |
| | 螬 Q4KA |
| MAGN | MAGNESIUM |
| | 鎂 V6J |
| MAGP | MAGPIE |
| | 鵲 YNK |
| MAID | MAID |
| | 婢 D2J |
| | 鬟 YPM |
| MAIN | MAIN STREET |
| | 街 6BM |
| MAJE | MAJESTIC |
| | 儼 BCC2 |
| | MAJESTY |
| | 威 D4 |
| MAKE | MAKE |
| | 製 662 |
| | 造 UC4 |
| MALA | MALARIA |
| | 癘 5405 |
| | 瘧 546K |
| | 瘴 5498 |
| MALE | MALE |
| | 陽 WK |
| | 雄 85 |
| | 牡 47E |
| MALL | MALLET |
| | 槌 GU |
| | 椎 G8 |
| MAM- | MAM |
| | 男 5J23 |
| | 人 B |
| MANA | MANAGE |
| | 操 HGC |
| | 討 T3J |
| MANG | MANGANESS |
| | 錳 V38 |
| MANN | MANNER |
| | 姿 D4C |
| MANS | MANSION |
| | 廈 3F30 |
| | 樹 GD |
| MANT | MANTIS |
| | 蟑 Q98 |
| | 螂 074 |
| MANU | MANURE |
| | 糞 675J |
| MANY | MANY |
| | 多 3H |
| MAPL | MAPLE |
| | 楓 G96 |
| MARK | MARK |
| | 標 G5K |
| | MARKET |
| | 市 3K |
| MARR | MARRIAGE |
| | 婚 DK |
| | 姻 D3C |
| | MARROW |
| | 髓 YKU |
| | MARRY |
| | 嫁 D35 |
| | 娶 D6 |
| MARS | MARSH |
| | 澤 JM |
| | MARSHGRASS |
| | 薛 0731 |
| | MARSHY ORCHID |
| | 蕙 0IA |
| MART | MARTIAL |
| | 赳 7A14 |
| MAST | MAST |
| | 桅 G2K1 |
| | 檣 GCE |
| MAT- | MAT |
| | 席 3K3F |
| | 蓆 03K3 |
| | 茵 03C3 |
| | 藉 06P |
| MATC | MATCH |
| | 件 B2JB |
| | 匹 2C2 |
| | 當 5J3 |
| | 逑 UJA |
| | 配 763 |
| MATE | MATE |
| | 侶 BCC |
| | 耦 6P5 |
| | MATERIAL |
| | 材 GH |
| | 料 4N |
| MATR | MATRON |
| | 姥 D6I |
| | 媼 D4M |
| MATT | MATTER |
| | 喋 C02 |
| | MATTRESS |
| | 褥 667I |
| MEAL | MEAL |
| | 膳 RC6 |
| | 餐 912E |
| MEAN | MEAN |
| | 傖 BBC |
| | MEANING |
| | 義 GJ |
| MEAS | MEASLES |
| | 痲 54GG |
| | MEASURE |
| | 測 J227 |
| | 量 7HK |
| | 斗 4NA |
| | 甬 5E2 |
| | MEASUREMENT |
| | 衰 6G28 |
| MEAT | MEAT |
| | 韮 07C |
| MEDI | MEDICINE |
| | 藥 0G5 |
| MEET | MEET |
| | 遇 U57 |
| | 會 4K |
| | 晤 KC2 |
| | 洽 2GC |
| | 逢 U3Q |
| MELO | MELON |
| | 瓜 5G |
| MELT | MELT |
| | 消 JR |
| | 融 Q |
| MEMB | MEMBER |
| | 員 C7 |
| MENA | MENAGERIE |
| | 囿 3C4R |
| MEND | MEND |
| | 補 665 |
| MERC | MERCHANT |
| | 商 29C |

Table 1 - 33

M

| | | | |
|---|---|---|---|
| MERC | MERCURY | | |
| | | 汞 | 3HJ |
| MERE | MERELY | | |
| | | 聊 | 6D2K |
| MERI | MERIT | | |
| | | 功 | 233 |
| | | 勳 | 23F1 |
| | | 庸 | 3FC |
| | | 绩 | P77 |
| | MERRY | | |
| | | 歡 | 4C0 |
| | | 酣 | 765N |
| MIDD | MIDDLE | | |
| | | 中 | 14 |
| | | 仲 | B14 |
| MILD | MILD | | |
| | | 巽 | 3028 |
| MILE | MILE | | |
| | | 哩 | C7H |
| MILI | MILITARY | | |
| | | 武 | 4G2B |
| MILK | MILK | | |
| | | 乳 | 123 |
| | | 奶 | D16 |
| MILL | MILL | | |
| | | 磨 | NY3 |
| | MILLET | | |
| | | 粱 | 67J |
| | | 稷 | 5H5J |
| | | 黍 | YC |
| MINC | MINCE | | |
| | | 剮 | 22C2 |
| | MINCED | | |
| | | 膾 | R4K |
| MINE | MINE | | |
| | | 礦 | N3F |
| MINI | MINISTER | | |
| | | 臣 | 68A |
| | MINISTRY | | |
| | | 部 | 74C |
| MINU | MINUTE | | |
| | | 微 | 3B4 |
| | | 毫 | 4B2 |
| MIRR | MIRROR | | |
| | | 鏡 | V5L |
| MISC | MISCELLANEOUS | | |
| | | 什 | B2J |
| MISF | MISFORTUNE | | |
| | | 殃 | 4D3 |
| MISH | MISHAP | | |
| | | 厄 | 6KC3 |
| MISL | MISLEAD | | |
| | | 繆 | P6F |
| MISS | MISS | | |
| | | 惦 | I3FC |
| MIST | MIST | | |
| | | 嵐 | 3496 |
| | | 霚 | 88R |
| | | 霾 | 887B |
| | MISTAKE | | |
| | | 誤 | TC3 |
| | | 忒 | I3A |
| MIX- | MIX | | |
| | | 拌 | H2J2 |
| | | 爻 | 4VA |
| MIXE | MIXED | | |
| | | 雜 | 85G2 |
| MOAN | MOAN | | |
| | | 唁 | CT |
| | | 痌 | 54C2 |
| MOAT | MOAT | | |
| | | 塹 | E4J8 |
| | | 隍 | W5BL |
| MOCK | MOCK | | |
| | | 譏 | T3H |
| MODE | MODEST | | |
| | | 遜 | U38 |
| MODL | MODLE | | |
| | | 塑 | ER |
| | | 楷 | G5B4 |
| MOIS | MOIST | | |
| | | 潤 | JX |
| | MOISTEN | | |
| | | 沾 | J2I |
| | | 浹 | J39B |
| | | 濡 | J88 |
| | | 霑 | 88J2 |
| MOLD | MOLD | | |
| | | 模 | GOK |
| | | 鎔 | V35 |
| | | 黴 | Y03 |
| MOLE | MOLE CROCLET | | |
| | | 螻 | QDK |
| | MOLES | | |
| | | 痣 | 54I3 |
| MOLI | MOLISH | | |
| | | 拆 | H4J1 |
| MOME | MOMENT | | |
| | | 臾 | 6HB |
| | | 頃 | 922L |
| MONE | MONEY | | |
| | | 錢 | V4 |
| | | 幣 | 3K4 |
| | | 貨 | 774G |
| MONK | MONK | | |
| | | 僧 | B4K2 |
| | MONKEY | | |
| | | 猴 | 49B5 |
| | | 猢 | 49RC |
| | | 猻 | 4938 |
| | | 狙 | 49A2 |
| MONU | MONUMENE | | |
| | | 碑 | N2J5 |
| MOON | MOON | | |
| | | 月 | 4R |
| | MOON GODDESS | | |
| | | 嫦 | D3K3 |
| MORA | MORAL | | |
| | | 賢 | 776 |
| MORN | MORNING | | |
| | | 晨 | M7 |
| | | 朝 | 4R2J |
| | | 卯 | 2K16 |
| MORT | MORTAR | | |
| | | 臼 | 6HA |
| MOSE | MOSE | | |
| | | 苔 | OC2M |
| MOSQ | MOSQUITO | | |
| | | 蚋 | Q2D |
| | | 蚊 | Q4Q |
| MOST | MOST | | |
| | | 最 | K6 |
| MOTH | MOTH | | |
| | | 蛾 | Q4A |
| | MOTHER | | |
| | | 媽 | DY |
| | | 娘 | D6T |
| | | 母 | 4M |
| MOUN | MOUND | | |
| | | 丘 | A4J |
| | | 坏 | EA1 |
| | | 墩 | E48 |
| | | 邱 | 74A4 |
| | MOUNT | | |
| | | 裱 | 6666 |
| | | 褙 | 66R2 |

Table 1 - 34

M

| | |
|---|---|
| MOUN | MOUNTAIN |
| | 山 34 |
| | 岳 34A |
| | 隔 W57 |
| MOUR | MOURN |
| | 喪 CCE |
| | 悼 I2J |
| | 慼 I484 |
| | MOURNFUL |
| | 愣 I3D3 |
| | 惴 I6R |
| | MOURNING-CLOTHES |
| | 绖 I1LA |
| MOUT | MOUTH |
| | 口 C |
| | 嘴 C75 |
| MOVE | MOVE |
| | 動 237 |
| | 徙 3B4G |
| | 扳 H2E2 |
| | 掉 H2J |
| | 挪 H74 |
| | 遷 U6C |
| | 蹌 7FBC |
| | MOVED |
| | 盪 5MJ |
| MOW- | MOW |
| | 刈 2216 |
| MUD- | MUD |
| | 泥 J3P |
| | 淖 J2J2 |
| MUDD | MUDDY |
| | 混 JK |
| | 渟 J35I |
| | 濁 JQ |
| | 渾 J7C |
| MUGW | MUGWORT |
| | 艾 016 |
| MULB | MULBERRY |
| | 桑 G2E2 |
| MULE | MULE |
| | 騾 Y1P |
| MURM | MURMUR |
| | 淙 J35Z |
| | 潺 J3P3 |
| MUSC | MUSCLES |
| | 肌 R26 |
| MUSH | MUSHROOM |
| | 菇 0DC2 |
| | 菌 03C |
| | 蕈 0NY |
| MUSI | MUSIC |
| | 樂 G5 |
| | MUSIC-INSTRUNT |
| | 籟 S77 |
| | MUSIC-NAME |
| | 錚 V40 |
| MUSK | MUSK DEER |
| | 麝 YA3 |
| MUSS | MUSSELS |
| | 蚌 Q14 |
| MUST | MUST |
| | 必 I1 |
| | MUSTARD-PLANT |
| | 芥 0B1 |
| | MUSTERIOUS |
| | 奧 3916 |
| MUTU | MUTUAL |
| | 互 2B1 |
| | 相 MG |

Table 1 - 35

N

| | | |
|---|---|---|
| NEON | NEON | |
| | 氖 | 4H16 |
| NEVO | NEVOLENT | |
| | 恕 | ID |
| NEW- | NEW | |
| | 新 | 4J |
| NICH | NICHE | |
| | 龕 | YLC |
| NICK | NICKEL | |
| | 鎳 | VG6 |
| NIEC | NIECE | |
| | 侄 | B6L |
| | 姪 | D6L |
| NIGH | NIGHT | |
| | 宵 | 35R |
| | 夜 | 3H29 |
| NIMB | NIMBLE | |
| | 敏 | 484M |
| NINE | NINE | |
| | 九 | 09 |
| | 玖 | AA9 |
| NINT | NINTH | |
| | 壬 | 3I1 |
| NIPP | NIPPER | |
| | 螯 | Q48 |
| NITO | NITON | |
| | 氡 | 4H2G |
| NITR | NITRE | |
| | 硝 | NR |
| | NITROGEN | |
| | 氮 | 4HF |
| NO- | NO | |
| | 否 | CA1 |
| | NO,NOT | |
| | 無 | FB |
| NOBL | NOBLE | |
| | 貴 | 77C |
| NOIS | NOISE | |
| | 嘈 | C4KA |
| | 譟 | TGCC |
| | 響 | 987 |
| | 鬧 | YD3 |
| | NOISY | |
| | 豁 | 7K39 |
| | 聒 | 6D6E |
| NOON | NOON | |
| | 午 | 2JB |
| | 晌 | KC1 |
| NOOS | NOOSE | |
| | 繯 | P6M |
| NORT | NORTH | |
| | 北 | 2L |
| NOSE | NOSE | |
| | 鼻 | YB |
| NOT- | NOT | |
| | 不 | A1 |
| | 弗 | 3D14 |
| | 未 | GAAA |
| | 毋 | 4MA |
| | 非 | 84 |
| | NOT NECESSARY | |
| | 甭 | 5EA1 |
| NOTE | NOTE | |
| | 柬 | GC2 |
| | 牘 | 4T7 |
| NOTI | NOTICE | |
| | 榜 | G4F |
| | 示 | 5KA |
| NOW- | NOW | |
| | 今 | BA |
| | 現 | L7J |
| NUMB | NUMBER | |
| | 數 | 48D |
| | 碼 | NY |
| NUME | NUMEROUS | |
| | 莘 | 073 |
| NUN- | NUN | |
| | 尼 | 3P2L |
| NURT | NURTURE | |
| | 毓 | 4M3 |
| NUTH | NUTMEG | |
| | 蔻 | 0352 |

Table 1 - 36

O

| | |
|---|---|
| OAK- | OAK |
| | 栩 GGF |
| | 橡 G78 |
| OAR- | OAR |
| | 橈 GE2 |
| | 槳 G3J4 |
| | 櫓 GYF |
| OATH | OATH |
| | 誓 TH |
| OBIT | OBITUARY |
| | 訃 T2I |
| OBLI | OBLIGING |
| | 娩 D242 |
| | 娓 D3P4 |
| | OBLIQUE |
| | 歪 4GA1 |
| | OBLITERATE |
| | 熄 FI6 |
| OBSC | OBSCURE |
| | 僻 B73 |
| | 杳 GKZ |
| OBST | OBSTACLE |
| | 礙 N56 |
| | 罣 6HE |
| | OBSTINATE |
| | 忤 I2JB |
| | OBSTRUCT |
| | 堵 E6I |
| OCCU | OCCUPATION |
| | 業 GFA |
| | OCCUPIED |
| | 拮 HC3I |
| | OCCUPY |
| | 佔 B2IC |
| | 據 H6K |
| OCEA | OCEAN |
| | 洋 J6J |
| | 瀛 J29D |
| OCTO | OCTOGENARIAN |
| | 耋 6I6 |
| ODOR | ODOR |
| | 薰 OF1 |
| OF- | OF |
| | 之 Z |
| OFFE | OFFEND |
| | 搪 HC3 |
| | OFFER |
| | 献 496 |
| | 饗 9174 |
| | OFFENING |
| | 祭 5K4 |
| OFFI | OFFICAL |
| | 吏 CA16 |
| | OFFICE |
| | 司 C13 |
| | 署 6M6 |
| | 處 6K |
| | OFFICER |
| | 官 35J |
| | 士 3I |
| | OFFICIAL |
| | 仕 B3I |
| | 宦 3568 |
| | 紳 P5J1 |
| OFTE | OFTEN |
| | 屢 3PD |
| | 輒 7C6D |
| OH- | OH |
| | 噢 C39Z |
| OIL- | OIL |
| | 油 J5J |
| OLD- | OLD |
| | 古 C2J |
| | 老 6I |
| | 耄 6I4 |
| | 耆 6HO |
| OLDM | OLD MAN |
| | 翁 6F28 |
| | 耆 6IKA |
| OLIV | OLIVE |
| | 橄 G486 |
| | 欖 G7J |
| OMEN | OMEN |
| | 兆 242G |
| ONE- | ONE |
| | 一 A |
| | 壹 AA1 |
| ONEH | ONE-HUNDRED -MILLIONS |
| | 億 BI9 |
| ONIO | ONION |
| | 蔥 OI3 |
| ONLY | ONLY |
| | 僅 BO |
| | 只 C28 |
| | 唯 C85 |
| | 啻 C3K2 |
| | 祇 5K4S |
| | 覲 7JOL |
| OOZE | OOZE |
| | 滲 J2M |
| OPEN | OPEN |
| | 啟 C48 |
| | 披 H58 |
| | 豁 7K3 |
| | 開 X2 |
| | 闢 X73 |
| | OPEN EYES |
| | 睜 M40 |
| OPPO | OPPOSE |
| | 校 G2 |
| | 韋 95 |
| OR- | OR |
| | 或 4AC |
| ORAN | ORANGE |
| | 桔 GC3I |
| | 橙 G5F |
| | 橘 G5A2 |
| ORCH | ORCHID |
| | 蘭 OX |
| ORDE | ORDER |
| | 令 B2K |
| | 囑 C3PQ |
| | 咐 CB3 |
| | 序 3F1 |
| | 差 3H6 |
| | 第 S3D |
| | 諭 TB22 |
| | 飭 9123 |
| ORDI | ORDINANCE |
| | 敕 4[illegible]GC |
| ORIG | ORIGIN |
| | 源 J2F |
| ORIO | ORIOLE |
| | 鶯 YNF |
| ORNA | ORNAMENT |
| | 飾 913 |
| | ORNAMENTAL |
| | 彰 3E9 |
| | ORNAMENTED |
| | 綉 P7I |
| ORPH | ORPHAN |
| | 孤 385G |
| OSTR | OSTRICH |
| | 鴕 YN35 |
| OTHE | OTHER |
| | 別 22C |
| OTTE | OTTER |
| | 獺 4977 |

O

| | |
|---|---|
| OUTL | OUTLINE |
| | 概 G4W |
| | 綱 P34 |
| OUTP | OUTPOST |
| | 哨 CR |
| OUTS | OUTSIDE |
| | 外 3H2 |
| OVER | OVERFLOW |
| | 漫 J4K |
| | 溢 J5M |
| | 濫 J5M6 |
| | OVERLAY |
| | 鍍 V3F |
| | OVERSEAS |
| | 僑 BCC3 |
| | OVERSEE |
| | 督 M2E |
| | OVERTURN |
| | 傾 B92 |
| | 覆 6C3 |
| OWE- | OWE |
| | 欠 4CA |
| OWL- | OWL |
| | 梟 GYN |
| OX- | OX |
| | 牛 47A |
| OYST | OYSTER |
| | 蠣 Q2F |
| | 蠔 Q78 |

Table 1 - 38

P

| | |
|---|---|
| PACK | PACK |
| | 包 27 |
| PADD | PADDLE |
| | 桩 GC6 |
| PADD | PADDY |
| | 稻 5H6. |
| PAGE | PAGE |
| | 頁 92A |
| PAGO | PAGODA |
| | 塔 E0 |
| PAIL | PAIL |
| | 桶 GC2B |
| PAIN | PAIN |
| | 痛 545E |
| | 疼 542G |
| | 恫 54C2 |
| | PAINT |
| | 漆 JYC |
| PAIR | PAIR |
| | 雙 852 |
| | 駢 Y137 |
| PALA | PALACE |
| | 宮 35CC |
| | 殿 4E3 |
| | PALACE DOOR |
| | 閣 X9 |
| PALM | PALM |
| | 掌 H3S |
| | 芭 030 |
| PAN- | PAN |
| | 鍋 VC2A |
| | 釜 V4I |
| PAPE | PAPER |
| | 紙 P4S |
| | PAPER MONEY |
| | 鈔 V3S |
| PARA | PARALYSIS |
| | 瘓 54D5 |
| | 痺 5439 |
| | 痲 5485 |
| PARD | PARDON |
| | 宥 354R |
| | 赦 7E4 |
| PARK | PARK |
| | 園 3C6 |
| | 苑 02K |
| PARR | PARROT |
| | 鸚 YND |
| | 鵡 YN4G |

| | |
|---|---|
| PART | PART |
| | 批 B4L |
| | 訣 T39 |
| | PARTIAL |
| | 偏 B4P |
| | PARTICIPATE |
| | 參 2M3 |
| | PARTICLE |
| | 兵 5D2 |
| | 噸 CY3 |
| | PARTITION |
| | 隔 WY |
| | PARTNER |
| | 夥 3HG |
| | PARTRIDGE |
| | 鷓 YN3F |
| | 鴣 YNCZ |
| | PARTY |
| | 黨 YO |
| PASS | PASS |
| | 踰 7FB2 |
| | 逝 UH |
| | 關 X3 |
| | PASS OVER |
| | 越 7A4 |
| | PASSIONS |
| | 情 I8 |
| PAST | PAST |
| | 昔 K2B |
| | PASTE |
| | 貼 772I |
| | 糊 67R |
| PAT- | PAT |
| | 拍 H5B |
| PATC | PATCH |
| | 衲 662D |
| PATH | PATH |
| | 徑 3B3N |
| | 逕 U3N |
| | 蹊 7F39 |
| PATI | PATIENCE |
| | 忍 I22 |
| | PATION |
| | 恣 I4C2 |
| PATR | PATROL |
| | 巡 U36 |
| | 邏 U6M |
| PATT | PATTERN |
| | 纹 P4X |
| | 範 S7 |

| | |
|---|---|
| - | PATTEN |
| | 屐 3P3B |
| PAVE | PAVE |
| | 砌 N22 |
| PAVI | PAVILION |
| | 亭 29A1 |
| PAY- | PAY |
| | 付 B3J |
| PEAC | PEACEFUL |
| | 寧 35IA |
| | 綏 PD |
| | 靖 875 |
| | PEACH |
| | 桃 G24 |
| PEAK | PEAK |
| | 峰 343Q |
| | 峇 34T |
| | 巔 3492 |
| | 峙 343J |
| | 嶽 3449 |
| PEAR | PEAR |
| | 梨 G22 |
| | PEARL |
| | 珠 LG |
| | 璣 L3M |
| PEAK | PEAK |
| | 啄 C78 |
| PEDD | PEDDLER |
| | 販 772E |
| PEEL | PEEL |
| | 剝 22J |
| PEEP | PEEP |
| | 窺 557J |
| PELI | PELICAN |
| | 鵜 YNR |
| PEN- | PEN |
| | 筆 S6A |
| | PEN HEAD |
| | 穎 5H9 |
| PEOP | PEOPLE |
| | 庶 3FF |
| | 民 4S |
| PEPP | PEPPER |
| | 椒 G2E3 |
| PERC | PERCH |
| | 桀 G6Q |
| | 鱸 YF5M |
| PERI | PERIOD |
| | 期 4R2 |

Table 1 - 39

P

| | | |
|---|---|---|
| PERI | PERISH | |
| | 沒 | J4 |
| | 殞 | 4DC7 |
| | 殍 | 4D38 |
| PERM | PERMIT | |
| | 准 | 2G8 |
| PERN | PERNG | |
| | 硼 | N4R |
| PERO | PEROUS | |
| | 亨 | 2913 |
| PERS | PERSIMMON | |
| | 柿 | G3K2 |
| PERV | PERVERSE | |
| | 悖 | I38 |
| | 愎 | IB3Q |
| | 舛 | 6QA |
| PEST | PESTILENCE | |
| | 疫 | 544E |
| | PESTLE | |
| | 杵 | G2J |
| PETA | PETAL | |
| | 瓣 | 5G7 |
| PETT | PETTY | |
| | 藐 | 07B |
| | 齬 | Y23 |
| | 齪 | Y27 |
| PHEA | PHEASANT | |
| | 雉 | 855D |
| PHLE | PHLEGM | |
| | 痰 | 54FF |
| PHOE | PHOENIX | |
| | 凰 | 265 |
| | 鳳 | YN2 |
| | 鷟 | YNT |
| PHOS | PHOSPHORUS | |
| | 燐 | F6Q |
| | 磷 | N6Q |
| PICK | PICK | |
| | 拈 | H2IC |
| | PICK UP | |
| | 拾 | A10 |
| PIEB | PIEBALD | |
| | 駁 | Y1I3 |
| PIEC | PIECE | |
| | 個 | B3 |
| | 疋 | 56A |
| PIER | PIER | |
| | 礅 | N48 |
| | PIERCE | |
| | 揭 | H4L2 |
| PIET | PIETY | |
| | 孝 | 38E |
| PIG- | PIG | |
| | 猪 | 786 |
| | 豕 | 78A |
| PIGE | PIGEON | |
| | 鴿 | YN1 |
| PIGM | PIGMY | |
| | 侏 | BGB |
| PILE | PILES | |
| | 痔 | 543J |
| PILL | PILL | |
| | 丸 | 151 |
| | PILLAR | |
| | 柱 | G1 |
| | PILLBOX | |
| | 碉 | NC |
| | PILLOW | |
| | 枕 | G25 |
| PIMP | PIMPLE | |
| | 痱 | 5484 |
| | 皰 | 582 |
| PINC | PINCERS | |
| | 鉗 | V5N |
| | PINCH | |
| | 捻 | HIB |
| | 拑 | H5N |
| | 掐 | H6H2 |
| PINE | PINE | |
| | 松 | G28 |
| | 杉 | G3E |
| PING | PING | |
| | 乒 | 16A4 |
| PIPE | PIPE | |
| | 笙 | S5I |
| PIT- | PIT | |
| | 坎 | E4C |
| | 阬 | W24 |
| PITY | PITY | |
| | 憐 | I6Q |
| | 惜 | IK |
| | 惻 | I227 |
| | 矜 | 5AB |
| PLAC | PLACE | |
| | 置 | MM |
| | 宅 | 4B2 |
| PLAG | PLAGUE | |
| | 瘟 | 545M |
| PLAI | PLAIN | |
| | 樸 | G6J |
| | 素 | PL |
| | 原 | 2F |
| | 坦 | EKA |
| | 坪 | E372 |
| | 顯 | 92F |
| | PLAIT | |
| | 辮 | P73 |
| PLAN | PLAN | |
| | 計 | T2J |
| | 策 | SG |
| | 擬 | H56 |
| | 猷 | 4976 |
| | 謨 | TOK |
| | 恒 | I7C |
| | PLANE | |
| | 刨 | 2227 |
| | 鉋 | V273 |
| | PLANT | |
| | 栽 | GE4 |
| | 植 | GM2 |
| | 蒔 | OK3J |
| | PLANTS | |
| | 卉 | 2J3G |
| | 范 | 0J2 |
| PLAS | PLASTER | |
| | 膏 | R29 |
| PLAT | PLATINIUM | |
| | 鉑 | V5B |
| PLAY | PLAY | |
| | 玩 | L2 |
| | 弄 | 3G |
| | 耍 | 6RD |
| | 演 | J35 |
| | 奕 | 3929 |
| | 弈 | 3G2 |
| PLEA | PLEASE | |
| | 請 | T8 |
| | PLEASED | |
| | 悅 | I242 |
| | 愜 | I2C |
| PLED | PLEDGE | |
| | 贄 | 7748 |
| PLEN | PLENTIFUL | |
| | 豐 | 7D |
| | PLENTY | |
| | 饒 | 91E |
| PLIE | PLIERS | |
| | 鑷 | V6D |

Table 1 - 40

| | |
|---|---|
| PLOT | PLOT |
| | 諜 TG5 |
| PLOW | PLOW |
| | 耕 6P |
| | 耜 6P1 |
| | 耒 6PA |
| | 犁 4722 |
| | 犂 E7B |
| PLUC | PLUCK |
| | 採 H79 |
| | 摘 H29C |
| | 抉 H392 |
| | 采 79A |
| PLUM | PLUM |
| | 李 G38 |
| | 梅 G4M |
| | PULME |
| | 翎 6FB2 |
| PLUN | PLUNDER |
| | 擄 H6K5 |
| PLUR | PLURAL |
| | 們 BX |
| POD- | POD |
| | 莢 039B |
| POET | POETRY |
| | 詩 T3JE |
| POIN | POINT |
| | 尖 3S3 |
| POIS | POISON |
| | 毒 4ML |
| | 鴆 YN25 |
| POLE | POLE |
| | 竿 S37 |
| | 篙 SYG |
| POLI | POLITE |
| | 倜 BC2A |
| | 彬 3EG |
| POME | POMEGRANATE |
| | 榴 GJ52 |
| | POMELO |
| | 柚 G5J1 |
| POND | POND |
| | 池 J12 |
| | 沼 JC22 |
| PONG | PONG |
| | 乓 15A4 |
| POOL | POOL |
| | 塘 EC3 |
| | 潭 J6C |
| | 潢 JYH |
| POOR | POOR |
| | 貧 7722 |
| | 窮 557 |
| POPL | POPL |
| | 划 224A |
| PORC | PORCELAIN |
| | 瓷 5C |
| | PORCH |
| | 軒 7C37 |
| PORR | PORRIDGE |
| | 粥 672M |
| PORT | PORT |
| | 港 J30 |
| | 埠 E2J |
| POSI | POSITION |
| | 位 B5 |
| POST | POST |
| | 郵 74E |
| | POSTERITY |
| | 裔 R5J |
| POSTHUMOUS-TITLE | |
| | 謚 T5M2 |
| | POSTS |
| | 桿 G384 |
| POT- | POT |
| | 壺 3I2 |
| | 罐 6G7 |
| | POT HERB |
| | 芯 0I1 |
| POTA | POTASSIUM |
| | 鉀 V5JA |
| | POTATO |
| | 薯 06M6 |
| POTT | POTTERY |
| | 陶 W2 |
| POUN | POUND |
| | 磅 N4F |
| | 鎊 V4F |
| | 搗 H34Y |
| | 砸 N2C |
| | 舂 6HAA |
| POUR | POUR |
| | 注 J15 |
| | 灌 J08 |
| | 挹 HC3 |
| | 斟 4N5 |
| | POUR OUT |
| | 粉 672 |
| | POURER |
| | 權 G0 |
| PRAC | PRACTICE |
| | 練 PG |
| | 習 6A5 |
| PRAI | PRAISE |
| | 讚 T7 |
| | 頌 9228 |
| PRAN | PRANCE |
| | 騰 Y166 |
| PRAT | PRATTLE |
| | 喃 CMP |
| | 嘮 COY |
| PRAY | PRAY |
| | 祈 5K4J |
| | 禱 5K3 |
| PREF | PREFECTURE |
| | 州 30 |
| PREG | PREGNANT |
| | 妊 D3I |
| | 娠 D7I |
| | 孕 3816 |
| PREP | PREPARE |
| | 預 921 |
| | 備 B5E |
| PRES | PRESENT |
| | 呈 C3I1 |
| | PRESS |
| | 壓 E2F |
| | 榨 G55 |
| | 按 H35 |
| | 壓 7F4A |
| | PRESSED |
| | 憔 IF8 |
| | 悴 I2J2 |
| PRET | PRETEND |
| | 佯 B6JA |
| | PRETTY |
| | 倩 B87 |
| | 姣 D29 |
| | 姚 D24 |
| | 娟 DC4 |
| | 嬋 DCCK |
| | 姝 DGB |
| | 婁 DT |
| PREV | PREVIOUSLY |
| | 曩 K66 |
| PRIC | PRICE |
| | 價 B7 |
| PRIN | PRINCE |
| | 侯 B5D1 |

Table 1 - 41

P

| | | |
|---|---|---|
| PRIN | PRINCIPLE | |
| | 理 | L7 |
| PRIS | PRISON | |
| | 監 | 5M68 |
| | 獄 | 49T |
| | 囹 | 3CB2 |
| | 圄 | 3CCZ |
| | PRISONER | |
| | 囚 | 3CB |
| | 虜 | 6K5 |
| PRIV | PRIVATE | |
| | 私 | 5H |
| | 卒 | 2J29 |
| PRIZ | PRIZE | |
| | 獎 | 49 |
| PROB | PROBE | |
| | 擅 | H6C |
| PROC | PROCLAIM | |
| | 宣 | 352B |
| PROD | PRODUCE | |
| | 產 | 5I2 |
| PROF | PROFIT | |
| | 利 | 225 |
| PROM | PROMISE | |
| | 允 | 242M |
| | 諾 | TOC |
| | PROMOTE | |
| | 擢 | H6F8 |
| PROP | PROPER | |
| | 宜 | 35A |
| | 誼 | T35A |
| | PROPHECY | |
| | 讖 | T4AB |
| PROS | PROSPEROUS | |
| | 昌 | KK |
| | 隆 | W5I |
| PROT | PROTECT | |
| | 護 | TO |
| | 祐 | 5KCA |
| | 衛 | 6B9 |
| | 廕 | 3FW |
| | 庇 | 3F4L |
| | PROTRUDE | |
| | 突 | 554 |
| PROU | PROUD | |
| | 驕 | Y1CC |
| | 傲 | B48 |
| | 憔 | IFB |
| PROV | PROVIDE | |
| | 周 | C2A |
| PROV | PROVINCE | |
| | 省 | M3 |
| | 郡 | 74C3 |
| | PROVE | |
| | 据 | H3FF |
| | PROVERB | |
| | 諺 | T3E4 |
| | PROVISIONS | |
| | 饋 | 917 |
| | PROVOKE | |
| | 惹 | IOC |
| PUBL | PUBLIC | |
| | 公 | 28 |
| | 刊 | 2237 |
| PUFF | PUFF | |
| | 噓 | C6KA |
| PULL | PULL | |
| | 引 | 3D1 |
| | 拉 | H5L |
| | 扯 | H4G |
| | 拖 | H12B |
| | 揠 | H2C |
| | 輓 | 7C2Z |
| PULS | PULSEL | |
| | 脈 | R7 |
| PUNI | PUNISH | |
| | 懲 | I3B |
| | 罰 | 6MT |
| | 誅 | TGB |
| | 辟 | 733 |
| PUPP | PUPPET | |
| | 偶 | B57 |
| | 傀 | BY4 |
| | 儡 | B5J5 |
| | 俑 | B5E2 |
| PUPI | PUPIL | |
| | 瞳 | M5L |
| | 眸 | M47 |
| PURE | PURE | |
| | 純 | P3T |
| | 淨 | J40 |
| | 洌 | J224 |
| | 粹 | 672J |
| PURP | PURPLE | |
| | 紫 | P4G |
| PUS- | PUS | |
| | 膿 | R7I4 |
| PUSH | PUSH | |
| | 推 | H8 |
| PUT- | PUT | |
| | 厝 | 2FK |
| PYRU | PYRUS | |
| | 棠 | G3SC |

Table 1 - 42

Q

| | | |
|---|---|---|
| QUAI | QUAIL | |
| | 鵪 | YN39 |
| | 鶉 | YN29 |
| QUAL | QUALITY | |
| | 質 | 774 |
| QUAR | QUAPREL | |
| | 吵 | C3S |
| | 鬧 | YD3 |
| | 鬩 | YD24 |
| | 釁 | 6H22 |
| QUEE | QUEEN | |
| | 后 | C2FA |
| QUIC | QUICK | |
| | 快 | I39 |
| | 迅 | U1 |
| | 猝 | 492J |
| | 徇 | 3BK2 |
| QUIE | QUIET | |
| | 寂 | 352E |
| | 靜 | 874 |
| | 恬 | I6E |
| | 宓 | 35I1 |
| | 謐 | T5MI |
| QUIL | QUIL | |
| | 衾 | 66BA |

Table 1 - 43

R

R

| | |
|---|---|
| RABB | RABBIT |
| | 兔 2421 |
| RADI | RADIANT |
| | 暉 K7C2 |
| | RADICAL |
| | 宀 35AA |
| | 屮 3TA |
| | 无 4WA |
| | 疒 54A |
| | RADIUM |
| | 鐳 V88 |
| RAFT | RAFT |
| | 筏 SB4 |
| RAGG | RAGGED |
| | 襤 665M |
| | 褸 66D |
| RAIL | RAILING |
| | 欄 GX |
| | 檻 G5M |
| RAIN | RAIN |
| | 雨 88A |
| | 霖 88GG |
| | RAIN-HAT |
| | 笠 S5L |
| | RAIN-SOUND |
| | 瀟 J06 |
| | RAINBOW |
| | 虹 Q3N |
| | 霓 8824 |
| | 蝀 066 |
| RAIS | RAIS |
| | 募 230K |
| | 揚 HKA |
| | 擎 H221 |
| RAM- | RAM |
| | 羝 6J4S |
| RAMB | RAMBLE |
| | 逍 UR |
| | 遨 U48L |
| RAMP | RAMPART |
| | 壘 E5J5 |
| RANK | RANK |
| | 品 CCC |
| | 爵 403J |
| | 腥 RKT |
| | 臊 RGC |
| | 羶 6J29 |
| RANS | RANSOM |
| | 贖 777 |
| RAP- | RAP |
| | 敲 48Y |
| RAPI | RAPID |
| | 湍 J6R |
| | RAPIDLY |
| | 奄 395J |
| RARE | RARE |
| | 希 3K16 |
| | 罕 6M3 |
| RASC | RASCAL |
| | 氓 4S2 |
| RASH | RASH |
| | 疹 543E |
| | 痱 54W |
| | 躁 7FGC |
| RASP | RASPBERRY |
| | 莓 OU |
| RAT- | RAT |
| | 鼠 YS |
| RATE | RATE |
| | 率 592 |
| RATH | RATHER |
| | 頗 9258 |
| RATI | RATION |
| | 粟 5H29 |
| | 餉 91C1 |
| RAVI | RAVINE |
| | 壑 E2E2 |
| | 嵌 345N |
| REAC | REACH |
| | 到 22 |
| | 達 UE |
| | 屆 3P2 |
| | 詣 TK2L |
| READ | READ |
| | 唸 BI |
| | 讀 T77 |
| | READY |
| | 具 28A |
| REAL | REAL |
| | 實 357 |
| REAS | REASON |
| | 故 48C2 |
| RECA | RECALL |
| | 憶 II |
| RECE | RECEIVE |
| | 接 HD |
| | 受 2E4 |
| | 收 481 |
| | 拿 393 |
| RECI | RECITE |
| | 諷 T9 |
| RECO | RECOMMEND |
| | 荐 038 |
| | 薦 03F |
| | RECOMPENSE |
| | 酢 7G16 |
| | RECORD |
| | 記 T30 |
| | 誌 TI3 |
| | 籍 S6 |
| | 錄 VJ |
| RECT | RECTIFY |
| | 矯 5DCC |
| RED- | RED |
| | 丹 152 |
| | 彤 3E1 |
| | 朱 GB |
| | 紅 P3N |
| | 赤 7E |
| | 赭 7E6 |
| REDC | RED CLOUDS |
| | 霞 882E |
| REDG | RED GEM |
| | 玫 L4Q |
| REDW | RED WINE |
| | 醍 76K5 |
| | 醐 76R |
| REED | REED |
| | 荻 049 |
| | 葦 095 |
| | REEDS |
| | 芒 0291 |
| | 茅 05A |
| | 蘆 05M6 |
| REEF | REEF |
| | 礁 NF8 |
| REEL | REEL |
| | 繅 P36G |
| REFE | REFECT |
| | 映 K392 |
| REFI | REFINED |
| | 煉 FGC |
| | 斌 4Q4 |
| | 窈 553 |
| | 窕 5524 |
| REFU | REFUGE |
| | 藪 048D |
| | REFUSE |
| | 拒 H3N |

Table 1 - 44

R

| | |
|---|---|
| REGI | REGION |
| | 境 E5 |
| | REGISTER |
| | 簿 SJ |
| | 請 TK |
| REGR | REGRETFUL |
| | 懊 I393 |
| REGU | REGULATE |
| | 搏 H3J7 |
| REJE | REJECT |
| | 擲 H483 |
| RELA | RELATIVE |
| | 親 7J7 |
| | 戚 4A3S |
| | RELAX |
| | 弛 3D12 |
| RELE | RELEASE |
| | 放 4F4 |
| RELI | RELISH |
| | 嗜 C6I |
| RELY | RELY |
| | 依 B66 |
| | 倚 B39C |
| | 恃 I3JE |
| | 憑 Y12G |
| REMA | REMAIN |
| | 剩 221 |
| | REMAINDER |
| | 餘 91B |
| | REMAINS |
| | 餕 912Z |
| REME | REMEDY |
| | 奈 395K |
| | REMEMBER |
| | 緬 P94 |
| REMI | REMIT |
| | 匯 2CJ |
| REMO | REMONSTRATE |
| | 諍 T40 |
| | REMOVE |
| | 搬 H69 |
| | 移 5H3H |
| | 撤 H48R |
| | 徹 3B48 |
| RENT | RENT |
| | 賃 77B3 |
| REPA | REPAIR |
| | 修 B3E |
| | REPAY |
| | 賠 77C5 |
| REPE | REPEAR |
| | 喃 C2J2 |
| | REPEATEDLY |
| | 迭 U39 |
| | 頻 924 |
| | REPENT |
| | 懺 J4AB |
| | 悔 J4H |
| REPL | REPLY |
| | 復 3B3Q |
| REPO | REPORT |
| | 咨 C4C2 |
| | 報 E2E |
| | 奏 39AA |
| RESC | RESCUE |
| | 拯 HAJ |
| RESE | RESEMBLE |
| | 彷 3B4F |
| | 彿 3B3D |
| | RESEMBLE |
| | 肖 R3S |
| | RESENTMENT |
| | 怨 I2K |
| RESI | RESIDE |
| | 宋 35G |
| | RESIGN |
| | 卸 2K6G |
| | RESIST |
| | 抵 H4SA |
| | 抗 H29 |
| | 禦 5K3B |
| RESO | RESOLUTE |
| | 毅 4E7 |
| RESP | RESPECT |
| | 恭 I0 |
| | 敬 480 |
| | 惕 IK2 |
| | 祗 5K4S |
| REST | REST |
| | 休 BG |
| | 息 I6 |
| | 憩 I6E6 |
| | 歇 4CK |
| | 育 R2 |
| | RESTAURANT |
| | 館 9135 |
| | RESTRAIN |
| | 抑 H2K |
| | RESTRICT |
| | 撿 HBB |
| RETI | RETINUE |
| | 扈 4PC3 |
| | RETIRE |
| | 遂 J2N |
| RETR | RETREAT |
| | 退 U6 |
| RETU | RETURN |
| | 回 3CC |
| | 歸 4G3K |
| | 返 U2E |
| | 還 UM |
| REVI | REVIEW |
| | 閱 X24 |
| | REVILE |
| | 罵 6MY |
| | REVIVE |
| | 甦 5I4K |
| | 蘇 0Y |
| REVO | REVOLVE |
| | 斡 4N2J |
| | 旋 4F56 |
| | 匝 2C3 |
| | REVOLT |
| | 叛 2E28 |
| REWA | REWARD |
| | 償 B77 |
| | 賞 773S |
| RIBB | RIBBON |
| | 綬 P2E4 |
| RIBS | RIBS |
| | 肋 R23 |
| | 骿 R232 |
| | 腓 R84 |
| RICE | RICE |
| | 米 67AA |
| RICH | RICH |
| | 富 35A5 |
| | 腴 R6H |
| | 裕 667K |
| | 醇 7629 |
| RIDD | RIDDLE |
| | 謎 TU6 |
| RIDE | RIDE |
| | 乘 16G |
| | 騎 Y13 |
| RIDG | RIDGE |
| | 埂 E4K |
| | 崗 3434 |
| | 岡 342A |
| | 嶺 349 |

Table 1 - 45

R

| | | |
|---|---|---|
| RIDI | RIDICULE | |
| | 嘲 | C4R |
| | 姗 | D2A2 |
| RIFI | RIFICE | |
| | 醮 | 76F |
| RIGH | RIGHT | |
| | 正 | A4 |
| | 匡 | 2CL |
| | 右 | CA16 |
| | 對 | 3J |
| RIME | RIME | |
| | 韻 | 98C |
| RING | RING | |
| | 圈 | 3C2 |
| | 環 | LH |
| | RINGWORM | |
| | 癬 | 54YF |
| RINS | RINSE | |
| | 嗽 | C4CG |
| | 漱 | J4CG |
| RIPE | RIPE | |
| | 熟 | F3 |
| | 碩 | N9 |
| RIPP | RIPPLE | |
| | 淪 | JB2A |
| | 漪 | J49 |
| | 潆 | J6JJ |
| RISE | RISE | |
| | 升 | 2J1 |
| | 崛 | 343P |
| | 昇 | K2J1 |
| | 昂 | K2K |
| | 興 | 6H2 |
| | 起 | 7A3 |
| RISI | RISING | |
| | 旭 | K12 |
| RIVE | RIVE | |
| | 劈 | 2273 |
| | RIVER | |
| | 江 | J3N |
| | 河 | JCA |
| | RIVERBANK | |
| | 浦 | J5E |
| ROAD | ROAD | |
| | 道 | U9 |
| | 路 | 7FC |
| | 途 | UB |
| | 阡 | W2J |
| | 陌 | W5BA |

| | | |
|---|---|---|
| ROAR | ROAR | |
| | 吼 | C38 |
| | 咆 | C273 |
| | 哮 | C38E |
| | 澎 | J3E |
| | 湃 | JHH |
| | 轟 | 7C7 |
| ROAS | ROAST | |
| | 焙 | FC5 |
| ROB- | ROB | |
| | 劫 | 232M |
| | 掠 | H293 |
| | 搶 | HBC |
| ROBB | ROBBER | |
| | 盜 | 5MJ4 |
| ROBE | ROBE | |
| | 袍 | 6627 |
| ROC- | ROC | |
| | 鵬 | YN4 |
| ROCK | ROCK-SALT | |
| | 鹵 | YIA |
| | ROCKINESS | |
| | 嵯 | 343N |
| ROLL | ROLL | |
| | 搏 | H3JA |
| | 滾 | J66 |
| | 碾 | N3P |
| | 輾 | 7C3P |
| | ROLL UP | |
| | 捲 | H2K2 |
| | ROLLER | |
| | 轆 | 7CYA |
| ROOM | ROOM | |
| | 室 | 356 |
| | 房 | 4P4 |
| ROOS | ROOST | |
| | 棲 | GDA |
| ROOT | ROOT | |
| | 根 | G6 |
| | 本 | GA |
| | 氏 | 4SA |
| ROPE | ROPE | |
| | 繩 | PY |
| | 索 | P2J |
| | 紼 | P2D |
| ROSE | ROSE | |
| | 薔 | 0CE |
| | 薇 | 03B |

| | | |
|---|---|---|
| ROTT | ROTTEN | |
| | 腐 | R3F |
| | 朽 | GA2 |
| ROUG | ROUGE | |
| | 胭 | R3C |
| | ROUGH | |
| | 澀 | J4G |
| | 芊 | 0393 |
| ROUN | ROUND | |
| | 圓 | 3CC7 |
| | 囫 | 3C27 |
| | 圇 | 3CBA |
| | ROUNDWORM | |
| | 蛔 | Q3CC |
| ROUS | ROUSE | |
| | 振 | H7I |
| | 奮 | 395 |
| ROUT | ROUT | |
| | 潰 | J77C |
| RUB- | RUB | |
| | 抹 | HGA |
| | 搓 | H3N6 |
| | 揉 | HG5 |
| | 摩 | HY3 |
| | 擦 | H355 |
| | 磋 | N3N |
| RUBB | RUBBISH | |
| | 垃 | E5L |
| | 圾 | E2E1 |
| RUDE | RUDE | |
| | 俚 | B7H |
| | 唐 | C3F |
| RUG- | RUG | |
| | 芸 | 02B2 |
| RUGG | RUGGED | |
| | 崎 | 3439 |
| | 嶇 | 342C |
| RUIN | RUIN | |
| | 墮 | EW |
| | RUINED | |
| | 圮 | E30 |
| | 頹 | 925 |
| RULE | RULE | |
| | 規 | 7J3 |
| | 矩 | 5D3 |
| | 則 | 227 |
| | 甸 | 5J27 |
| | RULER | |
| | 君 | C3 |

Table 1 - 46

R

| | |
|---|---|
| RUMO | RUMOR |
| | 謠 T6H |
| RUN- | RUN |
| | 奔 393G |
| | 跑 7F27 |
| | RUN THROUGH |
| | 涇 J3NA |
| RUPT | RUPTURE |
| | 疝 5434 |
| RUSH | RUSH |
| | 楔 GD7 |
| | 蒲 0J5E |
| | 葭 02E |
| | 衝 RUST |
| | 銹 V5H1 |
| | 鏽 V6A |
| | RUSTIC |
| | 鄙 74CC |
| RUT- | RUT |
| | 轍 7C48 |

Table 1 - 47

S

S

| | |
|---|---|
| SARL | SABLE |
| | 貂 7BC |
| SACR | SACRIFICE |
| | 祀 5K30 |
| | 禋 5K66 |
| SAD- | SAD |
| | 悄 IR3 |
| | 愴 IBC |
| | 忡 I14Z |
| | 慼 I4A3 |
| SADD | SADDLE |
| | 鞍 9335 |
| SAFE | SAFE |
| | 安 35D |
| SAIL | SAIL |
| | 帆 3K26 |
| | 篷 SU |
| | 駛 Y1C |
| SALA | SALARY |
| | 俸 B393 |
| | 祿 5KJ |
| SALI | SALIVA |
| | 唾 CE1 |
| | 涎 J3U |
| SALT | SALT |
| | 鹽 YI |
| | 鹺 7639 |
| | SALTED |
| | 醃 R36 |
| | SALTED-BEEN |
| | 豉 7D4 |
| | SALTISH |
| | 鹹 YIC |
| SALU | SALUGHTER |
| | 宰 3573 |
| | SALUTE |
| | 揖 HC6 |
| SAME | SAME |
| | 同 C2 |
| | 猶 497 |
| SAND | SAND |
| | 沙 J3S |
| | 砂 N3S |
| | SANDALS |
| | 屣 3P3B |
| | 蹺 7FE |
| | SANDALWOOD |
| | 檀 G29A |
| | SANDS |
| | 瀨 J77G |
| SATC | SATCHEL |
| | 笈 S2E |
| SATI | SATISFY |
| | 愜 912F |
| SAVA | SAVAGE |
| | 蠻 OT |
| SAVE | SAVE |
| | 救 48J |
| SAW- | SAW |
| | 鋸 V3P |
| SAY- | SAY |
| | 說 T24 |
| | 云 2B2M |
| | 曰 4KAA |
| SCAB | SCAB |
| | 痂 5423 |
| SCAL | SCALE |
| | 秤 5H37 |
| | SCALES |
| | 鱗 YF6Q |
| | SCALY-DRAGON |
| | 蛟 Q29 |
| SCAR | SCAR |
| | 痕 546 |
| | 瘢 5469 |
| SCAT | SCATTER |
| | 撒 H48 |
| | 潰 J391 |
| | 軼 7C39 |
| SCEN | SCENERY |
| | 景 K29 |
| SCEP | SCEPTER |
| | 圭 EE |
| SCHO | SCHOLARS |
| | 儒 B8 |
| | 彥 3E4 |
| SCHO | SCHOOL |
| | 校 G2 |
| | 庠 3F6J |
| SCOL | SCOLD |
| | 譴 TUC |
| | 責 77L |
| | 叱 C2L |
| | 嗔 CM |
| SCOO | SCOOP |
| | 挖 H551 |
| | 舀 4P4H |
| SCOR | SCORCHED |
| | 焦 F8 |
| - | SCORPION |
| | 蝎 04C |
| | 蠍 005 |
| SCRA | SCRAPE |
| | 刮 22K |
| | 削 22R |
| | SCRATCH |
| | 扒 H28 |
| | 抓 H40A |
| | 搔 HO |
| SCRE | SCREEN |
| | 屏 3PO |
| | 幔 3K4K |
| | 簾 S3F |
| SCRU | SCRUB |
| | 刷 223P |
| SCUL | SCULION |
| | 廝 3F4J |
| SEA- | SEA |
| | 海 J4M |
| SEAL | SEAL |
| | 印 2K |
| | 璽 L4V |
| | 篆 S3L |
| | 鈐 VBA |
| | SEAL UP |
| | 緘 PC4 |
| SEAR | SEARCH |
| | 尋 3J3 |
| | 找 H4A |
| | 搜 H2E6 |
| SEAS | SEASON |
| | 季 385 |
| SEAT | SEAT |
| | 座 3FE |
| SEAW | SEAWEEDS |
| | 藻 OJG |
| SECO | SECOND |
| | 乙 12A |
| | 亞 2B |
| | 次 4C |
| | 秒 5H3S |
| SECR | SECRET |
| | 秘 5HI1 |
| SECT | SECTION |
| | 段 4E |
| SECU | SECURE |
| | 妥 D40 |
| SEDA | SEDAN-CHAIR |
| | 轎 7CCC |

Table 1 - 48

S

| | |
|---|---|
| SEDG | SEDGE |
| | 莞 0352 |
| SEDI | SEDIMENT |
| | 澱 J4E3 |
| SEE- | SEE |
| | 見 7J |
| | 視 7J5 |
| | 睇 M6I |
| SEED | SEED |
| | 種 5H7 |
| | 籽 6738 |
| SEEM | SEEM |
| | 似 BB2 |
| | 彷 3B4F |
| | 彿 3B3D |
| SEIZ | SEIZE |
| | 搏 H3JA |
| | 攫 HMM |
| | 擒 HYL |
| | 拏 H35B |
| SELE | SELECT |
| | 擇 HM |
| | 選 U3 |
| | 遴 U6Q |
| SELF | SELF |
| | 己 30 |
| SELL | SELL |
| | 售 C8 |
| | 賣 773I |
| | 銷 VR |
| SEND | SEND |
| | 寄 3539 |
| | 捎 HR3 |
| | 詒 TC2M |
| | 遣 UC1 |
| | 送 U0 |
| SENT | SENTENCE |
| | 句 C27 |
| SERP | SERPENT |
| | 蛇 Q039 |
| | 虺 Q24A |
| SERV | SERVE |
| | 侍 B3JE |
| | 伺 BC13 |
| | 役 3B4E |
| | SERVANT |
| | 僕 B6 |
| | 伕 B39A |
| | 傭 B3F6 |
| | 隸 86 |
| SETT | SETTLE |
| | [illegible] 3976 |
| SEVE | SEVEN |
| | 七 07 |
| | 柒 AA7 |
| | SEVERAL |
| | 幾 3M |
| | SEVERE |
| | 嚴 CC2 |
| | 厲 2F0 |
| SEW- | SEW |
| | 縫 PU |
| | 紉 P221 |
| SHAC | SHACKLE |
| | 絆 P2J2 |
| SHAD | SHADE |
| | 蔭 OWB |
| | 罩 6M2 |
| | SHADOW |
| | 影 3EK |
| | 翳 KC3 |
| SHAF | SHAFT |
| | 轅 7C66 |
| SHAK | SHAKE |
| | 揮 H7 |
| | 搖 H6G |
| | 撼 HIC |
| | 拂 H3D |
| | 震 887I |
| SHAL | SHALLOW |
| | 淺 J4A |
| SHAM | SHAME |
| | 羞 6JA2 |
| | 恥 I6D |
| | 慚 I4J |
| SHAN | SHANG HAI |
| | 滬 J4PC |
| | SHANK |
| | 脛 R3NA |
| SHAP | SHAPE |
| | 狀 494 |
| SHAR | SHARE |
| | 份 B222 |
| | SHARK |
| | 鯊 YFJ |
| | SHARP |
| | 銳 V24 |
| | SHARPEN |
| | 剡 22FF |
| | 剴 227D |
| SHAV | SHAVE |
| | 剃 223D |
| | 刮 226E |
| SHE- | SHE |
| | 她 D12 |
| | 伊 B3PA |
| SHEA | SHEAR |
| | 剪 6F22 |
| | SHEATH |
| | 鞘 93R |
| SHED | SHED |
| | 棚 G4R |
| SHEE | SHEEP |
| | 羊 6JA |
| SHEL | SHELL |
| | 硯 N7 |
| | 貝 77A |
| | SHELTER |
| | 庥 3FBG |
| SHIE | SHIELD |
| | 干 37A |
| | 盾 M2F |
| SHIN | SHINING |
| | 鑠 VG5 |
| SHIR | SHIRK |
| | 諉 TD |
| | SHIRT |
| | 衫 663E |
| SHIV | SHIVER |
| | 顫 9229 |
| SHOA | SHOAL |
| | 灘 J850 |
| SHOE | SHOES |
| | 鞋 93E |
| | 履 3P3 |
| SHOO | SHOOT |
| | 射 3J7 |
| | SHOOTS |
| | 秧 5H39 |
| SHOP | SHOP |
| | 店 3FC |
| | 鋪 V5E |
| | 肆 896 |
| | SHOPMAN |
| | 賈 776C |
| SHOR | SHORE |
| | 岸 352 |
| | SHORT |
| | 矮 5DD |
| | 短 5D7 |

Table 1 - 49

S

| | |
|---|---|
| SHOR | SHORT-TAILED-BIRDS |
| | 隹 85A |
| SHOT | SHOTE |
| | 豚 R78 |
| SHOU | SHOUD |
| | 殮 4DBB |
| | SHOULD |
| | 應 I3 |
| | SHOULDER |
| | 肩 R4P |
| | 膊 R3JA |
| | SHOUT |
| | 喝 CK |
| SHOW | SHOWER |
| | 霎 88D |
| SHRI | SHRIMP |
| | 蝦 Q2 |
| SHUT | SHUT UP |
| | 噤 C5K |
| | SHUTTLE |
| | 梭 G2M |
| SHY- | SHY |
| | 忸 IA22 |
| SICK | SICKLE |
| | 鍥 V39 |
| | 鐮 V3F2 |
| SIDE | SIDE |
| | 傍 B4F2 |
| | 邊 U60 |
| | SIDE ROOM |
| | 廂 3FM |
| SIEV | SIEVE |
| | 箕 S28 |
| | 篩 S3K |
| | 簌 S4C |
| SIFT | SIFT UP |
| | 淤 J4F2 |
| SIGH | SIGH |
| | 吁 C2B1 |
| | 嗟 C3N6 |
| | 歎 4C03 |
| SIGN | SIGN |
| | 押 H5JA |
| | 簽 SBB |
| SILE | SILENT |
| | 默 Y04 |
| SILI | SILICA |
| | 矽 N3H |
| SILK | SILK |
| | 絲 PP |
| | 絹 PCR |
| | 綢 PC2A |
| | 帛 3K5B |
| | SILK CLOTH |
| | 緞 P4E1 |
| | SILK WORM |
| | 蠶 Q4 |
| SILL | SILLY |
| | 憧 I5L |
| SILV | SILVER |
| | 銀 V6 |
| | SILVER CARP |
| | 鰱 YFU |
| SIMI | SIMILAR |
| | 侑 BR |
| | SIMILE |
| | 譬 T73 |
| SIMP | SIMPLE |
| | 淳 J293 |
| | 緩 P4K2 |
| SIN- | SIN |
| | 戾 4P49 |
| SINC | SINCERE |
| | 亶 29A2 |
| | 忱 I25 |
| | 悃 I3CG |
| | 愿 I2F |
| | 愫 IPL |
| | 篤 SY |
| | 誠 T4A |
| SINE | SINEWS |
| | 筋 SR |
| SING | SING |
| | 唱 CKK |
| | 謳 T2C |
| | 詠 TJ1 |
| | SINGLE |
| | 單 CCK |
| | 獨 49Q |
| | 隻 852E |
| SINK | SINK |
| | 沈 J25 |
| | 湮 JE6 |
| | 陷 W6H |
| SIRU | SIRUP |
| | 漿 J3J |
| SIST | SISTER |
| | 姊 D1 |
| | 妹 DG |
| | 姐 DA2 |
| | SISTER-IN-LAW |
| | 嫂 D2E6 |
| | 妯 D5J |
| | 娌 D7H |
| SIT- | SIT |
| | 坐 EB |
| SIX- | SIX |
| | 六 06 |
| | 陸 AA6 |
| SKEL | SKELETON |
| | 骷 YKC2 |
| | 骼 YKC |
| SKIL | SKILL |
| | 技 H4X |
| SKIN | SKIN |
| | 皮 58 |
| | 膚 R6K |
| SKIR | SKIRT |
| | 裙 66C3 |
| SKUL | SKULK |
| | 躲 7GG |
| | SKULL |
| | 顱 925M |
| | 髏 YKD |
| SLAN | SLANDER |
| | 訕 T34 |
| | 譖 TK4 |
| | 謗 T4F2 |
| | 訾 T4GL |
| | 誹 T84 |
| | SLANTING |
| | 斜 4NB |
| SLAV | SLAVE |
| | 奴 D2E |
| SLAY | SLAY |
| | 戳 4A6F |
| SLEE | SLEEP |
| | 睡 ME |
| | 眠 M4S |
| | 睏 M3C |
| | 瞌 M5M |
| | 寢 354U |
| | SLEEPY |
| | 盹 M3T |
| | SLEET |
| | 霰 8848 |

Table 1 - 50

S

| | | |
|---|---|---|
| SLEE | SLEEVE | |
| | 袖 | 665J |
| SLEN | SLENDER | |
| | 俳 | B242 |
| | 嫋 | D3D3 |
| SLIC | SLICE | |
| | 片 | 4T |
| | 髾 | RTP |
| SLIG | SLIGHT | |
| | 蔑 | OM4 |
| | SLIGHTLY | |
| | 稍 | 5HR |
| SLIP | SLIP | |
| | 蹉 | 7F3N |
| | 跎 | 7F35 |
| SLIT | SLIT | |
| | 绽 | P355 |
| SLLK | SLLK | |
| | 綀 | P28 |
| SLOP | SLOPE | |
| | 坡 | E58 |
| | 阪 | W2E |
| | 陘 | W3N |
| SLOU | SLOUGH | |
| | 蛻 | Q24 |
| SLOW | SLOW | |
| | 徐 | 3BBG |
| | 延 | 3U1 |
| | 慢 | I4K |
| | 纾 | P13 |
| | 缓 | P40 |
| SMAL | SMALL | |
| | 小 | 3S |
| | 掺 | H2M |
| | 麦 | 4A4A |
| | 麼 | Y33 |
| | SMALLPOX | |
| | 痘 | 547D |
| SMAR | SMART WEEDS | |
| | 蓼 | O6F3 |
| SMEA | SMEAR | |
| | 塗 | EJ |
| | 搽 | HOG |
| SMIL | SMILE | |
| | 哂 | C6C |
| SMIR | SMIRKING | |
| | 呷 | CB3P |
| SMOK | SMOKE | |
| | 煙 | FEG |
| SMOO | SMOOTH | |
| | 滑 | JYK |
| SNIA | SNIAL | |
| | 蚼 | QB2 |
| | 蝸 | QC2 |
| | 蛞 | Q6E |
| SNAK | SNAKE | |
| | 蛇 | Q35 |
| SNAR | SNARE | |
| | 罟 | 6MC2 |
| SNEA | SNEATH | |
| | 鞘 | 393J |
| SNEE | SNEEZE | |
| | 嚏 | C56 |
| SNIV | SNIVEL | |
| | 泗 | J3C2 |
| SNOR | SNORE | |
| | 鼾 | YB3 |
| SNOW | SNOW | |
| | 雪 | 883L |
| | SNOW FALL | |
| | 霏 | 8884 |
| SO- | SO | |
| | 忘 | IB3I |
| SOAK | SOAK | |
| | 浸 | J2E |
| | 淫 | J3I |
| | 漬 | J77L |
| SOAR | SOAR | |
| | 翔 | 6F6 |
| SOB- | SOB | |
| | 呱 | C5G |
| SOCI | SOCIETY | |
| | 社 | 5KE |
| SOCK | SOCKET | |
| | 眶 | M2C |
| | SOCKS | |
| | 襪 | 660 |
| SODA | SODA | |
| | 鹼 | YIB |
| SOFT | SOFT | |
| | 柔 | G5A |
| | 軟 | 7C4 |
| SOIL | SOIL | |
| | 堞 | E66C |
| SOLD | SOLDIER | |
| | 兵 | 28A4 |
| SOLE | SOLE | |
| | 蹠 | 7F3F |
| SOLE | SOLEMN | |
| | 肅 | 6A |
| | 穆 | 5H5 |
| SOLI | SOLITARY | |
| | 寞 | 350K |
| SOME | SOME | |
| | 些 | 2B4 |
| SON- | SON | |
| | 子 | 38A |
| SONI | SON-IN-LAW | |
| | 婿 | DR |
| SONG | SONG | |
| | 歌 | 4CC |
| SOOT | SOOTHE | |
| | 尉 | 3J3P |
| SORR | SORROW | |
| | 憂 | I3Q |
| | 愁 | I5H |
| | 悒 | IC30 |
| | SORROWFUL | |
| | 悽 | IDA |
| SOUL | SOUL | |
| | 魂 | Y42 |
| | 魄 | Y45 |
| SOUN | SOUND | |
| | 聲 | 6D4E |
| | 音 | 98 |
| | 喀 | C35C |
| | 吱 | C4X |
| | 咕 | CC2J |
| | SOUND-OF-WIND | |
| | 颯 | 965L |
| SOUP | SOUP | |
| | 湯 | JKA |
| | 羹 | 6J6 |
| SOUR | SOUR | |
| | 酸 | 762 |
| SOUT | SOUTH | |
| | 南 | 2J |
| SOW- | SOW | |
| | 播 | H5J7 |
| SOY- | SOY | |
| | 醬 | 763J |
| SPAC | SPACE | |
| | 間 | XK |
| | SPACIOUS | |
| | 敞 | 483S |
| SPAD | SPADE | |
| | 剷 | 225I |
| | 鏟 | V5I |

Table 1 - 51

S

| | |
|---|---|
| SPAR | SPARROW |
| | 雀 853S |
| SPAS | SPASM |
| | 痙 543M |
| | 燊 HTP |
| SPAT | SPATTER |
| | 濺 JYA |
| SPEA | SPEAK |
| | 講 T2A |
| | SPEAR |
| | 槍 GBC |
| | 矛 5A |
| | 鏢 VG5 |
| | 戕 4A4 |
| | 殳 4EA |
| SPEC | SPECIAL |
| | 特 473 |
| | 殊 4D |
| | 專 3JA |
| SPEE | SPEED |
| | 速 UG |
| SPID | SPIDER |
| | 蜘 Q5D |
| | 蛛 QGB |
| SPIN | SPIN |
| | 紡 P4F |
| | SPINACH |
| | 菠 0J58 |
| | SPINE |
| | 脊 RB2 |
| SPIR | SPIRAL |
| | 螺 QP |
| | SPIRIT |
| | 靈 883 |
| SPIT | SPIT |
| | 吐 CE |
| | 汕 J34 |
| SPLA | SPLASH |
| | 濺 J77 |
| SPLE | SPLEEN |
| | 脾 R2J |
| | SPLENDOR |
| | 華 02J |
| SPLI | SPLINTS |
| | 篾 SPLIT |
| | 擘 H73 |
| SPOI | SPOILED SOUR |
| | 餿 912Z |
| SPOK | SPOKE |
| | 輻 7CA5 |
| SPOO | SPOON |
| | 勺 2715 |
| | 匙 2LK5 |
| | 杓 G27 |
| | SPOONBILL |
| | 鶚 YN28 |
| SPOR | SPORT |
| | 嬉 DCC3 |
| SPRE | SPREAD |
| | 展 3P |
| | 攤 H850 |
| SPRI | SPRING |
| | 泉 J5B |
| | 春 KAA |
| | 羨 0Y1 |
| | 簧 SYH |
| | SPRINKLE |
| | 洒 JGCA |
| | 澆 JE2 |
| | 潑 J5F3 |
| | 洫 J6N |
| SPRO | SPROUTS |
| | 苗 05J |
| SPUR | SPURT |
| | 噴 C77 |
| SPY- | SPY |
| | 探 HG2 |
| | 諜 TGA |
| SQUA | SQUARE |
| | 方 4F |
| | SQUAT |
| | 蹲 7F3J |
| | 踞 7F3P |
| SQUE | SQUEEZE |
| | 夾 39BB |
| | 搾 H551 |
| SQUI | SQUIRMING |
| | 蜿 Q352 |
| STAB | STAB |
| | 戳 4A6F |
| | STABLE |
| | 圈 3C37 |
| | 廄 3F4E |
| STAC | STACK |
| | 厫 3F6H |
| STAF | STAFF |
| | 拐 GC23 |
| | 杖 GA16 |
| STAG | STAG |
| | 狄 49F |
| STAK | STAKE |
| | 樁 GGH |
| STAL | STALK |
| | 莖 0351 |
| STAM | STAMENS |
| | 蕊 0II |
| | STAMMER |
| | 吶 C2D2 |
| | 訥 T2D |
| STAN | STAND |
| | 站 5LC |
| | 佇 B35A |
| | 立 5L |
| | STANDARD |
| | 準 J2J |
| STAR | STAR |
| | 星 K5I |
| | STARE |
| | 瞠 ME3 |
| | 瞋 MM2 |
| | 瞅 M5H |
| | STARK |
| | 枚 G48 |
| | STARTLED |
| | 愕 1CC2 |
| | STARTLING |
| | 嚚 CL |
| STAT | STATE |
| | 邦 741 |
| | 國 3C |
| | STATION |
| | 卡 2I |
| | 駐 Y11 |
| STAY | STAY |
| | 逗 U7D |
| STEA | STEAL |
| | 偷 BB22 |
| | 撮 H66 |
| | 竊 5579 |
| | STEAM |
| | 蒸 0FA |
| | 汽 J4H |
| STEE | STEED |
| | 駿 Y128 |
| | STEEL |
| | 鋼 V34 |
| | 鉅 V3N |

Table 1 - 52

S

| | |
|---|---|
| STEE | STEEP |
| | 峭 34R |
| | 峻 342M |
| | 渥 J3P6 |
| | 陡 W7A |
| | STEEP BANK |
| | 浔 J3J3 |
| STEM | STEM |
| | 梗 G4KA |
| | 莖 03N |
| | 蒂 03K2 |
| STEN | STENCH |
| | 臭 604 |
| STEP | STEP |
| | 步 4G3 |
| | 级 P2E |
| | 陛 WE4 |
| | 階 W5B |
| | 浔 J3J3 |
| | STEP BANK |
| | 陀 W35 |
| STET | STETCH |
| | 舒 6E1 |
| STEW | STEW |
| | 煨 F5J |
| STIC | STICKY |
| | 黏 YCC |
| STIF | STIFF |
| | 僵 BAAA |
| | 殭 4DAA |
| STIL | STILL |
| | 仍 B16 |
| STIN | STING |
| | 蜇 QH |
| | 螫 Q48 |
| | STINGY |
| | 吝 C4Q |
| | 嗇 CEB |
| | 靳 934J |
| STIR | STIR |
| | 攪 H7J |
| STOC | STOCKADE |
| | 寨 G35A |
| STOM | STOMACH |
| | 胃 R5 |
| STON | STONE |
| | 石 N |
| | 礫 N3M |
| | STONE HEAP |
| | 磊 NNN |
| STOO | STOOL |
| | 凳 265M |
| | STOOP |
| | 俯 B3F |
| | 屈 3P2H |
| STOP | STOP |
| | 停 B29A |
| | 止 4GA |
| | 留 5J22 |
| | 遏 UK2 |
| | 罷 6MR |
| | 弭 3D6 |
| | 杜 GE |
| | 窒 556 |
| | 塞 E852 |
| | 沮 JA2 |
| | 綴 P2E2 |
| | 軔 7C22 |
| | 輟 7C2E |
| STOR | STORE |
| | 庫 3F7 |
| | 趸 7F0 |
| | STORE HOUSE |
| | 棧 G4A4 |
| | STORE UP |
| | 貯 7735 |
| STOU | STOUT |
| | 胖 R2J2 |
| STOV | STOVE |
| | 灶 FE |
| | 爐 F5M |
| | 鑪 V5M |
| STRA | STRADDLE |
| | 跨 7F39 |
| | STRAIGHT |
| | 挺 H3U |
| | 直 M2J |
| | STRANGE |
| | 奇 39C |
| | 怪 IE |
| | 乖 162 |
| | 睽 M5F3 |
| | STRANGY |
| | 韜 956 |
| | STRAW |
| | 稿 5HY |
| | 稈 5HK3 |
| STRE | STREAM |
| | 川 36 |
| STRE | STREET |
| | 街 6BE |
| | STRENGH |
| | 力 23 |
| | STRETCH |
| | 伸 B5J |
| STRI | STRIDE |
| | 董 39EE |
| | STRIKE |
| | 撞 H5L7 |
| | 擊 H4E |
| | STRING |
| | 串 14CC |
| | 弦 P59 |
| | 貫 774M |
| | STRIP |
| | 脫 R24 |
| | 袒 6GKA |
| | STRIPED |
| | 斑 40L |
| | STRIVE |
| | 努 23D |
| STRO | STRONG |
| | 強 3DQ |
| | 壯 3I4 |
| | 勁 233N |
| STRU | STRUGGLE |
| | 掙 H401 |
| | 扎 H12 |
| | STUBBORN |
| | 倔 B3P2 |
| STUF | STUFF |
| | 磚 NOJ |
| | STUFFING |
| | 餡 916H |
| | STUFFY |
| | 悶 IX |
| STUG | STUGEON |
| | 鱘 YF3J |
| STUM | STUMBLE |
| | 跌 7F3 |
| | STUMP |
| | 杌 G24A |
| | 蘖 0G7 |
| STUP | STUPID |
| | 愚 I57 |
| | 頑 9224 |
| | 魯 YFK |
| | 蠢 QK |
| | 聵 6F77 |

S

| | | |
|---|---|---|
| SUBD | SUBDUE | |
| | 慑 | JGDG |
| | 跂 | 4A5N |
| SUBJ | SUBJECT | |
| | 科 | 5H4 |
| SUBS | SUBSTITUTE | |
| | 代 | B3A |
| | 替 | K39 |
| SUBT | SUBTLE | |
| | 缈 | PM3 |
| | SUBTRACT | |
| | 減 | JC4 |
| SUBU | SUBURB | |
| | 郊 | 7429 |
| | 郭 | 7429 |
| SUCC | SUCCEED | |
| | 成 | 4A |
| | 继 | P3 |
| SUCK | SUCK | |
| | 吮 | C24Z |
| | SUCKER | |
| | 蘚 | 07I |
| SUDD | SUDDEN | |
| | 骤 | Y16 |
| | SUDDENLY | |
| | 乍 | 16A1 |
| | 忽 | I27 |
| | 勃 | 2338 |
| | 俄 | B4AH |
| | 攸 | 48B1 |
| | 溘 | J5M2 |
| | 遽 | U6K7 |
| | 霍 | 8885 |
| SUFF | SUFFER | |
| | 捱 | H2FE |
| SUGA | SUGAR | |
| | 糖 | 67C |
| | SUGAR-CANE | |
| | 蔗 | 03FF |
| SUIT | SUIT | |
| | 適 | U29 |
| | 巽 | 66Y |
| SULF | SULFUR | |
| | 硫 | N36 |
| SULL | SULLEN | |
| | 怏 | I392 |
| SUM- | SUM | |
| | 款 | 4C5 |
| SUMM | SUMMER | |
| | 夏 | 3Q |
| SUMM | SUMMON | |
| | 徵 | 3B48 |
| | 召 | C22 |
| | 撳 | G485 |
| SUN- | SUN | |
| | 日 | K |
| SUNC | SUNCER | |
| | 碟 | NGA |
| SUNF | SUNFLOWER | |
| | 葵 | 05F |
| SUNL | SUNLIGHT | |
| | 昱 | K5L |
| SUNP | SUNPASS | |
| | 超 | 7AC |
| SUNS | SUNSET | |
| | 夕 | 3HA |
| | 暮 | KOK |
| | 暍 | KKA |
| SUNT | SUNTER | |
| | 敖 | 48E4 |
| SUPE | SUPERFIUOUS | |
| | 冗 | 2526 |
| | 俊 | B2M |
| | 傻 | BIA |
| SUPP | SUPPER | |
| | 飧 | 913H |
| | SUPPLY | |
| | 供 | B28 |
| | 膳 | RC6 |
| | SUPPORT | |
| | 承 | HJ |
| | 托 | H16 |
| | 撑 | HH3 |
| | 養 | 916 |
| SURF | SURFACE | |
| | 表 | 66 |
| SURN | SURNAME | |
| | 姓 | D5 |
| | 余 | BGA |
| | 羲 | 6J4A |
| | 邵 | 74C2 |
| | 龔 | YL2 |
| SURP | SURPASS | |
| | 愈 | BI |
| | SURPLUS | |
| | 賸 | R770 |
| | SURPRISED | |
| | 惋 | I352 |
| SURR | SURROUND | |
| | 圍 | 3C9 |
| | 繞 | PE2 |
| | 遶 | UE2 |
| SUST | SUSTAIN | |
| | 堪 | E5N |
| SWAD | SWADDLING-CLOTH | |
| | 褯 | 6G3D |
| | 褓 | 66BC |
| SWAL | SWALLOW | |
| | 燕 | FO |
| | 嚥 | CFO |
| | 咽 | C3C3 |
| | 呷 | C5J1 |
| SWAN | SWAN | |
| | 鸿 | YNJ |
| SWEA | SWEAT | |
| | 汗 | J37 |
| SWEE | SWEEP | |
| | 掃 | H3K |
| | SWEET | |
| | 甘 | 5N |
| | 甜 | 5N6 |
| | SWEET-CAKE | |
| | 飴 | 91C2 |
| SWEL | SWELLING | |
| | 腫 | R7H |
| SWIM | SWIM | |
| | 泳 | JJ1 |
| | 泅 | J3CB |
| SWIN | SWINE | |
| | 彘 | 3L5 |
| | SWING | |
| | 鞦 | 935 |
| | 韆 | 93U |
| SWOL | SWOLLEN | |
| | 膨 | R3E |
| SWOR | SWORD | |
| | 劍 | 22BB |
| SYNO | SYNOPSIS | |
| | 略 | 5JC |
| SYST | SYSTEM | |
| | 制 | 223 |
| | 系 | P1 |

Table 1 - 54

T

| | |
|---|---|
| TABL | TABLE |
| | 桌 G2IK |
| | 枱 GGL |
| | 檯 G2J2 |
| | 几 26A |
| | TABLET |
| | 匾 2C4P |
| | 扁 4P2 |
| | 牌 4T2 |
| | 笏 S27 |
| TACH | TACHE |
| | 髭 YP4G |
| | TACHED |
| | 附 WB3 |
| TADP | TADPOLE |
| | 蝌 Q5H |
| | 蚪 Q4N |
| TAIL | TAIL |
| | 尾 3P4B |
| | TAILED DEER |
| | 麈 YAG7 |
| TAKE | TAKE |
| | 取 2E6 |
| | 拿 HCB |
| TALE | TALENT |
| | 伎 B4X |
| TALK | TALK |
| | 說 T24 |
| | 談 TFF |
| | 講 T6C |
| | 嘰 C3M |
| | TALKATIVE |
| | 嚕 CYF |
| | 嗦 CP2 |
| | 嘮 C23F |
| | 嘍 CDK |
| | 嘻 C5M2 |
| | 詹 T22 |
| | 譊 TT |
| TAME | TAME |
| | 馴 Y136 |
| TAN- | TAN |
| | 鞣 93G5 |
| TARG | TARGET |
| | 的 D |
| | 靶 9330 |
| | 鵠 YNC4 |
| TARO | TARO |
| | 芋 02B1 |
| TASS | TASSEL |
| | 纓 PD7 |
| TAST | TASTE |
| | 味 CGA |
| | 嘗 C3SK |
| | 嚐 C3SK |
| | 咕 C2I |
| TAX- | TAX |
| | 捐 HCR |
| | 稅 5H2 |
| | 榷 G85 |
| TEA- | TEA |
| | 茗 OC3 |
| | 茶 OBG |
| TEAC | TEACH |
| | 授 H2 |
| | 誨 T4M |
| | TEACHER |
| | 師 3K1 |
| TEAR | TEAR |
| | 撕 H4J2 |
| | TEARS |
| | 涕 J3D2 |
| | 淚 J4P |
| TEET | TEETH |
| | 齒 Y2 |
| TELL | TELL |
| | 告 C4 |
| | 訴 T4J |
| TEMP | TEMPER |
| | 性 I5 |
| | TEMPLE |
| | 寺 3JE |
| | 廟 3F4R |
| | 祠 5KC1 |
| | TEMPORARY |
| | 暫 K4J7 |
| TEN- | TEN |
| | 十 10 |
| | TEN-FEET |
| | 丈 A16 |
| | TEN-THOUSANDS |
| | 萬 05 |
| TEND | TEND |
| | 牧 474 |
| | 趨 7AO |
| | TENDAR |
| | 冉 2AE |
| | 嫩 D48G |
| | TENDON |
| | 腱 R3U |
| TENT | TENT |
| | 帳 3K3P |
| | TENTH |
| | 酉 76A |
| TERM | TERMINATE |
| | 殄 4D3E |
| TERR | TERRACE |
| | 台 C2H |
| | 臺 6L3 |
| TEST | TESTICLES |
| | 睪 M37 |
| THAN | THANK |
| | 謝 T3 |
| THAT | THAT |
| | 彼 3B5 |
| | 那 742 |
| THEM | THEME |
| | 題 92K |
| THEN | THEN |
| | 亘 2CC |
| | 綫 P4L |
| THIC | THICK |
| | 厚 2F3 |
| | 濃 J7I4 |
| | 稠 5HC2 |
| | 粗 5HA |
| THIE | THIEF |
| | 賊 774A |
| THIG | THIGH |
| | 股 R4 |
| THIN | THIN |
| | 薄 OJ |
| | 細 P5J |
| | 瘦 542 |
| | 稀 5H3K |
| | THING |
| | 事 13A |
| | 物 47 |
| | THINK |
| | 事 13A |
| | 思 I5J |
| | 想 IM |
| THIR | THIRD |
| | 丙 A2AB |
| | THIRSTY |
| | 渴 JK2 |
| | THIRTY-CATTIES |
| | 鈞 V27 |

T

| | | |
|---|---|---|
| THIS | THIS | 這 UT |
| | 此 | 4G |
| | 斯 | 4J2 |
| THOR | THORN | |
| | 刺 | 22G |
| | 刺 | 22GC |
| | 棘 | GG2 |
| | 蒺 | 054 |
| | 藜 | CYC |
| THOU | THOUGHT | |
| | 意 | I9 |
| | THOUGHT-FUL | |
| | 念 | IB |
| | THOUSAND | |
| | 千 | 1000 |
| THRE | THREAD | |
| | 線 | PJ |
| THRE | THREAD | |
| | 縷 | PDK |
| | THREATEN | |
| | 嚇 | C7E |
| | THREE | |
| | 三 | AAA |
| | THRESHOLD | |
| | 閾 | X4A |
| THRI | THRIFTY | |
| | 儉 | BBB |
| | THRIVING | |
| | 蓄 | 05J7 |
| THRO | THROAT | |
| | 喉 | CB5 |
| | 嚨 | CYL |
| | 吭 | C292 |
| | 亢 | 2926 |
| | THROW | |
| | 丟 | A2M |
| | 投 | H4 |
| | 扔 | H16 |
| | 摔 | H59 |
| | 擲 | H743 |
| | 甩 | 5E1 |
| THUM | THUMB | |
| | 拇 | H4M |
| | THUMP | |
| | 砰 | N37 |
| THUN | THUNDER | |
| | 雷 | 885 |
| | THUNDERCLAP | |
| | 霹 | 8873 |
| | 靂 | 884G |
| | 霆 | 883U |
| TICK | TICKET | |
| | 券 | 220A |
| | 票 | 5K6C |
| TIDE | TIDE | |
| | 潮 | J4R |
| | 汐 | J3HA |
| TIE- | TIE | |
| | 縛 | P3JA |
| TIEU | TIE UP | |
| | 摯 | HE1 |
| TIGE | TIGER | |
| | 虎 | 6K2 |
| | 彪 | 6K3E |
| TIGH | TIGHT | |
| | 緊 | P2E6 |
| TILE | TILE | |
| | 瓦 | 5CA |
| TILL | TILL | |
| | 迄 | U12 |
| | 迨 | UC2M |
| TIME | TIME | |
| | 時 | K3 |
| TIMI | TIMID | |
| | 怯 | I2ME |
| | 懦 | I88 |
| | 恇 | I2CL |
| TIN- | TIN | |
| | 錫 | VK2 |
| TIP- | TIP | |
| | 末 | GAA |
| | 梢 | GR |
| | 杪 | G3S |
| TIRD | TIRD | |
| | 累 | P5JA |
| TIRE | TIRED | |
| | 疲 | 5458 |
| | 倦 | B2K2 |
| | 憊 | IB5 |
| TITL | TITLE | |
| | 銜 | V6B |
| TO- | TO | |
| | 至 | 6L |
| TOAD | TOAD | |
| | 蟾 | QT1 |
| | 蜍 | QBG |
| | 黽 | YRA |
| TOBA | TOBACCO | |
| | 菸 | 04F2 |
| TOE- | TOE | |
| | 趾 | 7F4G |
| TOGE | TOGETHER | |
| | 並 | A0 |
| TOMB | TOMB | |
| | 陵 | VE3 |
| | 墓 | E0K |
| | 塚 | E25 |
| | 冢 | 2578 |
| TON- | TON | |
| | 噸 | C92 |
| TONG | TONGUE | |
| | 吞 | C391 |
| | 舌 | 6E |
| TOO- | TOO | |
| | 太 | 391 |
| TOOT | TOOTH | |
| | 牙 | 4Y |
| TOP- | TOP | |
| | 頂 | 92A1 |
| | 顛 | 92M |
| TORC | TORCH | |
| | 炬 | F3N |
| TORT | TORTOISE | |
| | 龜 | YQ |
| | TORTOISE SHELL | |
| | 玳 | LB3 |
| | TORTURE | |
| | 刑 | 222B |
| TOPR | TO-PRESENT | |
| | 贈 | 774K |
| TOSS | TOSSED | |
| | 颺 | 96K |
| TOSU | TO-SUN | |
| | 曬 | KYA |
| | TOSUP | |
| | 曝 | KKJ |
| TOTA | TOTAL | |
| | 總 | PI |
| TOUC | TOUCH | |
| | 摸 | HOK |
| TOWA | TOWARD | |
| | 向 | C1 |
| | 嚮 | C17 |
| TOWL | TOWLINE | |
| | 縴 | P47 |
| TOWN | TOWN | |
| | 鎮 | VM |
| | 邑 | 74A |

Table 1 - 56

T

| | |
|---|---|
| TRAC | TRACE |
| | 描 H05 |
| | 蹤 7F3B |
| | 跡 7F2 |
| | TRACK |
| | 軌 7C1 |
| TRAD | TRADE |
| | 貿 7723 |
| TRAI | TRAIL |
| | 曳 4K16 |
| | TRAITOR |
| | 奸 D37 |
| | 宄 3512 |
| TRAM | TRAMPLE |
| | 蹂 7FG5 |
| TRAQ | TRAQUIL |
| | 滄 JT1 |
| TRAN | TRANSLATE |
| | 譯 TM |
| | TRANSMIT |
| | 傳 B3JA |
| | 遞 U6K |
| | TRANSPORT |
| | 運 U7 |
| | 輸 7CB |
| TRAT | TRATE |
| | 透 U5H |
| TRAV | TRAVEL |
| | 旅 4F4S |
| | 遊 U4F |
| | 跋 7F2E |
| TREA | TREAD |
| | 踩 7FG2 |
| | 踏 7FJK |
| | 踹 7F6R |
| | 蹋 7FK6 |
| | 蹈 7F6H |
| | 蹬 7F5F |
| | 躡 7F6D |
| | 蹀 7FGA |
| | 蹭 7F4K |
| | TREASURE |
| | 寶 3577 |
| | 琛 LG2 |
| | TREASURY |
| | 帑 3KD |
| | TREAT |
| | 待 3B3 |
| | TREATY |
| | 約 P27 |

| | |
|---|---|
| TREE | TREE |
| | 樹 G3JE |
| | 桐 GC2A |
| | 桓 G2BK |
| | 椅 GKAA |
| | TREE-BARK |
| | 朴 G2I |
| TREF | TREFOIL |
| | 苜 OM |
| TREM | TREMBLE |
| | 抖 G4N |
| TREN | TRENCH |
| | 濠 J782 |
| TRES | TRESS |
| | 髻 YPC |
| TRIB | TRIBUTE |
| | 貢 773N |
| TRIC | TRICK |
| | 哄 C282 |
| | TRICKLE |
| | 瀝 J4G2 |
| TRIF | TRIFLE |
| | 錙 V365 |
| TRIP | TRIP |
| | 趟 7A3S |
| | TRIPOD |
| | 鼎 Y9 |
| TROU | TROUBLE |
| | 煩 F9 |
| | 擾 HIA |
| | TROUBLESOME |
| | 麻 06A |
| | 繁 P48 |
| | 彆 3D48 |
| | TROUGH |
| | 槽 G4KA |
| | TROUSER SEAT |
| | 襠 665J |
| TRUE | TRUE |
| | 真 M2 |
| | TRUELY |
| | 洵 JK27 |
| TRUN | TRUNK |
| | 幹 372J |
| | 株 GGB |
| TRY- | TRY |
| | 試 T3A |
| TUB- | TUB |
| | 盆 5M22 |

| | |
|---|---|
| TUBE | TUBE |
| | 筒 SC2 |
| TUMB | TUMBLE |
| | 跤 7F29 |
| TUMO | TUMOR |
| | 疣 543R |
| TUMU | TUMULT |
| | 洶 J272 |
| TUNE | TUNE |
| | 調 TC |
| TUNG | TUNGSTEN |
| | 鎢 VF |
| TUNN | TUNNEL |
| | 隧 WU7 |
| TURE | TURE |
| | 摘 H57 |
| TRUN | TRUN |
| | 翻 6F5 |
| | 轉 7C3 |
| | TURNIP |
| | 蘿 06M |
| | 蔔 027A |
| TURT | TURTLE |
| | 鼈 YR48 |
| TUTO | TUTOR |
| | 傅 B3JA |
| TWEL | TWELFTH |
| | 亥 29B |
| TWEN | TWENTY |
| | 廿 20 |
| TWIG | TWIG |
| | 條 GB4 |
| TWIN | TWIN |
| | 孿 38T |
| TWIS | TWIST |
| | 扭 HA2 |
| | 擰 H35A |
| | 緝 PC6D |
| TWO- | TWO |
| | 二 AA |
| | 兩 AB |
| | 貳 AA2 |

Table 1 - 57

U

| | | | |
|---|---|---|---|
| UGLY | UGLY | URGE | URGENT |
| | 醜 76Y | | 促 B7F |
| ULCE | ULCER | URIN | URINE |
| | 瘤 54B | | 尿 3PJ |
| | 瘍 54KA | USE- | USE |
| | 疳 545N | | 使 BCA |
| UMBE | UMBER BLACK | | 用 5E |
| | 黧 YOB | USUR | USURP |
| UMBR | UMBRELLA | | 篡 S2M |
| | 傘 BBB2 | UTMO | UTMOST |
| UNCL | UNCLE | | 儘 B5MF |
| | 伯 B5B | | 殫 4DCC |
| | 叔 2E3 | | 臻 6L5 |
| | 舅 6H5 | | |
| UNDE | UNDERCIDED | | |
| | 懂 I07 | | |
| UNDR | UNDRESS | | |
| | 裸 66E1 | | |
| UNEA | UNEASY | | |
| | 悸 I385 | | |
| UNEV | UNEVEN | | |
| | 坷 ECA | | |
| UNIC | UNICORN | | |
| | 麒 YA2 | | |
| UNIF | UNIFORM | | |
| | 齊 Y7 | | |
| UNIT | UNITE | | |
| | 拼 H03G | | |
| | 聯 6D3 | | |
| UNIV | UNIVERSAL | | |
| | 普 KO | | |
| | 亙 2B16 | | |
| | UNIVERSE | | |
| | 宇 3521 | | |
| | 宙 355J | | |
| UNLO | UNLOOSE | | |
| | 釋 79 | | |
| UNRA | UNRAVEL | | |
| | 繹 PM | | |
| UP- | UP | | |
| | 上 A2 | | |
| UPRI | UPRIGHT | | |
| | 矗 MMM | | |
| UPST | UPSTREAM | | |
| | 溯 J4RO | | |
| VRAN | VRANIUM | | |
| | 鈾 V5J | | |
| URGE | URGE | | |
| | 催 B348 | | |

V

| | | | |
|---|---|---|---|
| VACA | VACANT | | |
| | | 空 | 55 |
| VAGE | VAGETABLE | | |
| | | 蔬 | 056 |
| | | 菜 | 079 |
| VAGI | VAGINA | | |
| | | 膣 | R556 |
| VAGU | VAGUE | | |
| | | 渺 | JM3 |
| VALL | VALLEY | | |
| | | 谷 | 7K |
| | | 峪 | 347K |
| VARA | VARADIUM | | |
| | | 釩 | V26 |
| VAPO | VAPOR | | |
| | | 蒸 | FAJ |
| | | 氛 | 4H2 |
| VAST | VAST | | |
| | | 滄 | JBC |
| | | 浩 | JC47 |
| | | 瀚 | J6F |
| | | 溥 | J3J5 |
| | | 茫 | 0J29 |
| VEIL | VEIL | | |
| | | 冪 | 253 |
| VELV | VELVT | | |
| | | 绒 | P4A2 |
| VENT | VENTURE | | |
| | | 冒 | 2AM |
| VERA | VERANDA | | |
| | | 廡 | 3FFB |
| | | 廊 | 3F74 |
| VERM | VERMILION | | |
| | | 硃 | NGB |
| VERT | VERTICAL | | |
| | | 縱 | P3B |
| | | 豎 | 7D2 |
| VERY | VERY | | |
| | | 很 | 3B6 |
| | | 甚 | 5N2 |
| VESS | VESSEL | | |
| | | 器 | CC4 |
| | | 皿 | 5MA |
| | | 盂 | 5M2B |
| | | 瑚 | LR |
| VEX- | VEX | | |
| | | 撓 | HE2 |
| VEXA | VEXATION | | |
| | | 惱 | IIC |
| VICE | VICES | | |
| | | 惡 | I2C0 |
| VICI | VICIOUS | | |
| | | 邪 | 744 |
| VICT | VICTIM | | |
| | | 犧 | 476 |
| | | 牲 | 475 |
| | VICTORY | | |
| | | 勝 | 234 |
| | | 凱 | 267 |
| VIEW | VIEW | | |
| | | 覽 | 7JH |
| VIGO | VIGOROUS | | |
| | | 旺 | KL |
| VIGR | VIGROUS-SPIRIT | | |
| | | 擻 | H48D |
| VILL | VILLAGE | | |
| | | 村 | G3J |
| | | 屯 | 3T |
| | | 閭 | XCC |
| VINE | VINEGAR | | |
| | | 醋 | 76K2 |
| | VINES | | |
| | | 蔓 | 04K |
| | | 藤 | 0RJ |
| VIOL | VIOLENT | | |
| | | 猛 | 493 |
| VIRT | VIRTUE | | |
| | | 德 | 3BI |
| | VIRTUOUS | | |
| | | 淑 | J2E3 |
| VISA | VISAGE | | |
| | | 面 | 94 |
| VISI | VISIT | | |
| | | 拜 | HH |
| | | 訪 | T4F |
| | | 謁 | TK27 |
| VOIC | VOICE | | |
| | | 嗓 | CG2 |
| | | 聲 | 6D4E |
| VOLG | VOLGAR | | |
| | | 俗 | B7K |
| | | 陋 | WA2A |
| VOMI | VOMIT | | |
| | | 嘔 | C2C |

Table 1 - 59

W

| | | |
|---|---|---|
| WABB | WABBLE | |
| | 鶡 | 7F4P |
| WADE | WADE | |
| | 涉 | J4G3 |
| WAGT | WAGTAIL | |
| | 鸰 | YNB2 |
| WAIL | WAILING | |
| | 咷 | C242 |
| WAIT | WAIT | |
| | 等 | S3J |
| | 候 | B5D |
| WALK | WALK | |
| | 行 | 6B |
| | 走 | 7A |
| | 踐 | 7F4 |
| | 踱 | 7F3F |
| | WALK CAREFULLY | |
| | 踽 | 7F2Z |
| WALL | WALL | |
| | 牆 | 4U |
| | 壁 | E73 |
| | 垣 | E2BK |
| WAND | WANDER | |
| | 徘 | 3B8 |
| | 徊 | 3B3C |
| WANT | WANT | |
| | 要 | 6CD |
| | 缺 | 6G |
| | WANTING | |
| | 闕 | X4C |
| | WANTON | |
| | 哇 | CEE |
| WAR- | WAR | |
| | 戰 | 4ACC |
| WARV | WAR-VESSEL | |
| | 艦 | 695 |
| | 艨 | 690 |
| WARM | WARM | |
| | 溫 | J5 |
| | 暖 | K40 |
| | 暄 | K35 |
| WARN | WARN | |
| | 警 | T48 |
| WARP | WARP | |
| | 經 | P |
| WASH | WASH | |
| | 洗 | J24 |
| | 沐 | JG |
| | 浣 | J352 |
| | 濯 | J6F8 |
| | 淘 | J27G |
| | 鬻 | 5HJG |
| WAST | WASTE | |
| | 耗 | GP4 |
| | 縻 | 3F5 |
| | 靡 | Y38 |
| | 墟 | EGK |
| WATC | WATCH | |
| | 瞧 | MF |
| | 錶 | V66 |
| WATE | WATER | |
| | 水 | J |
| | WATER-CHEGTNUT | |
| | 芍 | 0271 |
| | WATER-CHESTNUT | |
| | 菱 | 0E3 |
| | WATER-ILYSEEDS | |
| | 芊 | 02J1 |
| | WATER-PLANT | |
| | 芡 | 04CA |
| | 藻 | 0497 |
| WAVE | WAVE | |
| | 波 | J58 |
| | 浪 | J6T |
| | WAVER | |
| | 徜 | 3B3S |
| | 徉 | 3B6J |
| WAX- | WAX | |
| | 蠟 | Q36 |
| WEAK | WEAK | |
| | 衰 | 66C |
| | 弱 | 3D3 |
| WEAL | WEALTH | |
| | 財 | 77H |
| WEAP | WEAPON | |
| | 械 | G4A |
| | 戎 | 4A2 |
| WEAR | WEAR | |
| | 佩 | B3K2 |
| | 戴 | 4AE |
| | 穿 | 554Y |
| WEAS | WEASEL | |
| | 鼬 | YS5 |
| WEAV | WEAVE | |
| | 織 | P4P |
| | 紩 | P4 |
| WEBF | WEBFEET | |
| | 蹼 | 7F6J |
| WEDG | WEDGE | |
| | 楔 | G392 |
| WEED | WEED | |
| | 鋤 | V23 |
| | 耡 | 6P23 |
| | 耘 | 6P2 |
| | 薅 | 0D7 |
| | 荼 | 0BAG |
| | WEEDS | |
| | 稗 | 5H2J |
| | 穢 | 5H4G |
| | 莠 | 05H |
| WEEK | WEEK | |
| | 週 | UC2 |
| WEEP | WEEP | |
| | 哭 | C49 |
| | 泣 | J5L |
| WEIG | WEIGH | |
| | 衡 | 6BY |
| WEIR | WEIR | |
| | 閘 | X5J |
| WELC | WELCOME | |
| | 迎 | U2K |
| | 迓 | U4Y |
| WELL | WELL | |
| | 井 | 2B14 |
| WEST | WEST | |
| | 西 | 6C |
| WET- | WET | |
| | 溼 | JEA |
| | 濕 | JFK |
| WETH | WETHER | |
| | 羯 | 6JK |
| WHAL | WHALE | |
| | 鯨 | YF29 |
| WHAT | WHAT | |
| | 何 | BC |
| | 啥 | C6E |
| WHEA | WHEAT | |
| | 麥 | YM |
| | 稞 | 5HGK |
| | WHEAT-BRAN | |
| | 麩 | YM3 |
| WHEE | WHEEL | |
| | 輪 | 7CB2 |
| | WHEEL-RUT | |
| | 轍 | 7FOX |

Table 1 - 60

W

| | |
|---|---|
| WHIP | WHIP |
| | 撻 H6J |
| | 策 SE1 |
| | 鞭 93B |
| WHIR | WHIRLPOOL |
| | 洄 J3CC |
| | 渦 JC2A |
| | 漩 J4F5 |
| WHIS | WHISPER |
| | 聶 6D6 |
| | WHISTLE |
| | 笳 S23 |
| | WHISTLING |
| | 嘯 C6A |
| WHIT | WHITE |
| | 白 5B |
| | 皓 5BC |
| | 皚 5B7 |
| | 皜 5BYG |
| | 紈 P15 |
| | WHITE SILK |
| | 縞 PYG |
| | WHITEFOX |
| | 貔 7B4 |
| WHO- | WHO |
| | 誰 T85 |
| | 孰 381 |
| WHOL | WHOLE |
| | 全 BL |
| | 囫 3C27 |
| | 圇 3CBA |
| WHOR | WHORE |
| | 娼 DKK |
| | 妓 D4X |
| | 婊 D66 |
| | WHORING |
| | 嫖 D5K |
| WHY- | WHY |
| | 何 BC |
| | 胡 RC |
| | 奚 3940 |
| WHYN | WHY NOT |
| | 盍 5M2M |
| WICK | WICK |
| | 炷 F15 |
| | WICKED |
| | 刁 22AA |
| | 歹 4DA |
| WIDE | WIDE |
| | 寬 350 |
| WIDE | WIDESPREAD |
| | 洪 J392 |
| WIDO | WIDOW |
| | 孀 D88 |
| | 嫠 D48G |
| | WIDOWER |
| | 鰥 YFM |
| WIDT | WIDTH |
| | 幅 3KA5 |
| | 幀 3K77 |
| WIFE | WIFE |
| | 妻 DA3 |
| | 姬 D77 |
| | WIFES'-SISTER |
| | 姨 D393 |
| WILD | WILD |
| | 猖 49KK |
| | 野 7H1 |
| | WILD CAT |
| | 貉 7BC3 |
| | 貍 7B7 |
| | WILD FIRE |
| | 燹 F78 |
| | WILD GEESE |
| | 雁 852F |
| | WILD TRIBE |
| | 貊 7B5 |
| | WILDERNESS |
| | 野 7H1 |
| | 曠 K3F |
| | 墉 E3F |
| WILL | WILL |
| | 志 I3I |
| | WILLING |
| | 願 922 |
| | WILLOW |
| | 柳 G2K |
| WILY | WILY |
| | 譎 T5A |
| WIN- | WIN |
| | 捷 HA5 |
| WIND | WIND |
| | 風 96 |
| | 屁 3P4L |
| | 紓 P2B1 |
| | WINDOW |
| | 窗 553C |
| | 牖 4T4P |
| | WINDOW-BARS |
| | 櫺 G88 |
| WINE | WINE-JAR |
| | 枸 G3J7 |
| WING | WING |
| | 翅 6F4 |
| | 翼 GF5J |
| WINN | WINNOW |
| | 簸 S58 |
| WINT | WINTER |
| | 冬 2G3 |
| WIPE | WIPE |
| | 揩 H355 |
| | 抹 HGA |
| | 拭 H40 |
| | 指 H5B4 |
| WISD | WISDOM |
| | 智 K5D |
| | 慧 I3L1 |
| WISE | WISE |
| | 哲 CH |
| | 惺 IK5 |
| | 睿 6Q4 |
| WITC | WITCH |
| | 妖 D391 |
| | 巫 3NB |
| WITH | WITH |
| | 以 B2 |
| | WITHDRAW |
| | 縮 P35B |
| | WITHER |
| | 枯 GC2J |
| | 萎 OD5 |
| WITN | WITNESS |
| | 證 T5 |
| WOLF | WOLF |
| | 狼 496T |
| | 狽 4977 |
| WOMA | WOMAN |
| | 婦 D3K |
| WOMB | WOMB |
| | 胞 R27 |
| | 胎 RC2 |
| WOOD | WOOD |
| | 木 G |
| | 枋 G4FA |
| | WOOD-CATTER |
| | 樵 GF8 |
| WOOF | WOOF |
| | 緯 P9 |

Table 1 - 61

W

| | | |
|---|---|---|
| WORD | WORD | |
| | 字 | 383 |
| | 言 | T |
| | WORDS | |
| | 話 | T6E |
| WORK | WORK | |
| | 工 | 3N |
| | WORKER | |
| | 匠 | 2C4 |
| WORL | WORLD | |
| | 世 | AU |
| WORM | WORM | |
| | 蠖 | QI8 |
| WOUN | WOUND | |
| | 痍 | 5439 |
| WORT | WORTH | |
| | 值 | BH |
| WRAP | WRAP | |
| | 絞 | P29 |
| | 裹 | 667H |
| | WRAPPER | |
| | 襆 | 66B4 |
| WRIG | WRIGGLING | |
| | 蜷 | Q2K |
| WRIN | WRINKLED | |
| | 縐 | P02 |
| | WRINKLES | |
| | 皺 | 580 |
| WRIS | WRIST | |
| | 腕 | R35 |
| WRIT | WRITE | |
| | 寫 | 35F |
| WRON | WRONG | |
| | 枉 | GL |
| | 錯 | VK |

Table 1 - 62

X Y Z

| X | Y | Z |
|---|---|---|
| XENO XENON | YAK- YAK | ZERO ZERO |
| 氙 4H34 | 犛 4748 | 零 AA0 |
| | YARD YARD | ZINC ZINC |
| | 庭 3F3U | 鋅 V73 |
| | 院 W3 | ZIRC ZIRCONIUM |
| | YEAR YEAR | 鋯 VC4 |
| | 年 37 | |
| | 歲 4G4A | |
| | YEAS YEAST | |
| | 酵 7638 | |
| | YELL YELLOW | |
| | 黃 YH | |
| | YELP YELP | |
| | 猥 495J | |
| | YEST YESTERDAY | |
| | 昨 K1 | |
| | YET- YET | |
| | 而 6R | |
| | YIEL YIELD | |
| | 讓 T66 | |
| | YOKE YOKE | |
| | 軛 7C2F | |
| | YOU- YOU | |
| | 你 Y | |
| | 卿 2K16 | |
| | 您 IB3 | |
| | 汝 JD | |
| | 爾 4V | |
| | YOUN YOUNG | |
| | 幼 3M2 | |
| | 稚 5H8 | |
| | 夭 3916 | |
| | 齔 Y22L | |
| | 齠 Y2C2 | |
| | YOUR YOUR-DAUGHTER | |
| | 媛 DI4 | |
| | YTTE YTTERBIUM | |
| | 鐿 VI9 | |

Table 1 - 63

I claim:

1. A word processor for producing Chinese characters, each of said Chinese characters including at least one radical, said word processor comprising:

an internal memory unit for storing a dictionary of radicals of Chinese characters from which selected Chinese characters are derived;

a standard United States keyboard having numeral and letter keys and being coupled to said internal memory unit, said numeral keys including co-functioning numeral keys, each of said co-functioning numeral keys being inscribed with at least one of said radicals and a letter or numeral representative of a letter or numeral key used in combination with said each co-functioning numeral key to select said at least one of said radicals, said letter keys including co-functioning letter keys, each of said co-functioning letter keys being inscribed with at least one of said radicals and a letter or numeral representative of a letter or numeral key used in combination with said each co-functioning letter key to select said at least one of said radicals;

a screen coupled to said internal memory unit for displaying the characters derived from said memory unit; and a memory disk coupled to said memory unit for storing the characters appearing on said screen, wherein said numeral and letter keys are inscribed as shown in FIG. 2.

* * * * *